United States Patent
Hu

(10) Patent No.: US 8,374,392 B2
(45) Date of Patent: Feb. 12, 2013

(54) PERSON TRACKING METHOD, PERSON TRACKING APPARATUS, AND PERSON TRACKING PROGRAM STORAGE MEDIUM

(75) Inventor: Xuebin Hu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 442 days.

(21) Appl. No.: 12/767,452

(22) Filed: Apr. 26, 2010

(65) Prior Publication Data

US 2010/0296702 A1 Nov. 25, 2010

(30) Foreign Application Priority Data

May 21, 2009 (JP) .................................. 2009-123232

(51) Int. Cl.
*G06K 9/00* (2006.01)
(52) U.S. Cl. ......................................................... 382/103
(58) Field of Classification Search .................. 382/103, 382/107, 115, 116, 118, 181, 190, 192, 203; 348/169
See application file for complete search history.

(56) References Cited

U.S. PATENT DOCUMENTS

| | | | | |
|---|---|---|---|---|
| 5,987,154 A * | 11/1999 | Gibbon et al. | ................. | 382/115 |
| 6,301,370 B1 * | 10/2001 | Steffens et al. | ................. | 382/103 |
| 7,027,621 B1 * | 4/2006 | Prokoski | ...................... | 382/118 |
| 7,227,893 B1 * | 6/2007 | Srinivasa et al. | ......... | 375/240.08 |
| 7,227,977 B1 * | 6/2007 | Dotsenko | ...................... | 382/118 |
| 7,428,000 B2 * | 9/2008 | Cutler et al. | ............... | 348/14.11 |
| 7,512,262 B2 * | 3/2009 | Criminisi et al. | ............. | 382/154 |
| 7,620,202 B2 * | 11/2009 | Fujimura et al. | .............. | 382/103 |
| 7,840,036 B2 * | 11/2010 | Higaki | .......................... | 382/118 |
| 2005/0031166 A1 * | 2/2005 | Fujimura et al. | .............. | 382/103 |
| 2005/0117779 A1 * | 6/2005 | Horie et al. | .................... | 382/103 |
| 2005/0196015 A1 * | 9/2005 | Luo et al. | ........................ | 382/103 |
| 2005/0271279 A1 * | 12/2005 | Fujimura et al. | .............. | 382/203 |
| 2006/0140445 A1 * | 6/2006 | Cusack, Jr. | .................... | 382/103 |
| 2006/0187305 A1 * | 8/2006 | Trivedi et al. | ................. | 348/169 |
| 2009/0027502 A1 * | 1/2009 | Yang | ............................. | 348/169 |
| 2009/0028386 A1 * | 1/2009 | Michimoto et al. | .......... | 382/103 |
| 2009/0041297 A1 * | 2/2009 | Zhang et al. | ................... | 382/103 |
| 2009/0067730 A1 * | 3/2009 | Schneiderman | .............. | 382/224 |

FOREIGN PATENT DOCUMENTS

| | | |
|---|---|---|
| JP | 8-94320 A | 4/1996 |
| JP | 2000-105835 A | 4/2000 |
| JP | 2002-342762 A | 11/2002 |
| JP | 2007-219603 A | 8/2007 |
| JP | 2008-250444 A | 10/2008 |

\* cited by examiner

*Primary Examiner* — Chan S Park
*Assistant Examiner* — Shervin Nakhjavan
(74) *Attorney, Agent, or Firm* — Birch, Stewart, Kolasch & Birch, LLP

(57) ABSTRACT

A person tracking method capable of obtaining information representing a correspondence between a shot image and a three-dimensional real space, without actual measurement, thereby enabling lighter processing is provided. The method includes: calculating a statistically average correspondence between a size of person's head and a position representing a height of the head on the shot image, the camera looking down a measured space and taking the measured space; detecting a position and a size of a head on each of measured frame images; calculating, based on positions and sizes of heads on plural past measured frame images and the correspondence, a movement feature quantity representing a possibility that a head on a current measured frame image is of the same person on the past measured frame images; and determining that the head on the current measured frame image is of the same person on the past measured frame images.

6 Claims, 40 Drawing Sheets

FIG. 37

TEACHER IMAGE a0   1.0  →  1.0 * x  →  ...
TEACHER IMAGE b0   1.0  →  1.0 * z  →  ...
TEACHER IMAGE c0   1.0  →  1.0 * z  →  ...
...          ...
TEACHER IMAGE m0   1.0  →  1.0 * y  →  ...

THE MARK * INDICATES AN OPERATION FOR CHANGING WEIGHTING

FIG. 38

| | (SECONDARY EVALUATED VALUE) | | (WEIGHT) |
|---|---|---|---|
| TEACHER IMAGE a0 | A | TEACHER IMAGE a1 | 1.0 * A |
| TEACHER IMAGE b0 | B | TEACHER IMAGE b1 | 1.0 * B |
| TEACHER IMAGE c0 | C | TEACHER IMAGE c1 | 1.0 * C |
| ... | ... | ... | ... |
| TEACHER IMAGE m0 | M | TEACHER IMAGE m1 | 1.0 * M |
| ... | ... | ... | ... |

THE MARK * INDICATES AN OPERATION FOR CHANGING WEIGHTING

PERSON TRACKING METHOD, PERSON TRACKING APPARATUS, AND PERSON TRACKING PROGRAM STORAGE MEDIUM

BACKGROUND OF THE INVENTION

1. Field of the Invention

The present invention relates to a person tracking method, a person tracking apparatus and a person tracking program storage medium which track movements of a person whose image is captured by a camera.

2. Description of the Related Art

A person tracking method includes two kinds of processing which are: person detection processing for detecting a person to start tracking, and person tracking processing for focusing on a feature of the detected person thereby tracking the person. In the person detection processing, the person is detected by finding a difference between the person and a background or a temporal difference (see Japanese Patent Application Publications No. 2000-105835 and No. 2002-342762), or by focusing on a certain feature of the person and determining whether the feature is present or not. In the person tracking processing, tracking processing that employs a Kalman filter or the like is generally performed.

Further, there has been proposed an attempt to obtain and hold information representing a correspondence between a two-dimensional moving image and a three-dimensional real space, and then convert the position of a measured object on the two-dimensional image into that in the three-dimensional real space and reconvert the position into that on the two-dimensional image after predicting the position in the three-dimensional real space, thereby precisely predicting a movement of the object on the two-dimensional image (Japanese Patent Application Publication No. H8-94320).

In such a conventional method however, there is a problem as described below.

The method of detecting a person by a differential operation using a background-based difference, a temporal difference or the like relies on a factor such as a temporal change of the background or an image. Therefore, when the background or the like is complicated, a precise background image or the like cannot be created, resulting in deterioration of a detection capability.

Meanwhile, in the tracking processing using the Kalman filter or the like, calculation complexity is great and thus a long processing time is required. Moreover, in order to make the Kalman filter or the like operate properly, a high frame rate is required, which places an additional burden on the processing.

Further, in order to obtain the information representing the correspondence between the two-dimensional moving image and the three-dimensional real space, for example, it is necessary to make an advance preparation by carrying out actual measurement and the like and thus, the method is practically difficult.

SUMMARY OF THE INVENTION

The present invention has been made in view of the above circumstances and aims to provide a person tracking method, a person tracking apparatus and a person tracking program storage medium in which information that represents a correspondence between a shot image and a three-dimensional real space is obtained solely based on the shot image without performing actual measurement or the like, and the obtained information is utilized so that a person can be tracked in processing lighter than the tracking processing that employs the Kalman filter or the like.

According to a first aspect of the invention, a person tracking method includes:

a correspondence calculation step of calculating a statistically average correspondence between a size of a head of a person appearing on an image taken by a camera and a position representing a height of the head on the taken image, the camera being disposed at a position looking down a measured space and generates image data representing a moving image of a predetermined frame rate by taking the moving image of the measured space;

a head detecting step of detecting, based on each piece of image data representing each of plural measured frame images among plural frame images obtained through image-taking by the camera, a position and a size of a head on each of the measured frame images;

a movement-feature-quantity calculation step of calculating, based on positions and sizes of heads on plural past measured frame images detected in the head detecting step and the correspondence calculated in the correspondence calculation step, a movement feature quantity that represents a possibility that a head on a current measured frame image detected in the head detecting step is a head that belongs to the same person as a person having the heads on the past measured frame images; and a same-person determination step of determining, by using the movement feature quantity calculated in the movement-feature-quantity calculation step, whether the head on the current measured frame image is the head that belongs to the same person as the person having the heads on the past measured frame images.

In the person tracking method of the present invention, the correspondence between the size of the head appearing on the shot image and the position representing the height of the head on the shot image is obtained, the movement feature quantity is calculated based on the correspondence, and processing for associating the heads with each other over the plural measured frame images is performed based on the movement feature quantity. According to this person tracking method, it is possible to track a person through the processing lighter than that of the method using the Kalman filter or the like.

In the person tracking method of the present invention, it is preferable that the movement-feature-quantity calculation step is a step of calculating the movement feature quantity based on a ratio between a uniform movement distance and a between-head distance, the uniform movement distance being a distance between an intersection point and a first head position, the intersection point being formed by a border line and a straight line, when the border line of a movement range of the head that belongs to the same person as the person of the heads on the past measured frame images is set on the current measured frame image based on the positions and sizes of the heads on the plural past measured frame images detected in the head detecting step as well as based on the correspondence calculated in the correspondence calculation step, the straight line passing through the first head position that is a position of a head on an immediately preceding past measured frame image and a second head position that is the position of the head on the current measured frame image, and the between-head distance being a distance between the first head position and the second head position.

The above additional feature makes it possible to calculate an accurate movement feature quantity.

According to a second aspect of the invention, a person tracking apparatus includes:

a storage section that sores a statistically average correspondence between a size of a head of a person appearing on an image taken by a camera and a position representing a height of the head on the taken image, the camera being disposed at a position looking down a measured space and generates image data representing a moving image of a predetermined frame rate by taking the moving image of the measured space;

a head detecting section that detects, based on each piece of image data representing each of plural measured frame images among plural frame images obtained through image-taking by the camera, a position and a size of a head on each of the measured frame images;

a movement-feature-quantity calculation section that calculates, based on positions and sizes of heads on plural past measured frame images detected by the head detecting section and the correspondence stored in the storage section, a movement feature quantity that represents a possibility that a head on a current measured frame image detected by the head detecting section is a head that belongs to the same person as a person having the heads on the past measured frame images; and a same-person determination section that determines, by using the movement feature quantity calculated by the movement-feature-quantity calculation section, whether the head on the current measured frame image is the head that belongs to the same person as the person having the heads on the past measured frame images.

Here, in the person tracking apparatus, it is preferable that the movement-feature-quantity calculation section calculates the movement feature quantity based on a ratio between a uniform movement distance and a between-head distance, the uniform movement distance being a distance between an intersection point and a first head position, the intersection point being formed by a border line and a straight line, when the border line of a movement range of the head that belongs to the same person as the person of the heads on the past measured frame images is set on the current measured frame image based on the positions and sizes of the heads on the plural past measured frame images detected in the head detecting section as well as based on the correspondence calculated in the correspondence calculation section, the straight line passing through the first head position that is a position of a head on an immediately preceding past measured frame image and a second head position that is the position of the head on the current measured frame image, and the between-head distance being a distance between the first head position and the second head position.

According to a third aspect of the invention, a person tracking program storage medium stores a person tracking program that is executed in an operational apparatus and causes the operational apparatus to operate as a person tracking apparatus, the person tracking apparatus including:

a storage section that sores a statistically average correspondence between a size of a head of a person appearing on an image taken by a camera and a position representing a height of the head on the taken image, the camera being disposed at a position looking down a measured space and generates image data representing a moving image of a predetermined frame rate by taking the moving image of the measured space;

a head detecting section that detects, based on each piece of image data representing each of plural measured frame images among plural frame images obtained through image-taking by the camera, a position and a size of a head on each of the measured frame images;

a movement-feature-quantity calculation section that calculates, based on positions and sizes of heads on plural past measured frame images detected by the head detecting section and the correspondence stored in the storage section, a movement feature quantity that represents a possibility that a head on a current measured frame image detected by the head detecting section is a head that belongs to the same person as a person having the heads on the past measured frame images; and a same-person determination section that determines, by using the movement feature quantity calculated by the movement-feature-quantity calculation section, whether the head on the current measured frame image is the head that belongs to the same person as the person having the heads on the past measured frame images.

In the person tracking program storage medium storing the person tracking program, it is preferable that the movement-feature-quantity calculation section calculates the movement feature quantity based on a ratio between a uniform movement distance and a between-head distance, the uniform movement distance being a distance between an intersection point and a first head position, the intersection point being formed by a border line and a straight line, when the border line of a movement range of the head that belongs to the same person as the person of the heads on the past measured frame images is set on the current measured frame image based on the positions and sizes of the heads on the plural past measured frame images detected in the head detecting section as well as based on the correspondence calculated in the correspondence calculation section, the straight line passing through the first head position that is a position of a head on an immediately preceding past measured frame image and a second head position that is the position of the head on the current measured frame image, and the between-head distance being a distance between the first head position and the second head position.

As described above, according to the present invention, it is possible to track a person through the processing lighter than that of the method using the Kalman filter or the like.

BRIEF DESCRIPTION OF THE DRAWINGS

FIG. 37 is an explanatory diagram of weighting the teacher image;

FIG. 38 is an explanatory diagram of a weighting method in making a transition to learning of a 16-by-16-pixel filter after an 8-by-8-pixel filter is extracted;

DETAILED DESCRIPTION OF THE INVENTION

Exemplary embodiments of the invention will be described below with reference to the drawings.

First, an outline of processing to be performed in the present embodiments whose description will be provided later will be described below.

Incidentally, here, plural embodiments whose description will be provided later will be described comprehensively and therefore, not all of these embodiments include the entire processing described here.

Figure 1:
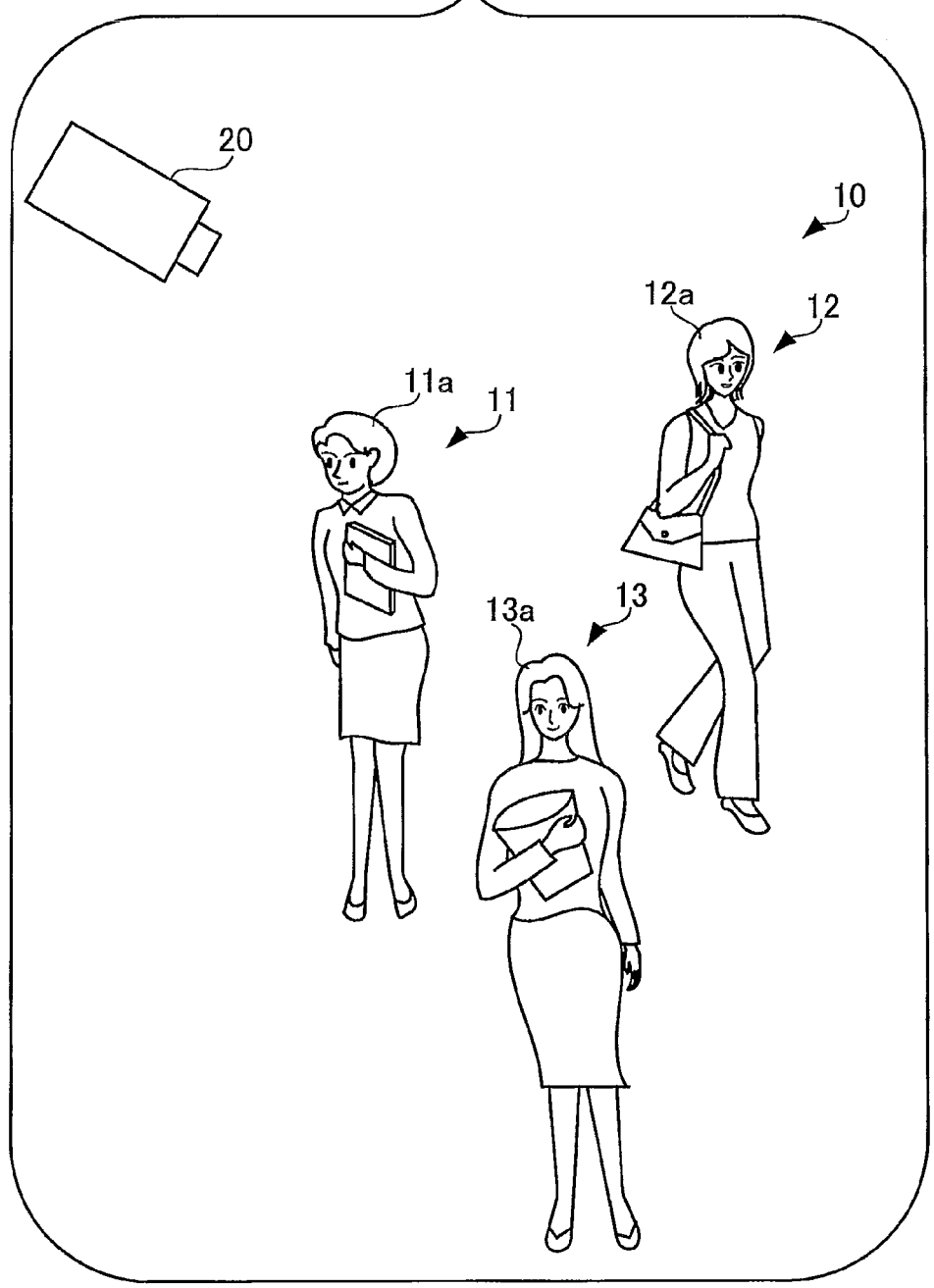
FIG. 1 is a schematic diagram that illustrates a state in which a measured space whose image is taken by a camera.

FIG. 1 is a schematic diagram that illustrates a state in which a measured space whose image is taken by a camera.

Here, there are three persons 11, 12 and 13 in a measured space 10 and they are freely moving. This measured space 10 is, for example, inside a certain single store. Further, here, a camera 20 is disposed at a position obliquely looking down the measured space 10. This camera 20 takes a moving image of the measured space 10 and generates image data that represents the moving image having a predetermined frame rate. An image including the three persons 11, 12 and 13 in the measured space 10 is shot by the camera 20, and an area on the shot image where heads 11a, 12a and 13a of the respective persons 11, 12 and 13 appear is extracted based on image data obtained as result of shooting by the camera 20. Here, this is referred to as "detection of head". The positions of the three persons 11, 12 and 13 on the moving image obtained by the camera 20 change every moment, and a new person may enter the measured space 10, or anyone in the measured space 10 may leave the measured space 10.

Here, in such an environment, based on the image data obtained as result of the shooting by the camera 20, detection of the heads of the persons, calculation of the feature quantities of the persons, calculation of a relevance ratio between the feature quantities, and the like are performed and further, whether the heads detected within different frame images belong to the same person is determined, thereby movements of each person in the measured space 10 is tracked.

Figure 2:
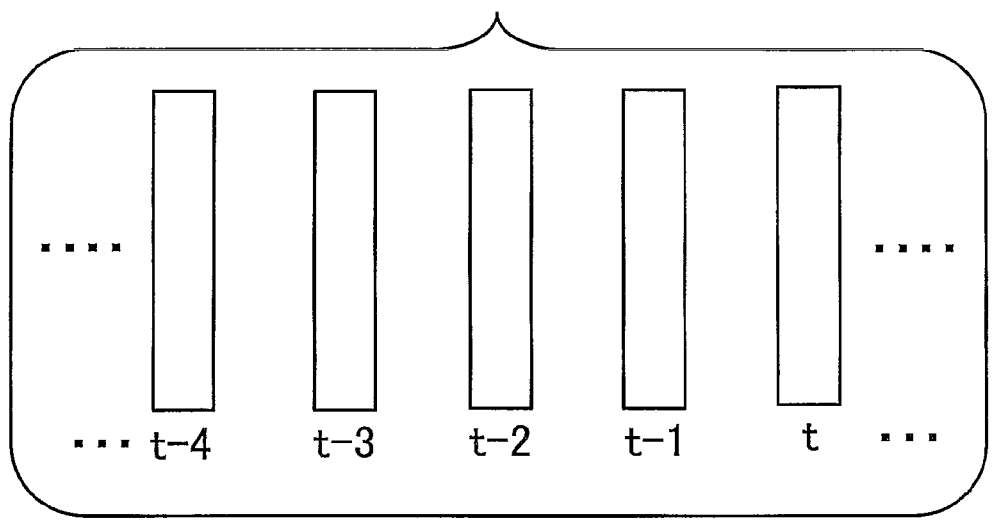
FIG. 2 is a diagram that illustrates plural frame images of a moving image obtained as a result of shooting by the camera.

FIG. 2 is a diagram that illustrates plural frame images of a moving image obtained as a result of shooting by the camera. Here, frame images taken at the respective times, namely ". . . , t−4, t−3, t−2, t−1 and t, . . ." are each schematically indicated by a slim vertical frame.

Incidentally, each frame image illustrated here may be a frame image according to the frame rate of the camera 20, or may be an image obtained by thinning out the frame images of the frame rate in accordance with a purpose of the person tracking here, an amount of arithmetic processing, necessary precision and the like. For example, in a case in which the camera 20 generates thirty frame images per second, each of the frame images indicated by the respective vertical frames in FIG. 2 may be an image acquired every nine frames, namely an image based on a rate of three frames per second, as a result of the thinning out.

Figure 3:
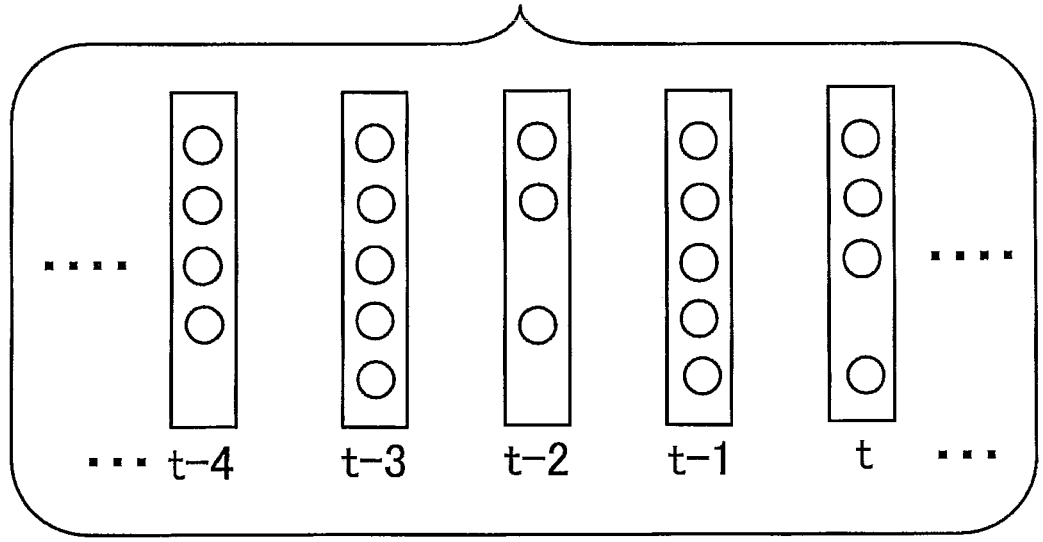
FIG. 3 is a diagram in which heads detected on each frame image are schematically indicated by circles.

FIG. 3 is a diagram in which heads detected on each frame image are schematically indicated by circles.

For example, four heads are detected on the frame image at the time t−4, and five heads are detected on the frame image at the time t−3. Other frame images have detected heads in a similar manner.

Figure 4:
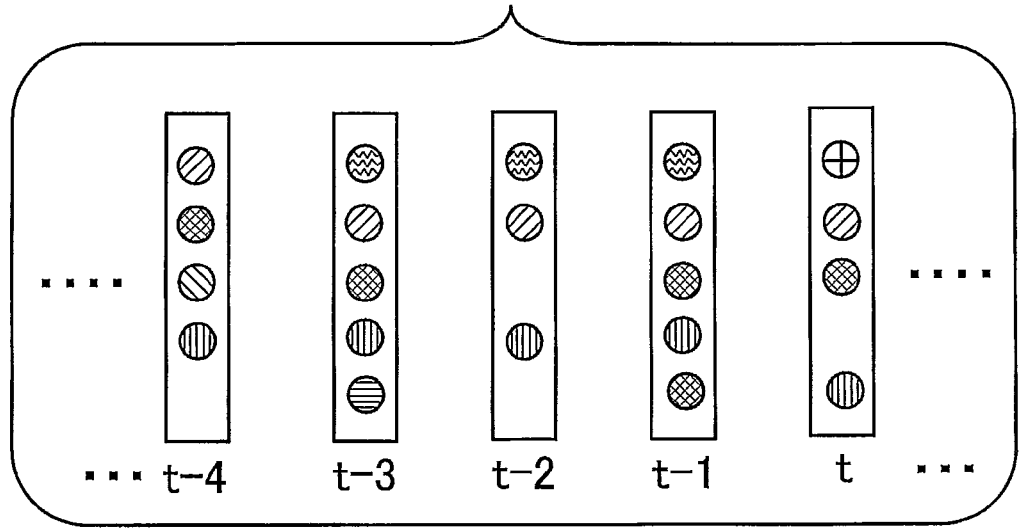
FIG. 4 is a diagram that illustrates a feature quantity of the person of each head.

FIG. 4 is a diagram that illustrates a feature quantity of the person of each head. How to determine the feature quantity will be described later.

The design in the circle representing each head schematically illustrates the determined feature quantity. The heads having the same design indicate that their feature quantities are similar to each other.

Figure 5:
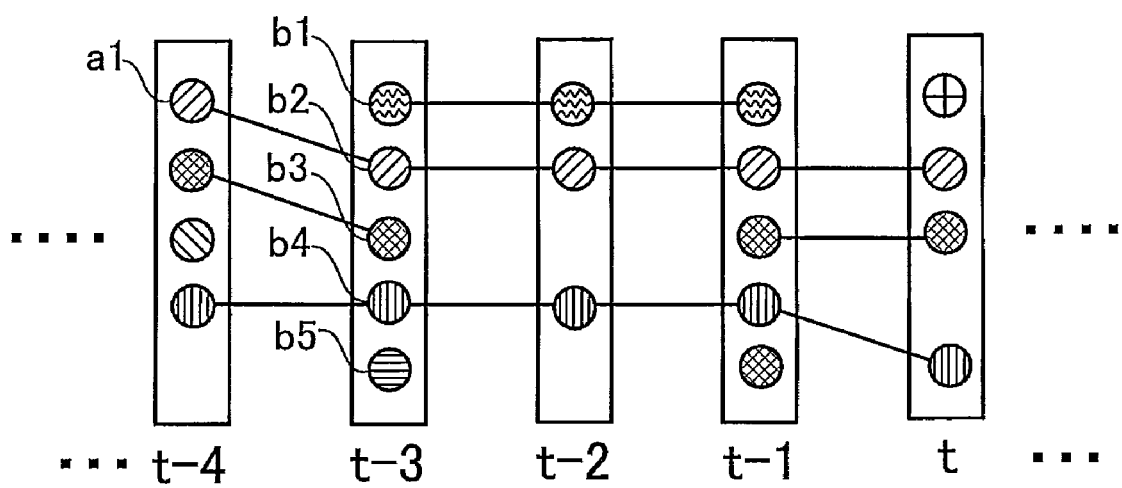
FIG. 5 is a diagram that illustrates similar feature quantities being associated with each other.

FIG. 5 is a diagram that illustrates similar feature quantities being associated with each other.

Here, there is determined a relevance ratio, which represents to what degree the feature quantities are similar to each other, between the feature quantity of a head a1 on the frame image at t−4 and each of the feature quantities of respective heads b1, b2, b3, b4 and b5 on the frame image at t−3. Based on each of these relevance ratios, it is determined which one of the persons having the heads b1, b2, b3, b4 and b5 is identical to the person having the head a1, and the heads determined as belonging to the same person are associated with each other.

Incidentally, as for a movement feature quantity that will be described later, the movement feature quantity per se represents a relevance ratio between the heads at two different times. Therefore, when only the movement feature quantity is employed as the feature quantity, the step of determining the relevance ratio described here, separate from the calculation of the feature quantity, does not exist.

Here, among the heads b1, b2, . . . , and 5b, the head associated with the head 1a has a relevance ratio with the highest degree of agreement between the feature quantities among the relevance ratios between each of pairs of two heads a1 and b1, a1 and b2, a1 and b3, a1 and b4 and a1 and b5. Further, merely having the relevance ratio with the highest degree is insufficient, and the degree of agreement needs to be beyond a first threshold. This is because when only one head on the frame image at t−3 is detected, the relevance ratio between the head a1 and the one head detected on the frame image at t−3 is assumed to be the highest, but there is a possibility that the one head detected on the frame image at t−3 may be a noise erroneously detected as a head.

Here, the head b2 among the five heads b1, b2, . . . , and b5 on the frame image at t−3 meets the above condition and is associated with the head a1. Other heads are associated with each other in a similar manner.

Figure 6:
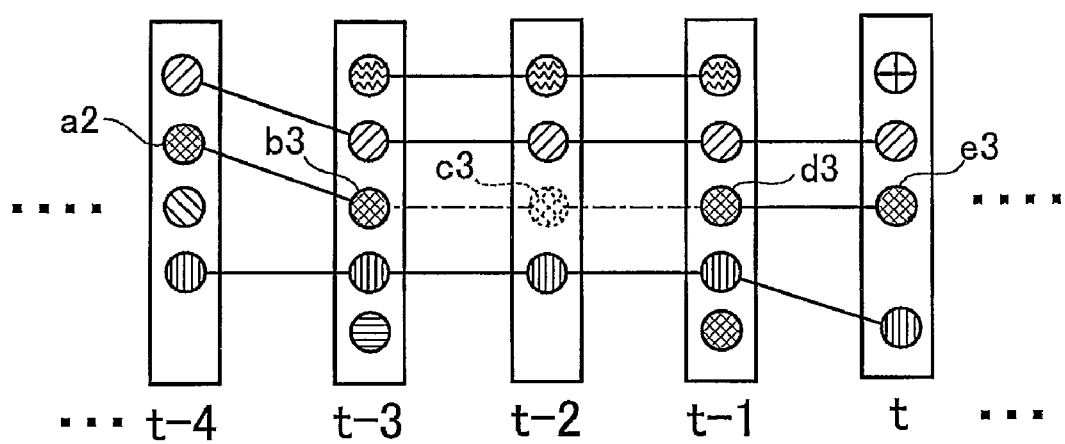
FIG. 6 is a conceptual diagram of associating processing when there is a break in consecution.

FIG. 6 is a conceptual diagram of associating processing when there is a break in consecution.

It is assumed that the head a2 and the head b3 are associated with each other, and a head d3 and a head e3 are associated with each other, in the manner described with reference to FIG. 5. However, on the frame image at t−2, no head to be associated with either a2 and b3 or d3 and e3 is detected. In this situation, a first average feature quantity that is an average of the feature quantity related to the head a2 and the feature quantity related to the head b3 is calculated; and a second average feature quantity that is an average of the feature quantity related to the head d3 and the feature quantity related to the head e3 is similarly calculated. Subsequently, a relevance ratio between the first average feature quantity and the second average feature quantity is calculated. When the relevance ratio is equal to or more than a certain third threshold, it is determined that the heads a2 and b3 and the heads d3 and e3 belong to the same person and then, a head c3 is added assuming that the head c3 is present as a head that belongs the same person along a line smoothly connecting the heads a2 and b3 to the heads d3 and e3, on the frame rate at t−2.

Here, the third threshold is not required to be the same as the first threshold, and a threshold suitable for this situation is determined as the third threshold.

Incidentally, when the average feature quantity is determined, there is particularly no limit to the number of frame images for each of the front portion and the rear portion whose feature quantities are used to determine the average value or to the number of sequential frame images for which missing heads are generated. These numbers of frame images are determined according to the purpose of person tracking, necessary precision and the like.

Figure 7:
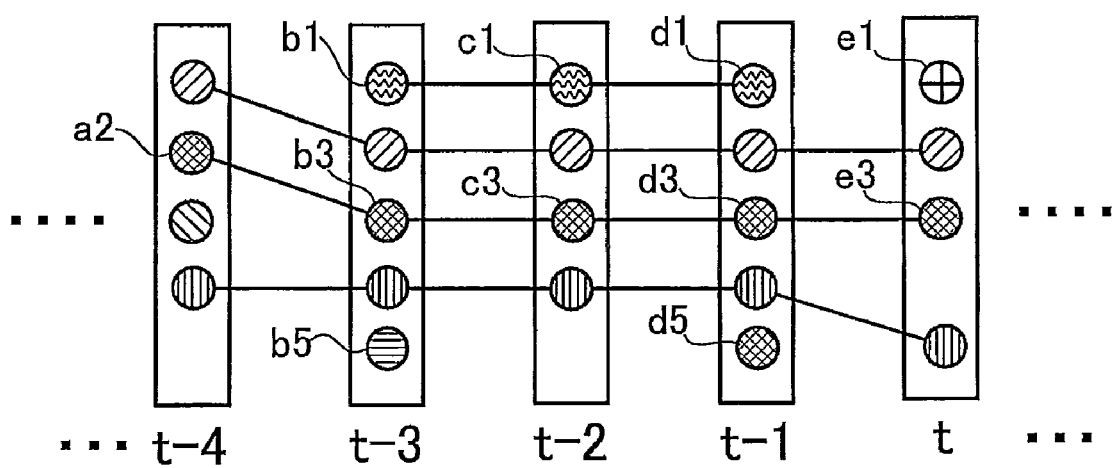
FIG. 7 is a conceptual diagram that illustrates a result of the associating processing when there is the break in consecution.

FIG. 7 is a conceptual diagram that illustrates a result of the associating processing when there is the break in consecution.

Here, the head c3 is added as the head existing on the frame image at t−2 by the processing described with reference to FIG. 6, and the head 3c is associated with the heads a2 and b3 and the heads d3 and e3 in the front frame image and the back frame image, respectively, as the heads belong to the same person. However, each of the head b5, a head d5 and a head e1 exists alone without being associated with other head. Further, the heads b1, c1 and d1 are associated with each other only in the three frame images at t−3, t−2 and t−1, without being associated with the front and rear frame images. Here, the head existing alone and the head associated with only a partial sequential frame images are assumed to be results of error detection due to some noise or the like and thus deleted.

Figure 8:
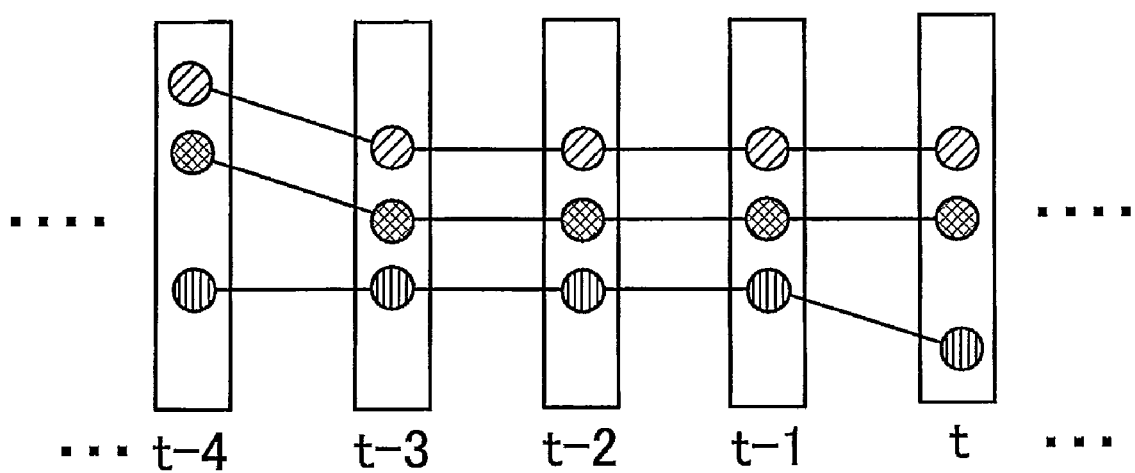
FIG. 8 is a diagram that illustrates heads on each frame image obtained finally and being associated with each other.

FIG. 8 is a diagram that illustrates heads on each frame image obtained finally and being associated with each other.

Here, as illustrated in FIG. 8, movements of three persons are precisely tracked.

Based on the above outline, the embodiments of the present invention will be further described.

Figure 9:
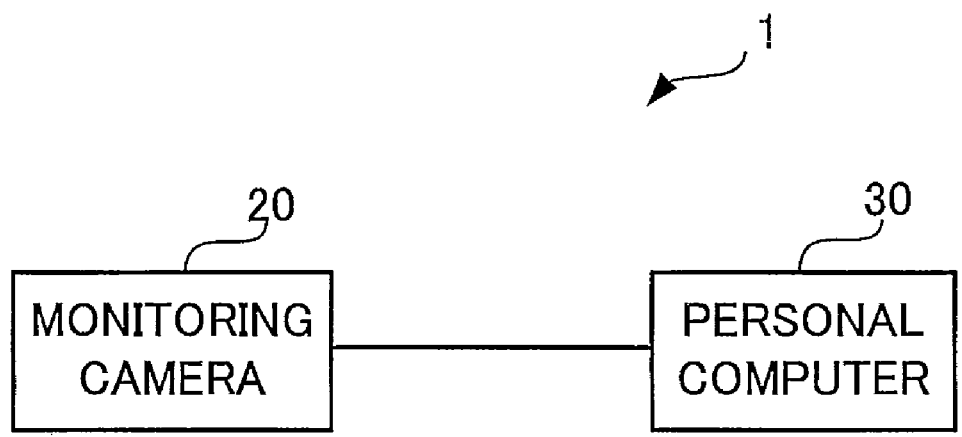
FIG. 9 is a schematic diagram of a monitoring camera system in which an embodiment of the invention is incorporated.

FIG. 9 is a schematic diagram of a monitoring camera system in which an embodiment of the invention is incorporated.

In the schematic diagram of a monitoring camera system 1 in FIG. 9, a monitoring camera 20 and a personal computer 30 serving as an embodiment of the person tracking apparatus according to the invention are illustrated.

For example, the monitoring camera 20 is placed so as to look down the inside of a store to take a picture of the state in the store. The monitoring camera 20 is connected to the personal computer 30, and the monitoring camera 20 transmits image data expressing a moving image to the personal computer 30. Hereinafter the image on the data is simply referred to as "image".

The personal computer 30 receives the moving image transmitted from the monitoring camera 20.

The detailed description of the monitoring camera 20 is omitted because the monitoring camera 20 is not the main subject of the invention, and hereafter, the personal computer 30 serving as the person detecting apparatus that is one embodiment of the invention will be further described.

Figure 10:
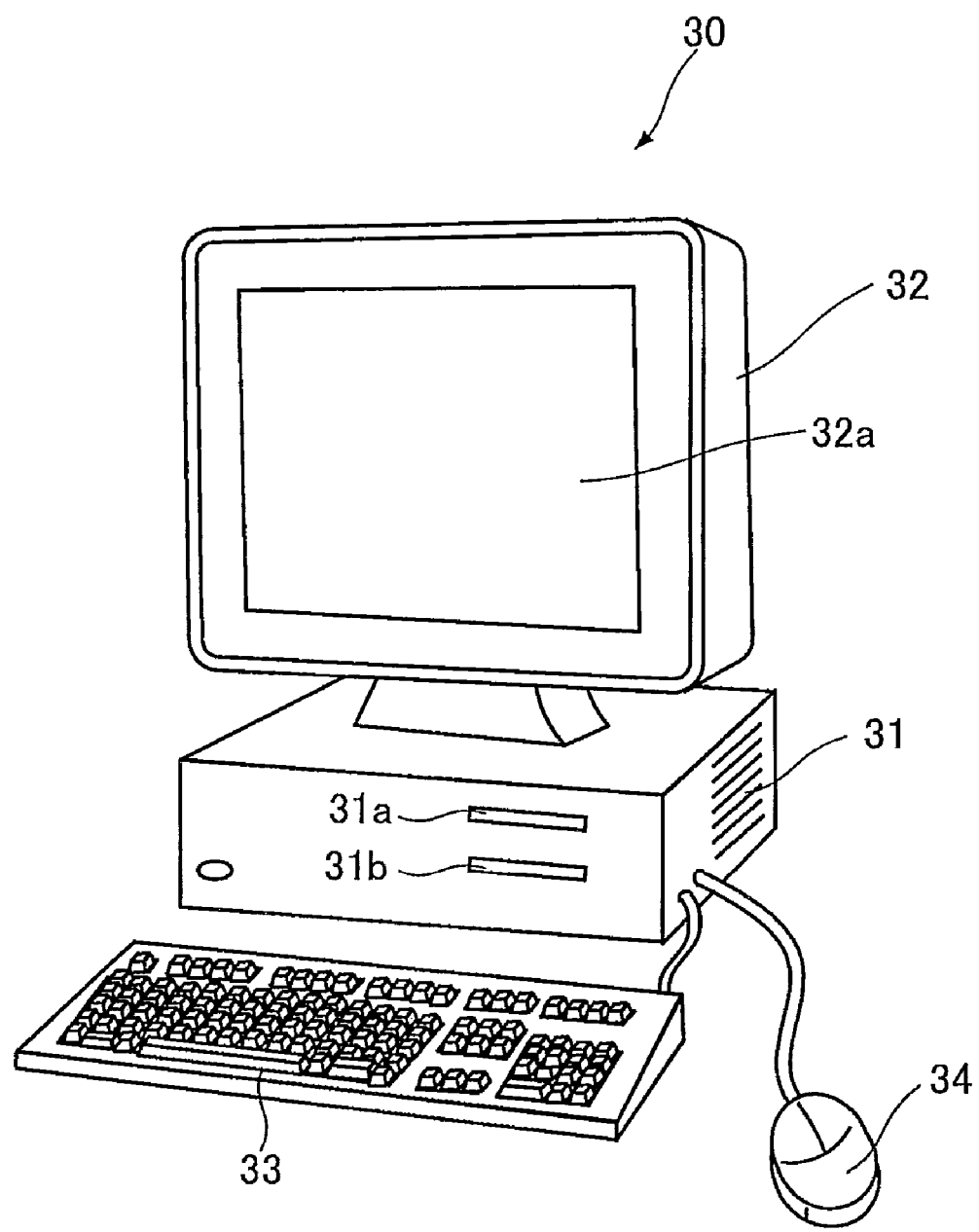
FIG. 10 is a perspective diagram showing an external appearance of the personal computer shown by one block in FIG. 9.
Figure 11:
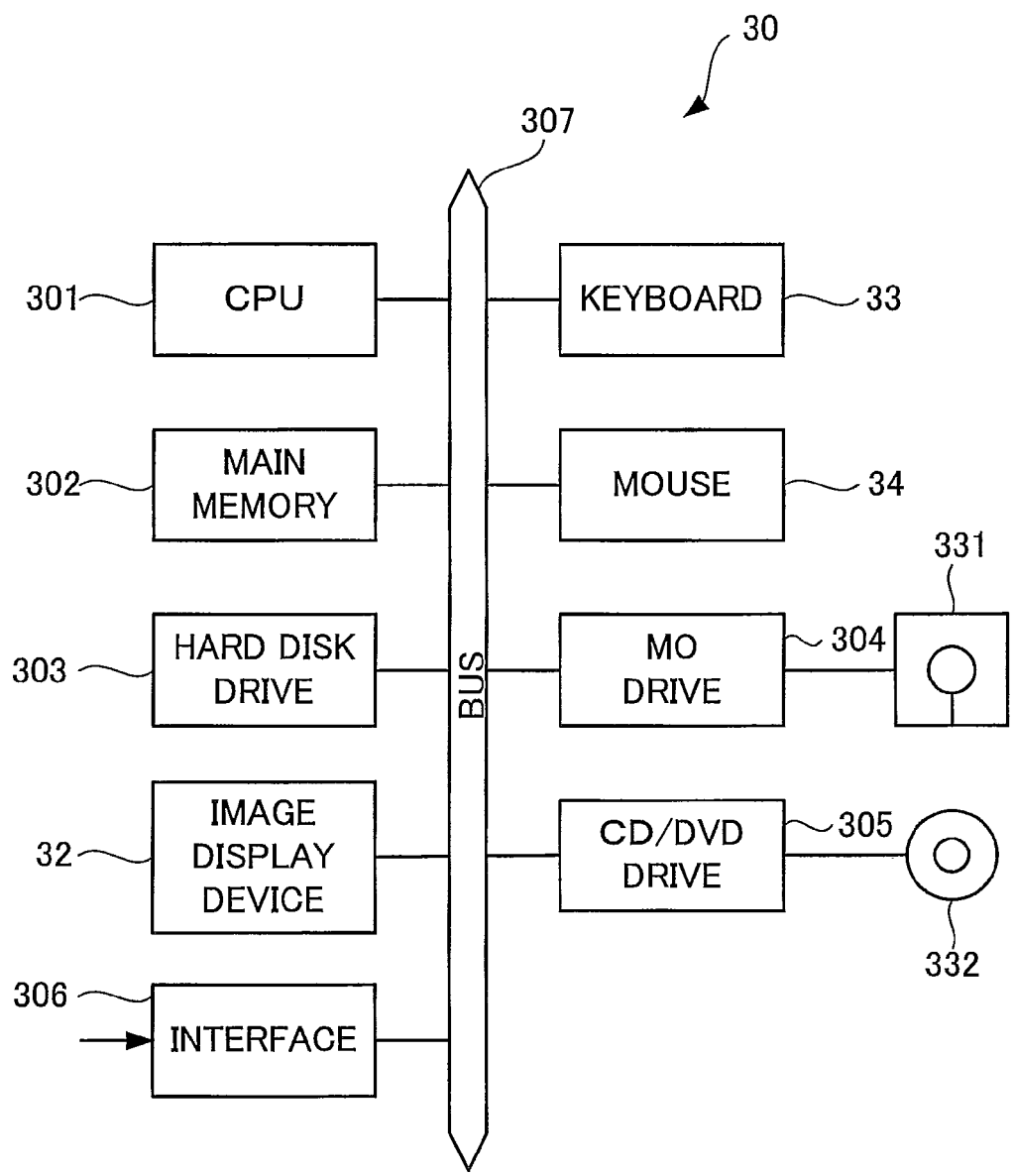
FIG. 11 is a hardware configuration diagram of the personal computer.

FIG. 10 is a perspective diagram showing an external appearance of the personal computer 30 shown by one block in FIG. 9, and FIG. 11 is a hardware configuration diagram of the personal computer 30.

Here, hardware and OS (Operating System) of the personal computer 30 and a person tracking program that is installed in and executed by the personal computer 30 constitutes the person tracking apparatus that is one embodiment of the invention.

Outwardly, the personal computer 30 is equipped with a main body 31, an image display device 32, a keyboard 33, and a mouse 34. The image display device 32 displays images on a display screen 32a according to an instruction provided from the main body 31. The keyboard 33 feeds various pieces of information into the main body 31 according to a key manipulation. The mouse 34 specifies an arbitrary position on the display screen 32a to feed an instruction corresponding to an icon displayed at the position at that time. From the appearance, the main body 31 includes an MO loading port 31a through which a magneto-optical disk (MO) is loaded and a CD/DVD loading port 31b through which a CD or a DVD is loaded.

As shown in FIG. 11, the main body 31 includes a CPU 301, a main memory 302, a hard disk device 303, an MO drive 304, a CD/DVD drive 305, and an interface 306. The CPU 301 executes various programs. In the main memory 302, a program stored in the hard disk device 303 is read and expanded, and executed by the CPU 301. The various programs and pieces of data are stored in the hard disk device 303. The MO 331 is loaded into the MO drive 304, and the MO drive 304 accesses the loaded MO 331. A CD or a DVD (in this cases, CD and DVD are referred to as CD/DVD while not distinguished from each other) is loaded in the CD/DVD drive 305, and the CD/DVD drive 305 accesses the CD/DVD 332. The interface 306 receives the image data taken by the monitoring camera 20. These various types of components and the image display device 32, keyboard 33, and mouse 34 in FIG. 2 are connected with each other through a bus 307.

Here, a person tracking program is stored in the CD/DVD 332, which causes the personal computer to serve as the person tracking apparatus. The CD/DVD 332 is loaded into the CD/DVD drive 305, and the person tracking program stored in the CD/DVD 332 is uploaded in the personal computer 30 and stored in the hard disk device 303. The person tracking program stored in the hard disk device 303 is read from the hard disk device 303 and expanded on the main memory 302 and executed by the CPU 301, thereby causing the personal computer 30 to serve as the person tracking apparatus.

Further, the hard disk device 303 also stores, in addition to the person tracking program, various kinds of support programs for realizing the processing that will be described later. The support programs include: a program for execution of processing for calculating a statistically average correspondence between the size of the head of a person appearing on an image shot by the camera 20 and the position representing the height on an operated image; an image processing program for displaying an image on the display screen 32a of the image display device 32 and subjecting the image to various kinds of image processing according to an operation of the operator, such as magnifying the image vertically and horizontally in an independent manner, rotating the image and cutting out a part of the image; and a program for extracting a filter by performing machine learning that will be described later.

Figure 12:
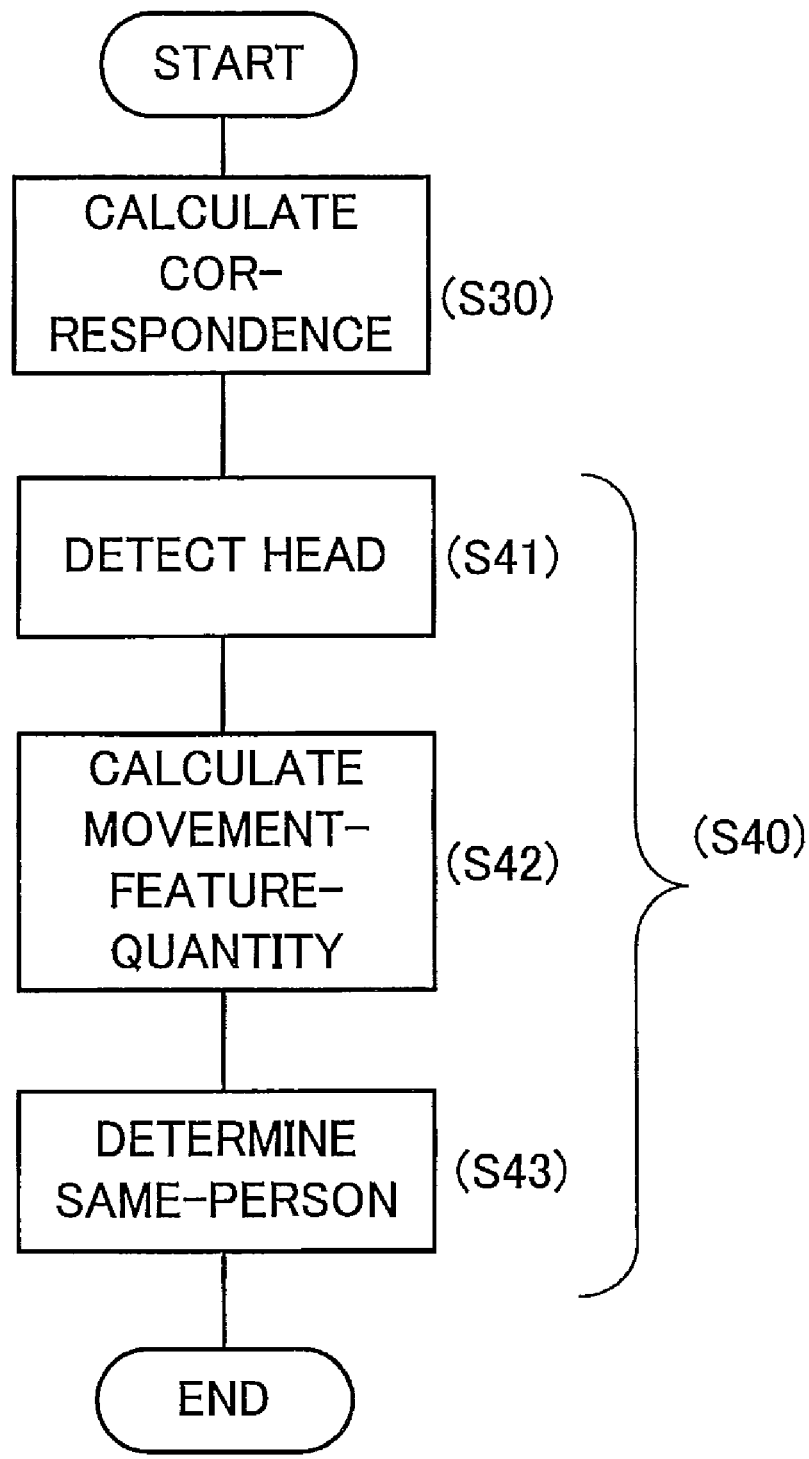
FIG. 12 is a flowchart showing an example of a person tracking method.

FIG. 12 is a flowchart showing an example of a person tracking method performed by using the personal computer 30 shown in FIGS. 9 to 11.

This person tracking method includes a correspondence calculation step (S30) and a person tracking step (S40). The person tracking step (S40) includes a head detecting step (S41), a movement-feature-quantity calculation step (S42) and a same-person determination step (S43). The correspondence calculation step (S30) of the person tracking method illustrated in FIG. 12 is a step to prepare for the person tracking step (S40), and the person tracking step (S40) is equivalent to one embodiment of the person tracking method according to the present invention. Each step will be described later in detail.

Figure 13:
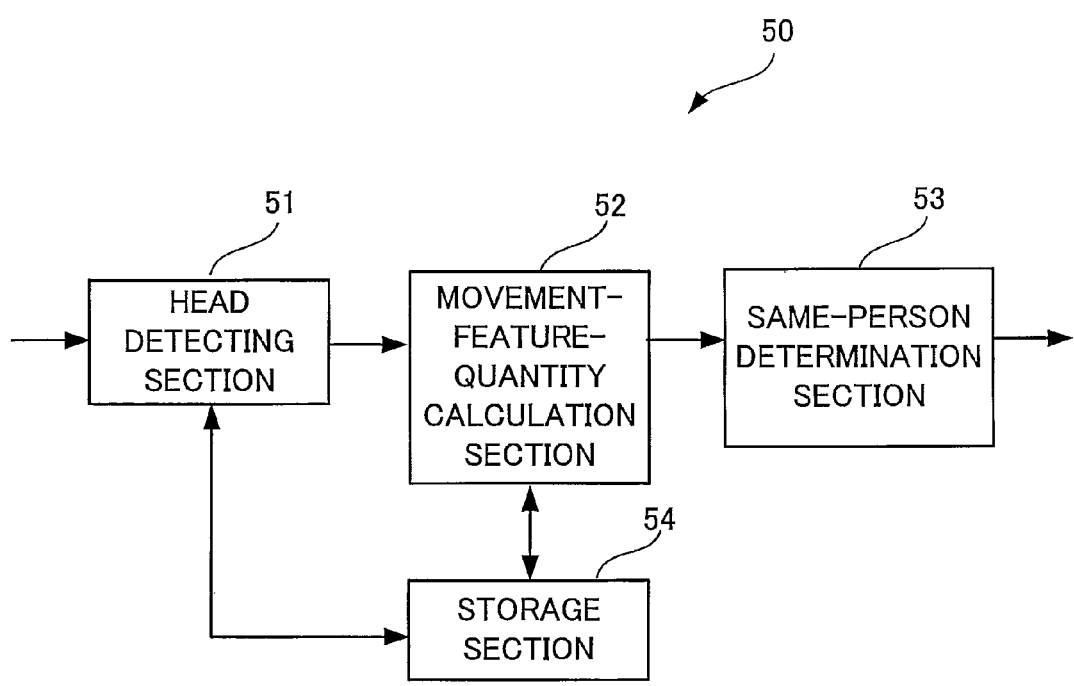
FIG. 13 is a block diagram showing an example of a person tracking apparatus.

FIG. 13 is a block diagram showing an example of the person tracking apparatus. This is a person tracking apparatus 50 that is an algorithm realized in the personal computer 30 when the person tracking program uploaded to the personal computer 30 illustrated in FIGS. 9 to 11 is executed in the personal computer 30. The person tracking apparatus 50 includes a head detecting section 51, a movement-feature-quantity calculation section 52, a same-person determination section 53 and a storage section 54.

In comparison with the person tracking method illustrated in FIG. 12, the head detecting section 51, the movement-feature-quantity calculation section 52 and the same-person determination section 53 correspond to the head detecting step (S41), the movement-feature-quantity calculation step (S42) and the same-person determination step (S43) illustrated in FIG. 12, respectively.

Further, the storage section 54 stores the correspondence calculated in the correspondence calculation step (S30), and this correspondence is referred to by the movement-feature-quantity calculation section 52.

Since the action of the person tracking program when executed in the personal computer 30 is identical to that of the person tracking apparatus shown in FIG. 13, the illustration and description of the person tracking program are not repeated here.

Hereafter, the action of each section in the person tracking apparatus 50 shown in FIG. 13 will be summarized. This description also serves as explanations of the person tracking program and each step in the person tracking method shown in FIG. 12.

The head detecting section 51 of the person tracking apparatus 50 illustrated in FIG. 13 serves to detect, based on image data representing a moving image at a predetermined frame rate generated as a result of shooting the moving image of a measured space by a camera, a head on each of measured frame images, for each of the measured frame images among plural frame images forming the moving image. Here, a two-dimensional position of the head on the measured frame image and the vertical and lateral sizes of the head are detected. The camera used here is, as illustrated in FIG. 1, a camera that is disposed at the position obliquely looking down the measured space and shoots an image of the measured space. Here, "frame image" and "measured frame image" are described as different concepts. However, as mentioned above, the measured frame images may be frame images forming the moving image obtained as a result of shooting by the camera, or may be frame images thinned out, for example, every 3, 10 or 30 frames. In the following, these may be merely referred to as "frame images" without being distinguished from each other.

Further, as mentioned above, the storage section 54 stores the correspondence calculated in the correspondence calculation step (S30) illustrated in FIG. 12. The correspondence stored in the storage section 54 is a statistically average correspondence between: the size of the head of a person appearing on an image shot by the above-described camera, namely the camera, which is disposed at the position obliquely looking down the measured space and generates the image data representing the moving image of the measured space at the predetermined frame rate obtained by the shooting; and the position representing the height on the shot image.

In the movement-feature-quantity calculation section 52, based on the position and size of the head on the plural past frame images detected by the head detecting section 51 and also based on the correspondence stored in the storage section, there is calculated a movement feature quantity representing a probability that the head on the current frame image detected by the head detecting section 51 is a head of the same person as the person having the heads on the past frame images. Although the details will be described later, this movement feature quantity is calculated based on a ratio between a uniform movement distance and a between-head distance. The uniform movement distance is a distance between: an intersection point of a border line, when this border line that demarcates a movement range of the head belonging to the same person as the person of the heads on the past frame images is set on the current frame image based on the positions and sizes of the heads on the past frame images detected by the head detecting section 51 and also based on the correspondence stored in the storage section, and a straight line passing through a first head position that is the position of the head on the immediately preceding frame image and a second head position that is the position of the head on the current frame image; and the first head position. The between-head distance is a distance between the first head position and the second head position.

Further, in the same-person determination section 53, it is determined, by using the movement feature quantity calculated in the movement-feature-quantity calculation section 52, whether the head on the current frame image is a head of the same person as the person having the head in the past frame image.

Now, there will be described the processing of calculating the correspondence stored in the same-person determination section 53 and the processing of calculating the movement feature quantity in the movement-feature-quantity calculation section 52.

Figure 14:
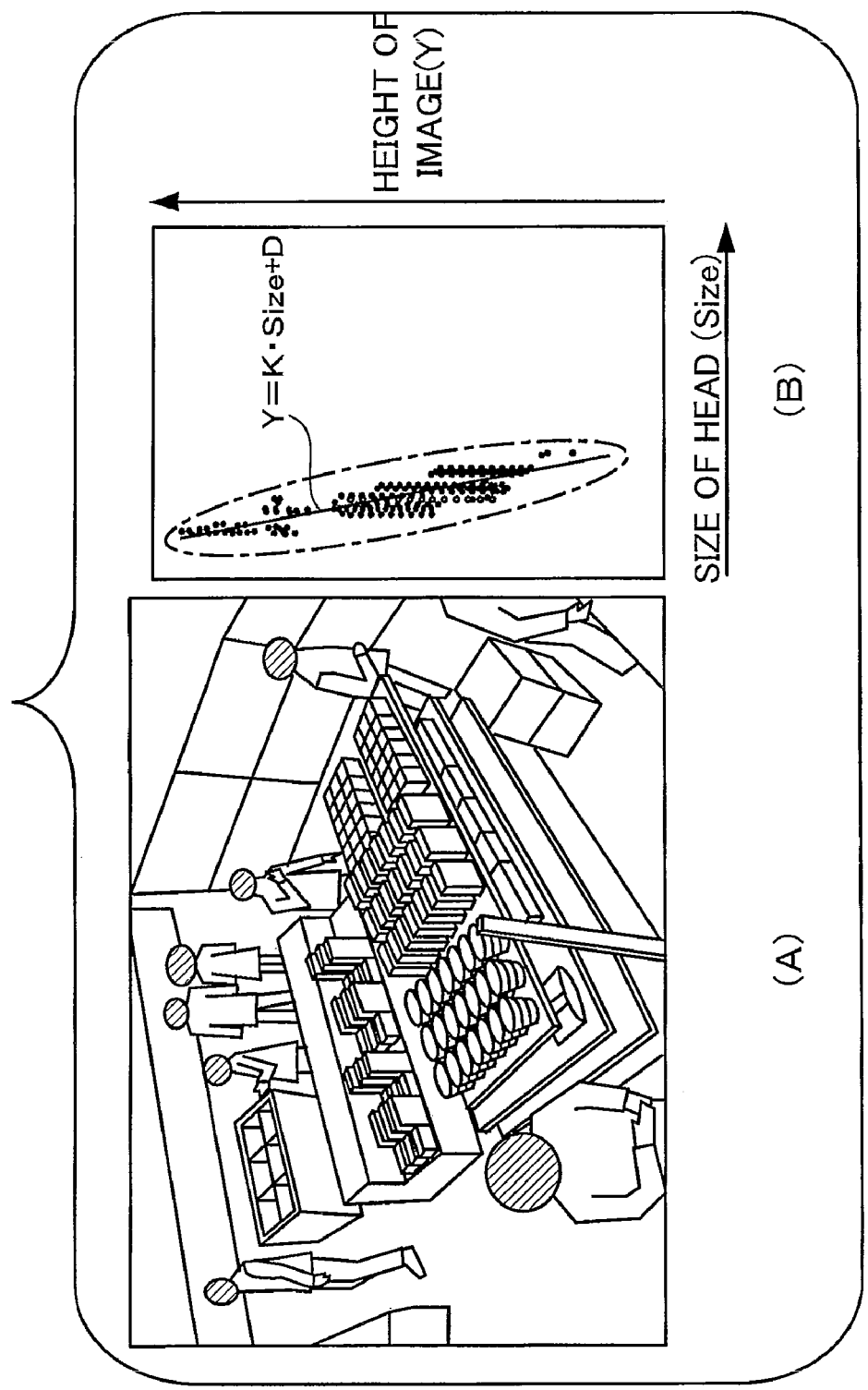
FIG. 14 is a diagram that illustrates an image obtained by shooting the image of a state within a certain store in part (A) and a distribution of the sizes of heads in part (B)

FIG. 14 is a diagram that illustrates an image obtained by shooting the image of a state within a certain store containing an example of the measured space in part (A) and a distribution of the sizes of heads in part (B).

In the store illustrated in part (A) of FIG. 14, a camera is disposed at a position obliquely looking down the inside of the store (see FIG. 1), and an image of ever-changing movements of people within the store is shot by the camera. Part (A) of FIG. 14 illustrates one, in a single frame, of the shot image. The head of each person appearing on this shot image is indicated by a hatched circle.

When an image of the inside of the store is shot from obliquely above, as illustrated in part (A) of FIG. 14, persons closer to the camera appear in a lower part with their heads looking large, whereas persons away from the camera appear in an upper part with their heads looking small.

Part (B) of FIG. 14 illustrates a relationship between the sizes of the heads and the positions indicating the heights within the shot images, which are obtained by shooting images of multiple views inside the store with the disposed camera. As illustrated in part (B) of FIG. 14, statistically, large-size heads appear in a lower part while small-size heads appear in an upper part.

Here, as illustrated in part (B) of FIG. 14, a size distribution of the heads is studied, the size distribution is approximated by a straight line, and a gradient K and a Y intercept D of the following approximate straight line are calculated.

$$Y = K \cdot \text{Size} + D \quad (1)$$

When a person moves for a certain distance (for example, 1.0 m) within the store, the person moves for a long distance on the shot image in the case where the person is closer to the camera, whereas the person moves for a short distance on the shot image in the case where the person is away from the camera. Therefore, here, based on the statistic (equation (1)) of the sizes of the heads, a moving direction and a distance on the shot image are associated with an actual moving direction and an actual distance within the store.

Here, in the head detecting processing that will be described later, the position of a rectangle surrounding the head of a person on the shot image, and the vertical and lateral sizes of the rectangle are detected. In part (B) of FIG. 14, "Size" on a horizontal axis illustrated indicates the area of the rectangle, while a vertical axis indicates the position representing the height of a central point of the rectangle on the shot image. However, the area of a circle (or an ellipse) inscribed in the rectangle may be treated as the "Size", or the vertical size or the lateral size of the rectangle may be treated as the "Size". Further, a height position Y on the vertical axis also may not be limited to the central point of the rectangle, and may be any point representing the position on the shot image, such as one corner of the rectangle.

If it is possible to obtain various kinds of information such as the height of the installation position of the camera, the direction of a shooting optical axis and the focal length of a shooting lens, the correspondence between the position on the shot image and the actual position within the store can be calculated. In order to do so however, it is necessary to precisely measure and input values of the installation position of the camera, the shooting direction and the like for each measured space in a store or the like, which places a burden of work on a user who sets the camera and besides this, there is no guarantee that precise measured values are input. Therefore, here, as mentioned above, the statistical relationship (equation (1)) between the head sizes on the shot image and the heights on the shot image is determined and used.

How to determine this statistical relationship is not particularly limited. For example, the statistical relationship can be automatically determined upon installation of the camera, by using the head detecting processing that will be described later. It is also possible to automatically determine the statistical relationship once again when the installation position of the camera or the shooting direction is changed. Further, even after the statistical relationship is determined once, it is also possible to further improve the accuracy by increasing the number of pieces of data representing the heads.

In the present embodiment, the above equation (1) is calculated (see part (B) of FIG. 14) and then, the movement feature quantity is calculated based on the following operation expression.

Figure 15:
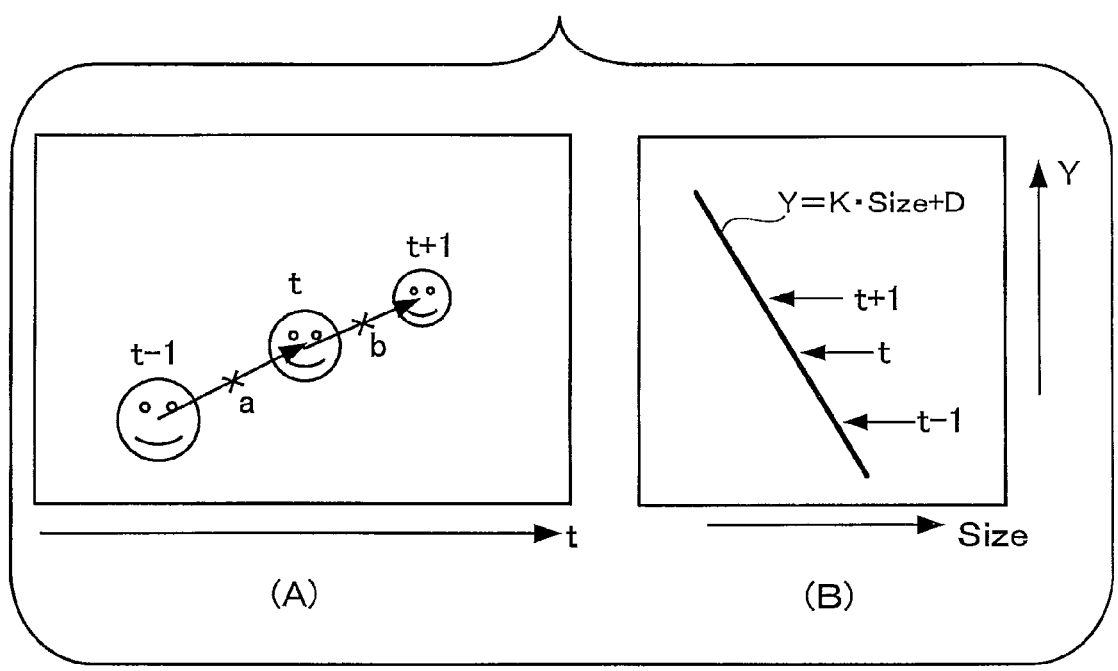
FIG. 15 is a diagram that illustrates a movement of a head on the shot image in part (A) and an approximate straight line between head sizes (Size) and image heights (Y) in part (B)

FIG. 15 is a diagram that illustrates a movement of a head on the shot image in part (A) and an approximate straight line between head sizes (Size) and image heights (Y) in part (B).

Here, temporarily assuming that the movement of the head of the person between a time t−1 and a time t is maintained up to a time t+1, a head position on the shot image at the time t+1 is predicted. When the sizes of the heads on frame images respectively obtained at the time t−1 and the time t are respectively defined as Size (t−1) and Size (t), Size (t+1) that is the size of the head on a frame image obtained at the time t+1 is approximated based on the following equation (2).

$$\text{Size}(t+1) = \text{Size}(t) \times \frac{\text{Size}(t)}{\text{Size}(t-1)} \quad (2)$$

Next, the position of the head on the shot image at the time t+1 is calculated for each of a position X(t+1) in a horizontal direction and a position Y(t+1) in a vertical direction. The position X(t+1) in the horizontal direction at the time t+1 is determined based on the following equation (3), by using positions X(t−1) and X(t) in the horizontal direction of the heads detected on the respective frame images at the time t−1 and the time t, and the Size (t−1) and the Size (t) of the heads.

$$X(t+1) = X(t) + (X(t) - X(t-1)) \times \frac{\text{Size}(b)}{\text{Size}(a)} \quad (3)$$

Here, as illustrated in part (A) of FIG. 15, Size(a) is an intermediate head size between the head size Size (t−1) at the time t−1 and the head size Size(t) at the time t, and Size(b) is an intermediate head size between the head size Size(t) at the time t and the head size Size (t+1) at the time t+1 calculated based on the equation (2).

$$Size(a) = \frac{Size(t-1) + Size(t)}{2} \quad (4)$$

$$Size(b) = \frac{Size(t) + Size(t+1)}{2} \quad (5)$$

Further, the position in the vertical direction at the time t+1 is determined based on the following equation (6) by using the equations (1) and (2).

$$Y(t+1) = K \cdot Size(t+1) + D \quad (6)$$

Next, a movement angle D is determined based on a moving direction of the head between the time t and the time t+1, by using the following equation (7).

$$D = \tan^{-1} \frac{Y(t+1) - Y(t)}{X(t+1) - X(t)} \quad (7)$$

This movement angle D represents a moving direction on the shot image when an actual movement within the store between the time t−1 and the time t is maintained up to the time t+1 by the person on the shot image, namely when a constant-velocity straight-line movement takes place. As described above, the person appearing in the lower part of the shot image moves for a long distance on the shot image when this person moves, for instance, 1.0 m, whereas the person appearing in the upper part of the shot image moves for only a small distance on the shot image even if this person moves for the same distance, namely 1.0 m. Therefore, the moving direction determined based on the equation (7) is not the moving direction within the store, but it is the moving direction on the shot image when the constant-velocity straight-line movement takes place.

Here, a top view of the store when viewed from above will be considered. Here, the following equation (8) in this top view will be taken into consideration.

$$Dist(Angle)) = \alpha \cdot Dist(t-1,t)/[A + B \cdot sign\{cos(Angle)\} \cdot cos^c(Angle)] \quad (8)$$

Here, "Angle" is an angle with respect to a moving direction when it is assumed that the constant-velocity straight-line movement takes place. Dist(Angle) is a distance from an origin in the Angle direction when the head position at the time t is defined as the origin. Here, this Dist(Angle) is referred to as "uniform movement distance" in the Angle direction. Further, Dist(t−1, t) is a moving distance of the head between the time t−1 and the time t, calculated based on the following equation (9). Furthermore, sign{cos(Angle)} is a function that takes "+1" when cos (Angle) is positive or zero and takes "−1" when cos(Angle) is negative. Moreover, each of a, A, B and C is a constant and for example, it is possible to adopt α=1.25, A=3, B=2 and c=2.

$$Dist(t-1,t) = \sqrt{\{X(t-1) - X(t)\}^2 + \{Y(t-1) - Y(t)\}^2} \quad (9)$$

Here, the uniform movement distance represents an estimated movement range at the time t+1, which is calculated based on the moving direction and the moving distance between the time t−1 and the time t. This estimated movement range is a range covering situations such as a case where the constant-velocity straight-line movement is maintained, a case where a moving speed is slightly increased in the same direction, a case where the moving direction is changed laterally, and a case where the movement suddenly stops or an abrupt movement in a reverse direction occurs.

Figure 16:
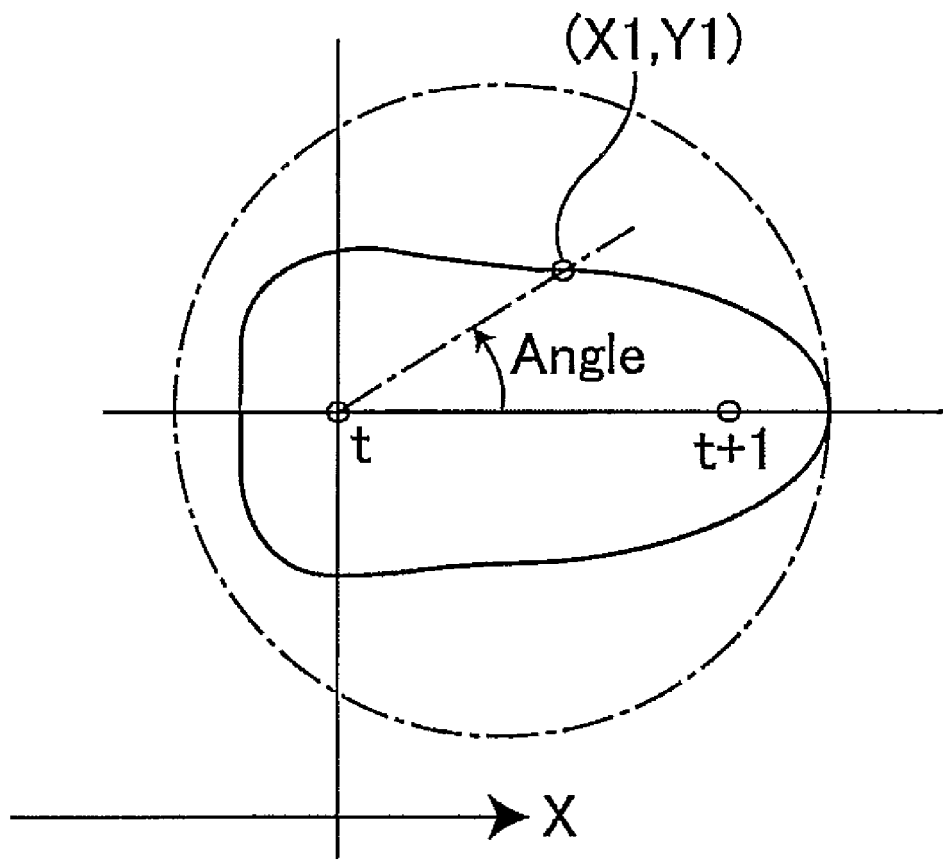
FIG. 16 is a diagram that illustrates a loop drawn in accordance with the equation (8) when there is a movement in the horizontal direction (X direction) in the top view, and a circle.

FIG. 16 is a diagram that illustrates a loop drawn in accordance with the equation (8) when there is a movement in the horizontal direction (X direction) in the top view, and a circle drawn for easy understanding of "way of deforming" that will be described later. Further, FIG. 17 is a similar diagram when there is a movement in the vertical direction (Y direction).

Figure 17:
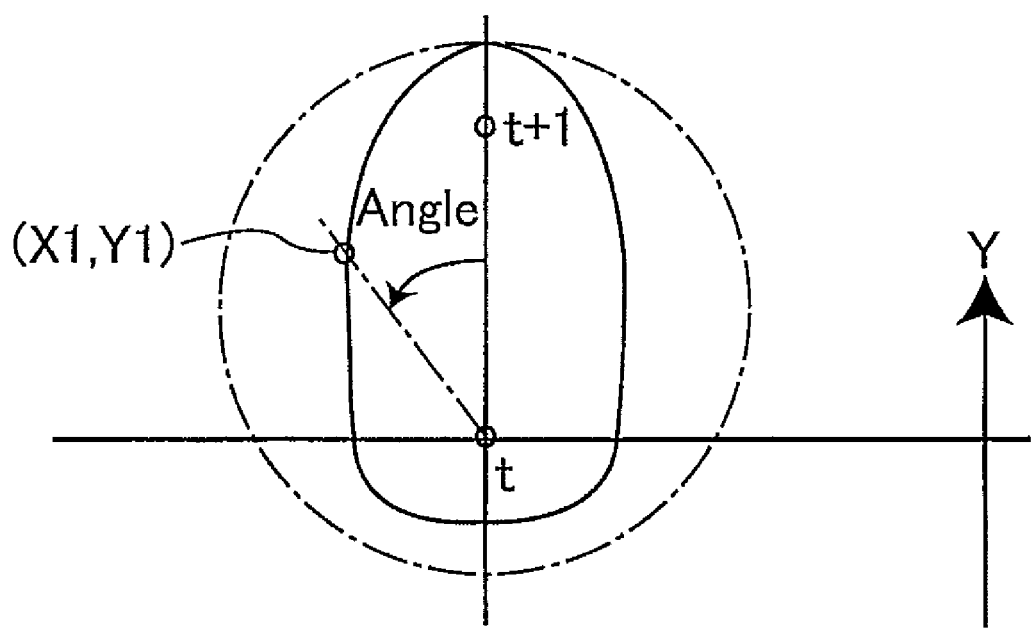
FIG. 17 is a diagram that illustrates a loop drawn in accordance with the equation (8) when there is a movement in the vertical direction (Y direction)

A point t and a point t+1 illustrated in FIG. 16 and FIG. 17 are the head positions at the time t and the time t−1, respectively, when the constant-velocity straight-line movement takes place. "Angle" illustrated in FIG. 16 and FIG. 17 is an angle with respect to the traveling direction of the constant-velocity straight-line movement. Further, coordinates at a point, when there is a movement from the head position at the time t to this point in the Angle direction for Dist (Angle) (uniform movement distance) calculated based on the equation (8), are defined as (X1, Y1).

Subsequently, normDist(Angle) that is the uniform movement distance on the shot image, namely a normalized uniform movement distance, is determined based on the equation (10).

$$normDist(Angle) = Dist(Angle) \times Size(Y1)/Size(t) \quad (10)$$

Here, Dist(Angle) is a value determined based on the equation (10). Further, Size(Y1) is the size of the head calculated based on the equation (1), at a coordinate point in the height direction (Y direction) of the point (X1, Y1) when there is a movement from the origin to the point (X1, Y1) in the Angle direction for the uniform movement distance Dist (Angle), in the top view, illustrated in FIG. 16 and FIG. 17. Further, Size(t) is the size of the head at the time t.

Figure 18:
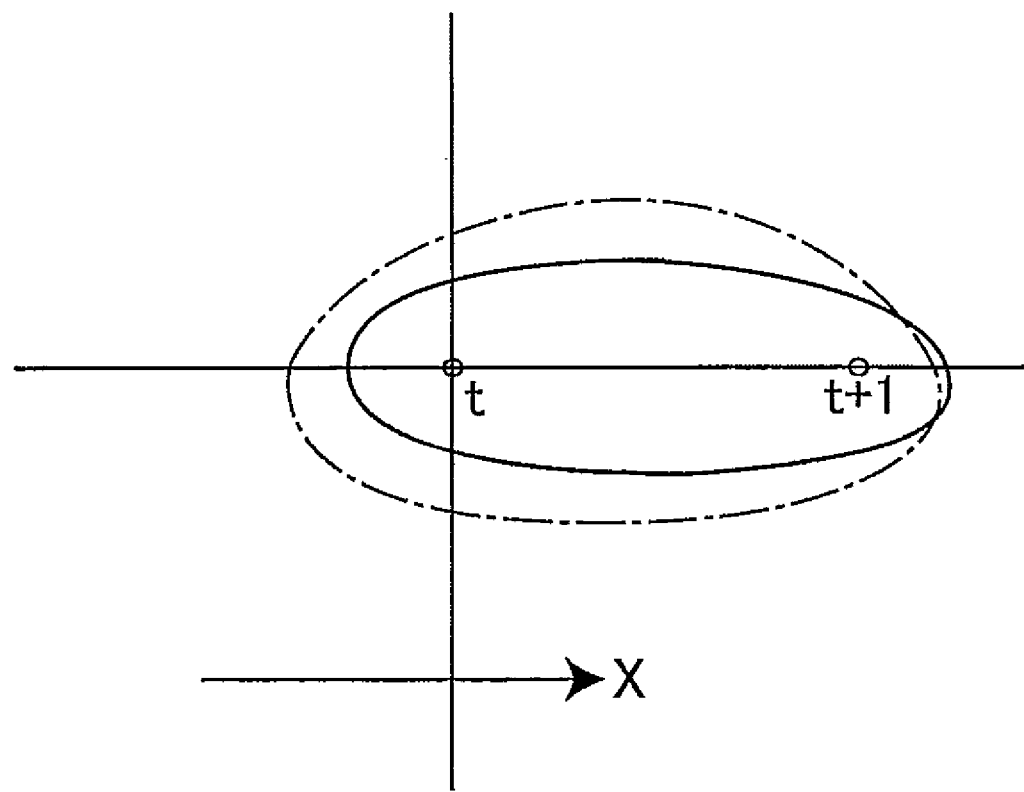
FIG. 18 is a diagram that illustrates a loop indicating the normalized uniform movement distance when the constant-velocity straight-line movement occurs in the X direction, and a loop obtained by deforming the circle (see FIG. 16) in the top view.

FIG. 18 is a diagram that illustrates a loop indicating the normalized uniform movement distance normDist(Angle) calculated based on the equation (10) when the constant-velocity straight-line movement occurs in the X direction, and a loop obtained by deforming the circle (see FIG. 16) in the top view in accordance with the equation (10). Further, FIG. 19 is a diagram that illustrates a loop indicating the normalized uniform movement distance normDist(Angle) calculated based on the equation (10) when the constant-velocity straight-line movement occurs in the Y direction, and a loop obtained by deforming the circle (see FIG. 17) in the top view in accordance with the equation (10).

Figure 19:
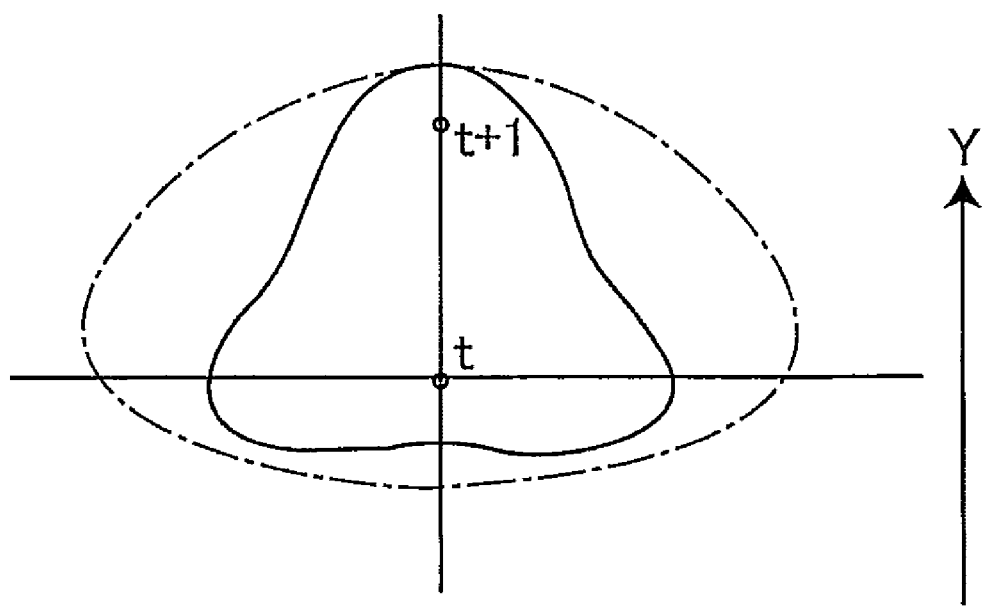
FIG. 19 is a diagram that illustrates a loop indicating the normalized uniform movement distance when the constant-velocity straight-line movement occurs in the Y direction, and a loop obtained by deforming the circle (see FIG. 17) in the top view.

On the shot image, each of the uniform movement distance and the circle in the top view is a "deformed" loop as illustrated in FIG. 18 and FIG. 19, when formed on the shot image.

Incidentally, here, examples in which the constant-velocity straight-line movement occurs in each of the lateral direction (X direction) and the vertical direction (Y direction) have been described. However, actually, the constant-velocity straight-line movement in an arbitrary direction within a two-dimensional plane formed by X and Y is taken into consideration.

Figure 20:
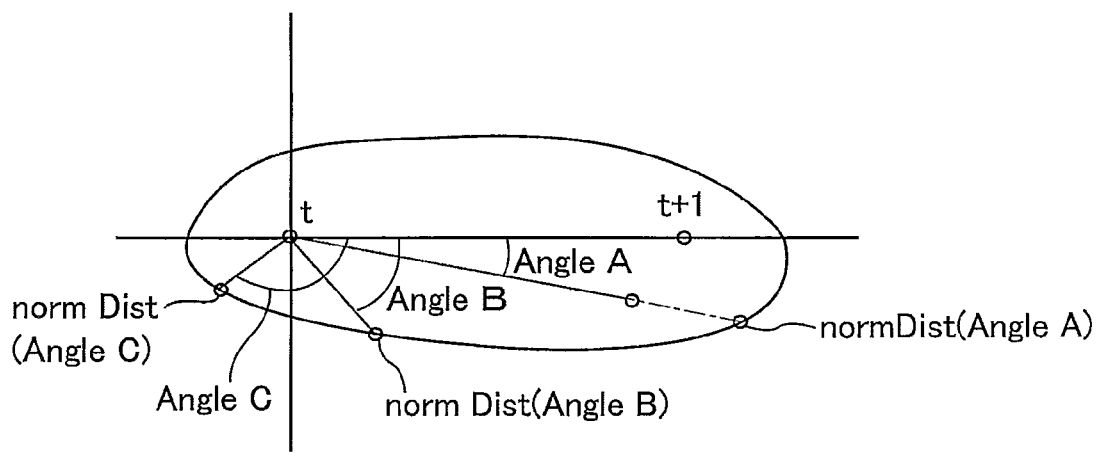
FIG. 20 is a diagram that illustrates a loop connecting the head detected on the frame image at the time t+1 to the uniform movement distance.

FIG. 20 is a diagram that illustrates a loop connecting the head detected on the frame image at the time t+1 to the uniform movement distance (formed on the shot image as illustrated in FIG. 18).

It is assumed that three heads A, B and C are detected on the frame image at the time t+1. Here, in order to determine intensity of connection between each of these three heads A, B and C and the head on the frame image at the time t (the head at the origin indicated by the character "t" in FIG. 20), a ratio is calculated based on the following equation (11). Here, the head A will be described as an example. A ratio $R_A$ for the head A is as follows.

$$R_A = \text{Dist}(A)/\text{normDist}(\text{Angle } A) \quad (11)$$

Here, Dist(A) is a distance between the origin (the head position at the time t) and the head A, and normDist(Angle A) is a normalized uniform movement distance in a direction toward the head A (Angle A) viewed from the origin.

Incidentally, when the operation is actually performed, there is no need to calculate one round of the loop indicating the uniform movement distance (or the normalized uniform movement distance) illustrated in FIG. 16 through FIG. 20, and the operation is performed only for the direction of the head detected on the frame image at the time t+1 (i.e. three directions of the heads A, B and C in the example illustrated in FIG. 20).

Figure 21:
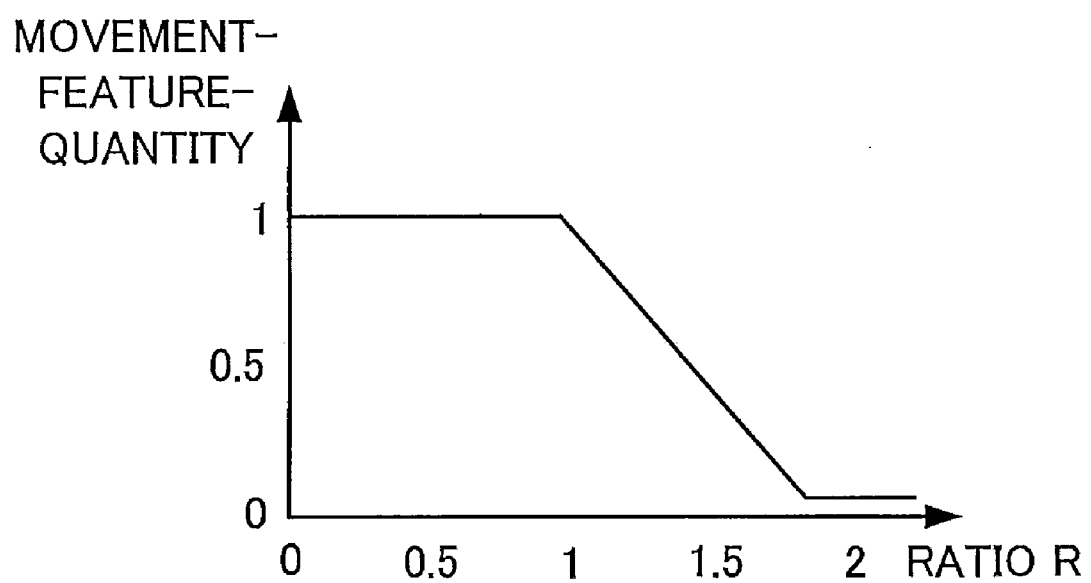
FIG. 21 is a diagram that illustrates a relationship between the ratio R obtained based on the equation (11) and the movement feature quantity.

FIG. 21 is a diagram that illustrates a relationship between the ratio R obtained based on the equation (11) and the movement feature quantity. In an example illustrated in FIG. 21, when the ratio R is 1 (inside the loop illustrated in FIG. 20), the movement feature quantity is "1", and when the ratio R is ≧1.8, the movement feature quantity is almost "0". Further, when 1<R<1.8, the value of the movement feature quantity becomes gradually smaller as the value of R becomes larger.

Here, the calculation of the uniform movement distance and the normalized uniform movement distance is premised on the constant-velocity straight-line movement. However, when the head is at rest or moves only for a distance equal to or below a certain threshold between the time t−1 and the time t, a circular uniform movement distance with its center being in the head position at the time t is adopted in place of the loop calculated based on the equation (8). This is to treat all the directions equally for the head at rest, since it is not clear to which direction the head moves until the time t+1. When the head of a person for whom tracking is to be started is detected on the shot image for the first time as well, the circular uniform movement distance is adopted because the past movements of the person (head) are not clear. However, even when the circular uniform movement distance is adopted, the normalized uniform movement distance calculated based on the equation (10) is a deformed loop without being a circle.

This concludes the description of the processing for calculating the correspondence stored in the storage section 54 (the processing at the correspondence calculation step (S30) in FIG. 12) and the processing for calculating the movement feature quantity in the movement-feature-quantity calculation section 52.

In the movement-feature-quantity calculation section 52 of the person tracking apparatus 50 illustrated in FIG. 13, a movement feature quantity $M_{ij}$ is calculated based on the above-described algorithm, for a head i on the frame image at the time t and each of all heads j=1, 2, 3, . . . on the frame image at the time t+1.

In the same-person determination section 53 illustrated in FIG. 13, a head j having a maximum movement feature quantity $M_{ij}$ is identified, and when the movement feature quantity $M_{ij}$ for the identified head j is beyond a certain threshold set beforehand, it is determined that the head i on the frame image at the time t and the head j on the frame image at the time t−1 belong to the same person.

The above processing is repeated for each of the heads i=1, 2, 3, . . . on the frame image at the time t, and each of the heads i=1, 2, 3, . . . is associated with each of the heads j=1, 2, 3, . . . on the frame image at the time t+1, thereby associating the heads of each same person with each other.

The above processing is repeated for each of the frame images at the respective times . . . , t−2, t−1, t, t+1, t+2, . . . , thereby the person tracking is performed.

In the storage section 54, the distribution of the head sizes and the approximate straight line Y=·Size+D illustrated in part (B) of FIG. 14 are stored and referred to by the movement-feature-quantity calculation section 52 during the above-described operation.

This concludes the description of the present embodiment (first embodiment) and subsequently a second embodiment will be described. In the description of the second embodiment, FIG. 1 through FIG. 11 and the description thereof are directly applied to the second embodiment. Therefore, overlapping description with reference to FIG. 1 through FIG. 11 will be omitted.

Figure 22:
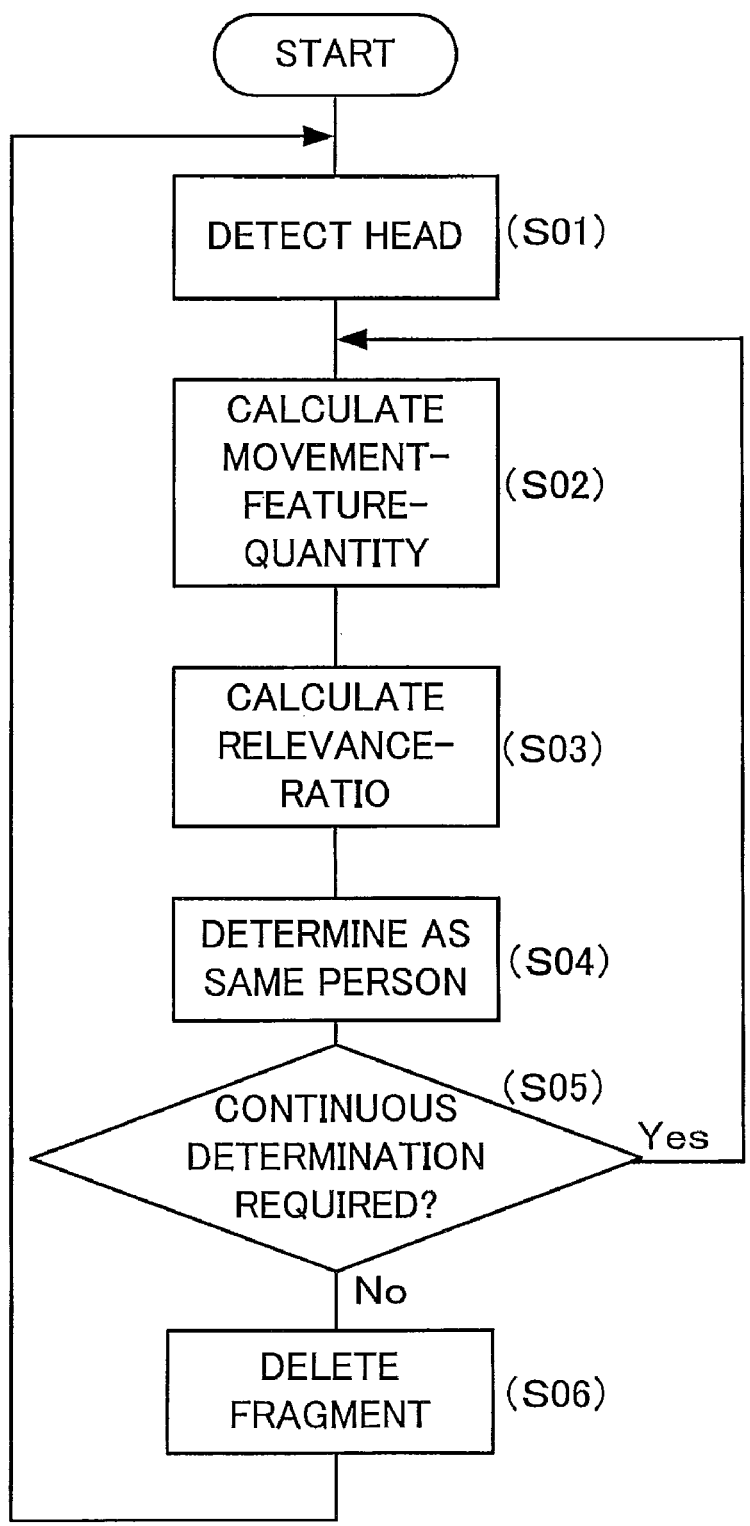
FIG. 22 is a flowchart showing a second embodiment of the person tracking method.

FIG. 22 is a flowchart showing the second embodiment of the person tracking method performed by using the personal computer 30 shown in FIGS. 9 to 11.

This person tracking method includes a head detecting step (S01), a feature-quantity calculation step (S02), a relevance-ratio calculation step (S03), a same-person determination step (S04) and a frayment deleting step (S06). Further, provided between the same-person determination step (S04) and the fragment deleting step (S06) is a determination step (S05) to determine whether the current situation is the situation where the processing described above with reference to FIG. 6 is to be executed. Each of the steps will be described later in detail.

Figure 23:
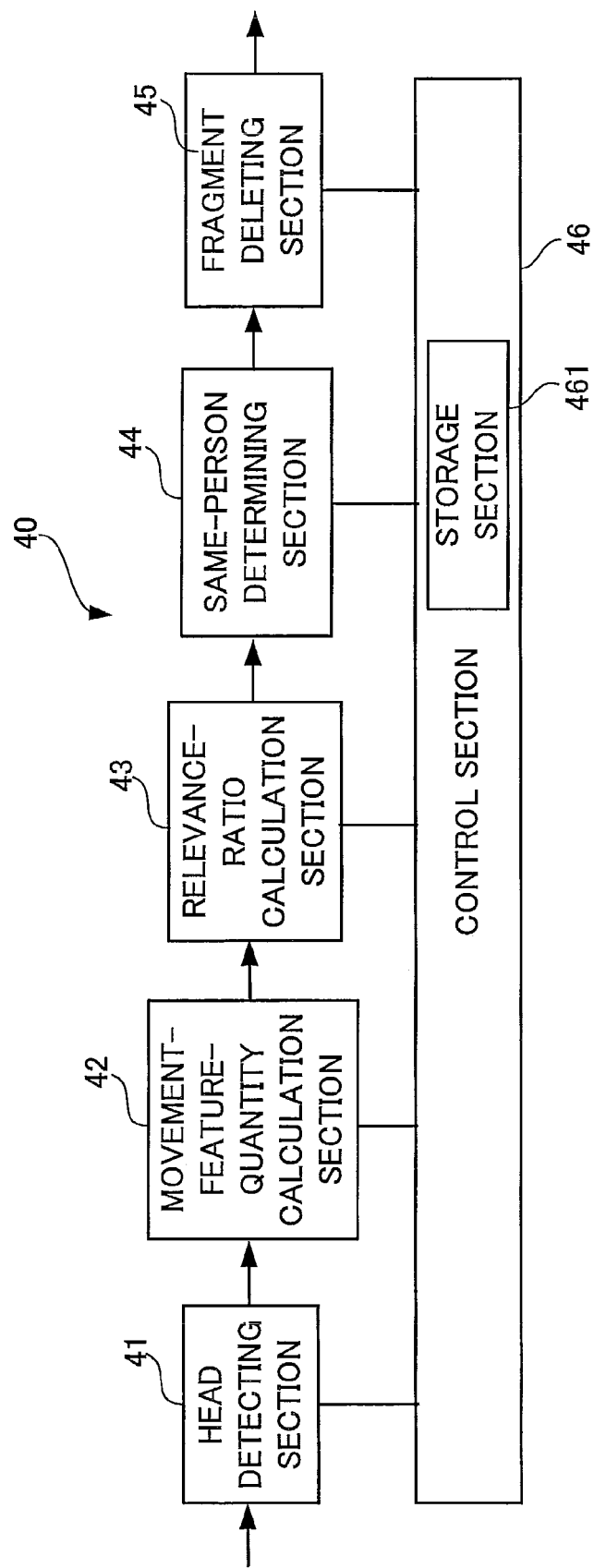
FIG. 23 is a block diagram illustrating one example of the person tracking apparatus.

FIG. 23 is a block diagram illustrating one example of the person tracking apparatus. This is a person tracking apparatus 40 that is an algorithm realized in the personal computer 30 when the person tracking program uploaded to the personal computer 30 illustrated in FIGS. 9 to 11 is executed in the personal computer 30. The person tracking apparatus 40 includes a head detecting section 41, a feature-quantity calculation section 42, a relevance-ratio calculation section 43, a same-person determination section 44 and a fragment deleting section 45.

In comparison with the person tracking method illustrated in FIG. 22, the head detecting section 41, the feature-quantity calculation section 42, the relevance-ratio calculation section 43, the same-person determination section 44 and the fragment deleting section 45 correspond to the head detecting step (S01), the feature-quantity calculation step (S02), the relevance-ratio calculation step (S03), the same-person determination step (S04) and the fragment deleting step (S06) illustrated in FIG. 22, respectively.

Since the action of the person tracking program when executed in the personal computer 30 is identical to that of the person tracking apparatus 40 shown in FIG. 23, the illustration and description of the person tracking program are not repeated here.

Hereafter, the action of each section in the person tracking apparatus 40 shown in FIG. 23 will be briefly described. This description also serves as explanation of the person tracking program and each step in the person tracking method shown in FIG. 22.

The head detecting section 41 of the person tracking apparatus 40 illustrated in FIG. 23 serves to detect, based on image data representing a moving image at a predetermined frame rate generated as a result of shooting the moving image of a measured space by a camera, a head on each of measured frame images, for each of the measured frame images among plural frame images forming the moving image. Here, a two-dimensional position of the head on the measured frame image and the vertical and lateral sizes of the head are detected. The camera used here is, as illustrated in FIG. 1, a camera that is disposed at the position obliquely looking down the measured space and shoots an image of the measured space. Here, "frame image" and "measured frame image" are described as different concepts. However, as mentioned above, the measured frame images may be frame images forming the moving image obtained as a result of shooting by the camera, or may be frame images thinned out, for example, every 3, 10 or 30 frames. In the following, these may be merely referred to as "frame images" without being distinguished from each other. The head detecting processing in the head detecting section 41 will be described later in detail.

In the feature-quantity calculation section 42, based on the above-mentioned image data, a feature quantity that features a person whose head is detected on the frame image is calculated for each frame image and each head.

In the relevance-ratio calculation section 43, there is calculated a relevance ratio that represents the degree of agreement between: a feature quantity that is on a past frame image and belongs to each person whose head is detected on the past frame image; and a feature quantity that is on the current frame image and belongs to each person whose head is detected on the current frame image. Here, as the "past frame image" for calculating the relevance ratio, a "past frame image" that is "immediately before" the "current frame image" is typically adopted. However, when it has been found that the heads belong to the same person, an average feature quantity obtained based on plural past frame images may be adopted as the "past frame image".

Further, the same-person determination section 44 determines that, among heads detected on the current frame image, a head, which is a basis for calculation of a relevance ratio that represents a degree of agreement being equal to or above a first threshold as well as being a maximum degree of agreement, among relevance ratios each between a feature quantity that is on a past frame image and belongs to a person having a first head among heads detected on the past frame image and each of feature quantities that are on the current frame image and belong to the respective persons having the respective heads detected on the current frame image, is a head of the same person as the person having the first head.

When it is determined that two heads belong to the same person, as described above, the relevance ratio needs to represent the degree of agreement equal to or above the threshold (here, referred to as the "first threshold") for the purpose of noise removal or the like, and also needs to be the maximum degree of agreement in situations such as when two or more heads are detected on the current frame image.

Further, in the fragment deleting section 45, when a head of a third person is detected only on one frame image or plural sequential frame images whose quantity is equal to or larger than a fourth threshold, and no head of the third person corresponding to the detected head is detected on frame images before and after the one frame image or the plural sequential frame images, this head is deleted from the detected heads. As a result, an erroneously detected head is removed. Incidentally, here, in order to maintain coherence in the entire specification, the threshold mentioned here is referred to as the "fourth threshold". How to set the fourth threshold is determined as appropriate when a person tracking apparatus according to the present embodiment is actually designed.

Furthermore, a control section 46 controls each section and determines whether there is satisfaction of such a condition that "heads determined as belonging to the same first person over a sequence of first frame images are detected, a head belonging to this first person is missing on subsequent one frame image or subsequent plural sequential frame images whose quantity is equal to or larger than a second threshold, and then heads determined as belonging to the same second person over a sequence of second frame images are detected". Then, when it is determined that this condition is satisfied, the control section 46 causes the feature-quantity calculation section 42, the relevance-ratio calculation section 43 and the same-person determination section 44 to execute the following processing.

When the above condition is satisfied, the feature-quantity calculation section 42 calculates a first average feature quantity of the first person on the plural first frame images and a second average feature quantity of the second person on the plural second frame images. Further, the relevance-ratio calculation section 43 calculates a relevance ratio between the first average feature quantity and the second average feature quantity. Furthermore, when the relevance ratio between the first average feature quantity and the second average feature quantity is a relevance ratio that represents a degree of agreement equal to or more than a third threshold, the same-person determination section 44 determines that the first person and the second person are identical.

In response to this result of determination, the control section 46 controls each section so that each section assumes that the corresponding head is present at a position, which is suitable for fore-and-aft movements of the head, on the frame image where the corresponding head is missing. As a result, it is possible to achieve a recovery even when a head-detection failure or the like occurs.

The control section 46 includes a storage section 461 that stores various kinds of data obtained in a preparation stage to operate the person tracking apparatus 40. The details will be described later.

Figure 24:
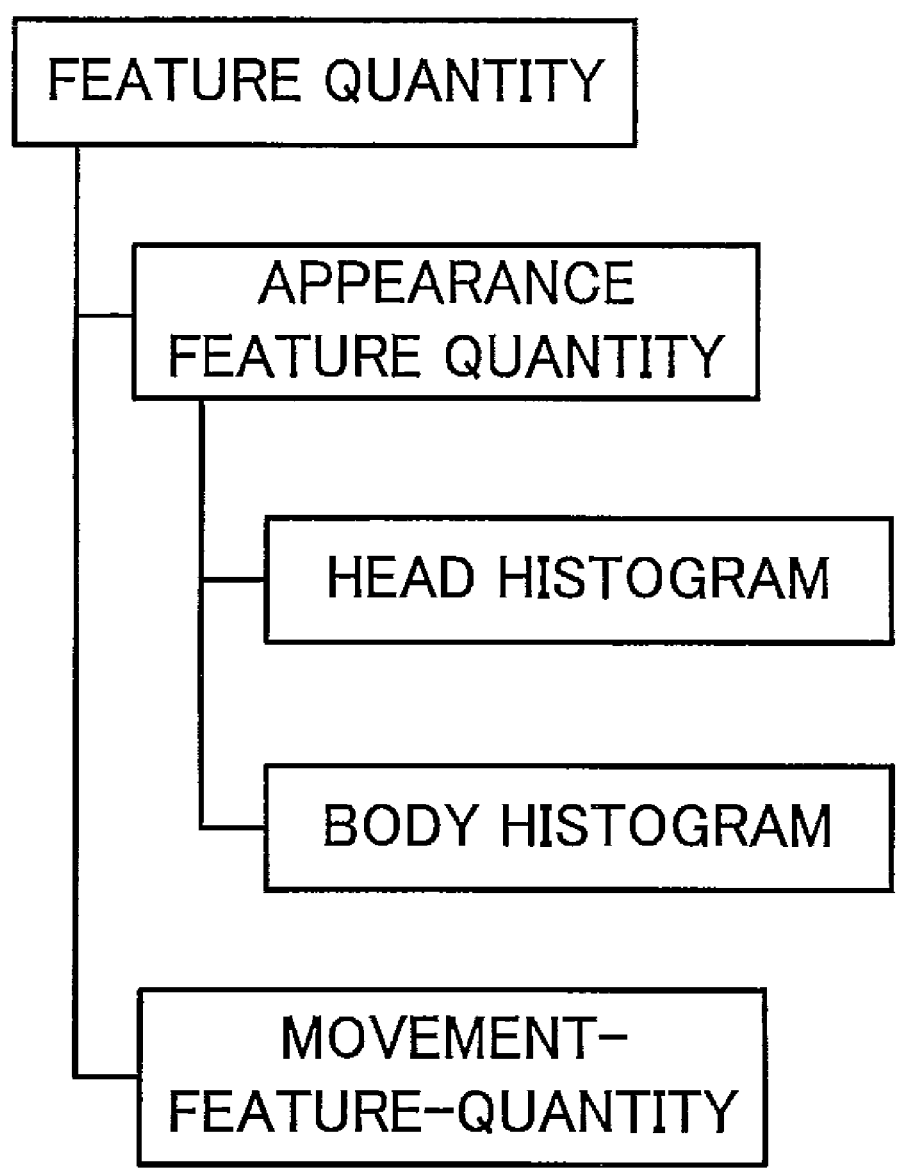
FIG. 24 is a diagram that illustrates a list of feature quantities employed in the second embodiment.

FIG. 24 is a diagram that illustrates a list of feature quantities employed in the second embodiment.

In the feature-quantity calculation section 42 illustrated in FIG. 23, a feature quantity that features a person whose head is detected on a frame image is calculated. In the present embodiment, an "appearance feature quantity" and a "movement feature quantity" are employed as the feature quantity calculated in the feature-quantity calculation section 42. The "appearance feature quantity" represents a feature of each frame image and here, a "head histogram" and a "body histogram" are employed as the "appearance feature quantity". In the following, the "head histogram" and the "body histogram" will be sequentially described. The "movement feature quantity" is similar to that in the first embodiment described above and therefore, its description will be omitted here.

Figure 25:
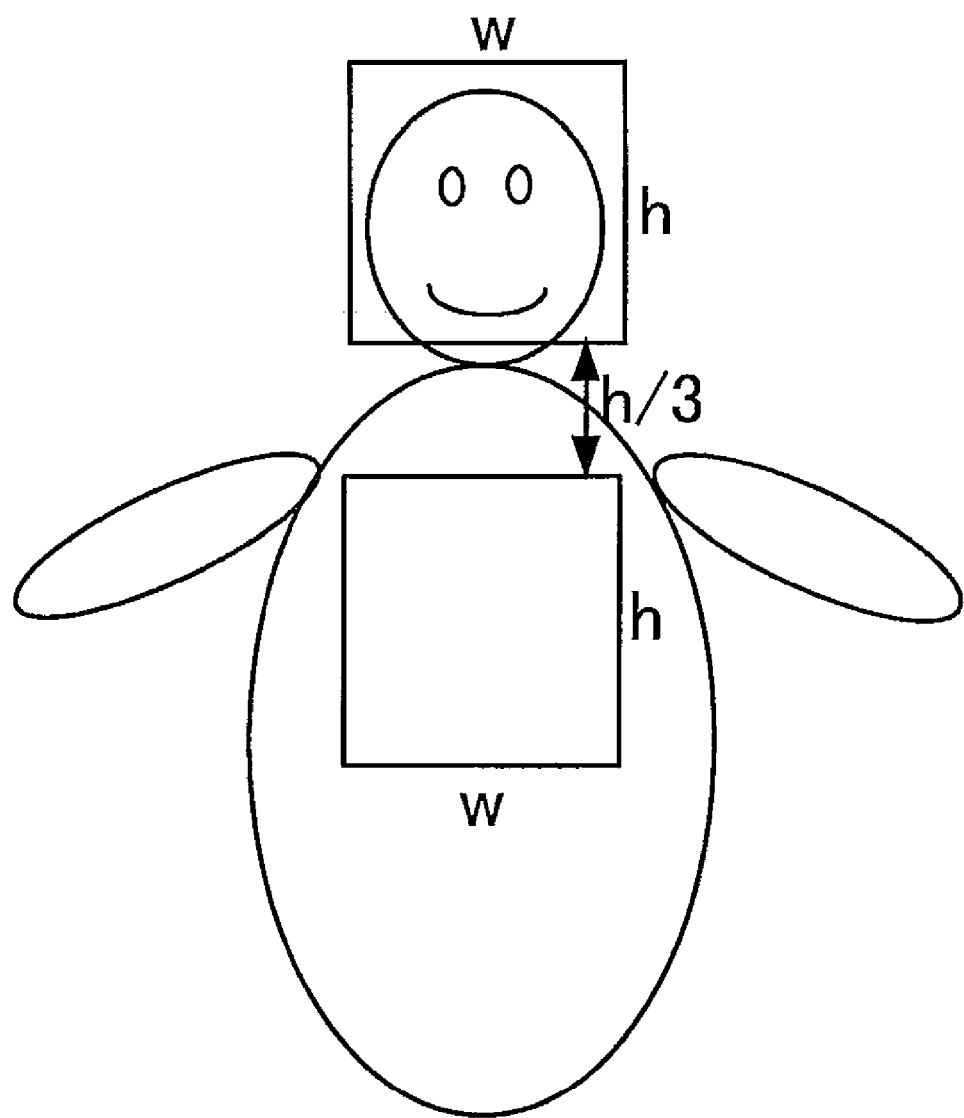
FIG. 25 is an explanatory diagram of a "head" and a "body"

FIG. 25 is an explanatory diagram of a "head" and a "body".

As described above, in the head detecting section 41 of the person tracking apparatus 40 illustrated in FIG. 23, the two-dimensional position and the size of a head on a frame image are detected.

Thus, in the feature-quantity calculation section 42, a head area is set based on the position and size detected by the head detecting section 41. Here, as illustrated in FIG. 25, a head area of a width w×a height h is assumed to be set as the head.

Subsequently, a point lower from a lower end of the area of the head by one third of the height h of the head is set as an upper end of a body area. The body area is set to be vertically aligned with the head area and has a size of w×h that is the same as the size of the head area. Next, the "head histogram" formed by histograms of multiple pixel values in the area of the head and the "body histogram" formed by histograms of multiple pixel values in the area of the body are calculated.

The pixel value of each pixel is a combination of three primary colors of R, G and B. Here, before calculation of the histogram, in order to reduce an influence due to a change of illumination in the measured space 10 whose image is shot by the camera 20 (see FIG. 1), normalized rgb are determined based on the following equation (12).

$$r = \frac{R}{R+G+B},$$
$$g = \frac{G}{R+G+B},$$
$$b = \frac{B}{R+G+B}$$
(12)

Here, R, G and B represent pixel values of the respective R, G and B colors.

Subsequently, a histogram is created for each of R, G and B colors, based on the normalized rgb.

Figure 26:
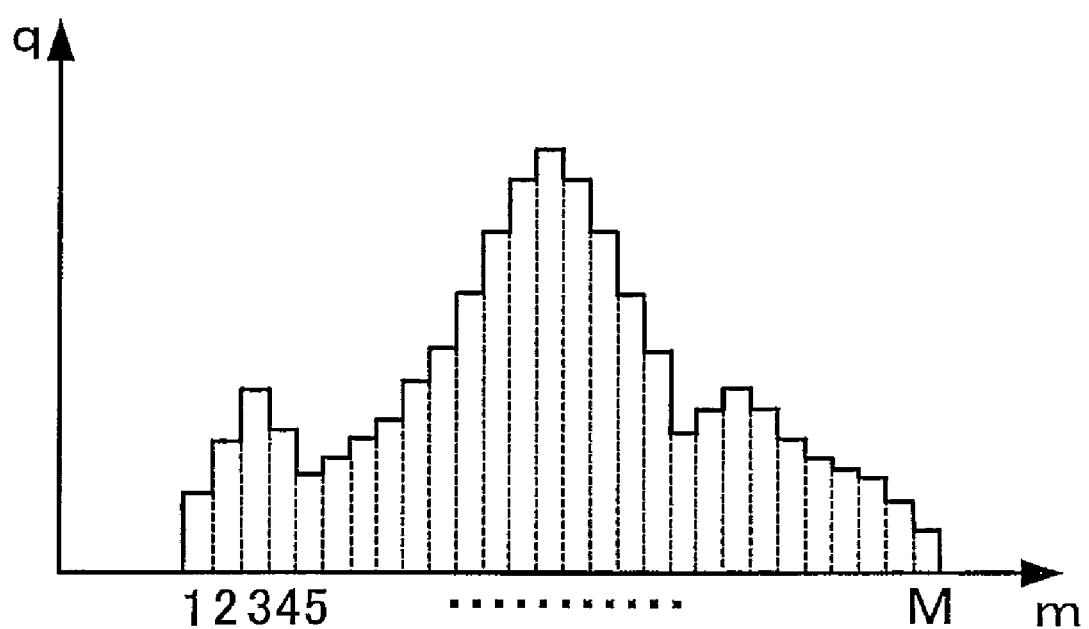
FIG. 26 is a conceptual diagram of the histogram.

FIG. 26 is a conceptual diagram of the histogram. FIG. 26 illustrates, as a representative example, one of the three R, G and B colors and a histogram of one of the head area and the body area. Here, this is described as a histogram R of the head area.

A character "m" (m=1, 2, ..., M) on a horizontal axis in FIG. 26 represents a value obtained by quantizing the value r of the R color normalized based on the equation (12). For example, the r falls within a range of 0 to 255, where 0-7 are assumed to be m=1, 8-16 are assumed to be m=2, ..., and 246-255 are assumed to be m=M. A vertical axis indicates the number of appearances (appearance frequency) "q" of each "m". Here, the appearance frequency "q" of the value "m" is expressed by "qm".

Here, for each of the head area and the body area and also for each of the three R, G and B colors, a histogram is calculated as the feature quantity.

In the present embodiment, in the manner described above, the head histogram and the body histogram are determined and further, the movement feature quantity is determined in a manner similar to that of the first embodiment described above. Thus, three feature quantities in total are determined.

When the three feature quantities are determined as described above in the feature-quantity calculation section 42 of the person tracking apparatus 40 illustrated in FIG. 23, the relevance-ratio calculation section 43 determines, based on these three feature quantities, a relevance ratio that represents the degree of agreement in terms of feature quantity between a head i on a frame image at a time t and a head j on a frame image at a time t+1.

When the appearance frequency q (vertical axis) of each histogram bin (bin) m (each unit m in the horizontal direction in FIG. 26, i.e., m=1, 2, ..., M) in the histogram of the head i is defined as "$q_{im}$", and the appearance frequency q of each histogram bin m in the histogram of the head j is defined as "$q_{jm}$", the following is calculated by using the histograms for three colors of the normalized three colors r, g, b.

$$P_{ij_1} = \prod_{q=r,g,b} \frac{\sum_{m=1}^{M}(q_{im} \times q_{jm})}{\sqrt{\sum_{m=1}^{M}(q_{im})^2} \times \sqrt{\sum_{m=1}^{M}(q_{jm})^2}}$$
(13)

Here, of "$P_{ij_1}$", "ij" indicates that this is an operation between the ith head on the frame image at the time t and the jth head on the frame image at the time t+1, and "1" indicates that this is an operation related to the head histogram by distinguishing the head histogram from the body histogram. Therefore, "$P_{ij_1}$" represents a relevance ratio in terms of the head histogram alone between the head i and the head j.

For the body histogram as well, according to the following equation (14), a relevance ratio in terms of the body histogram alone between the histogram of the body of the person having the head i and the histogram of the body of the person having the head j is determined.

$$P_{ij_2} = \prod_{q=r,g,b} \frac{\sum_{m=1}^{M}(q_{im} \times q_{jm})}{\sqrt{\sum_{m=1}^{M}(q_{im})^2} \times \sqrt{\sum_{m=1}^{M}(q_{jm})^2}}$$
(14)

In this equation (14), "$q_{im}$" is the appearance frequency q of the histogram bin m of the body of the person having the head i, and "$q_{jm}$" is the appearance frequency q of the body histogram of the person having the head j.

Further, the value of a movement feature quantity (see FIG. 21) between the head i that is the ith head among the heads detected on the frame image at the time t and the head j that is the jth head among the heads detected on the frame image at the time t+1 is expressed as "$p_{ij_3}$" here in the second embodiment. This movement feature quantity represents a single relevance ratio related to a movement between the head i on the frame image at the time t and the head j on the frame image at the time t+1.

Next, a comprehensive relevance ratio "$P_{ij}$" between the head i and the head j is calculated in accordance with the following equation (15).

$$P_{ij} = \sum_{k=1}^{K} W_k \cdot P_{ijk}$$
(15)

Here, "K" is the number of the single relevance ratio, and K=3 is employed in this example.

Further, "$W_k$" represents the weight of each single relevance ratio. The weight $W_k$ is determined according to properties of the measured space, namely, depending on whether congestion is expected or not, whether high-speed movement is possible or not, and the like.

The relevance ratio "$P_{ij}$" is calculated in accordance with the equation (15) for the head i on the frame image at the time t and each head j (j=1, 2, 3, ...) on the frame image at the time t+1. In the same-person determination section 44 illustrated in FIG. 23, a head having a maximum relevance ratio $P_{ij}$ among j=1, 2, 3, ... is identified, and when the identified relevance ratio $P_{ij}$ for the head j has a value beyond a predetermined certain threshold, it is determined that the head i on the frame image at the time t and the head j on the frame image at the time t+1 belong to the same person.

The above processing is repeated for each of the heads i=1, 2, 3, ... on the frame image at the time t, and each of the heads i=1, 2, 3, ... is associated with each of the heads j=1, 2, 3, ... on the frame image at the time t+1, thereby associating the heads of each same person with each other.

The above processing is repeated for each of the frame images at the respective times ..., t-2, t-1, t, t+1, t+2, ..., thereby the person tracking is performed.

In the storage section 461 of the control section 46, the distribution of the head sizes and the approximate straight line Y=K·Size+D illustrated in part (B) of FIG. 14 are stored and referred to by the relevance-ratio calculation section 43 during the above-described operation.

Further, when the heads of the first person on the plural first frame images whose quantity is determined beforehand are detected, the heads of this person are missing on subsequent frame images whose quantity is equal to or less than a predetermined number, and then the heads of the second person appear on the following second plural frame images whose quantity is determined beforehand, the control section 46 causes the feature-quantity calculation section 42 to: calculate an average feature quantity (here, an average head histogram and an average body histogram) for the first person on the first plural frame images and an average feature quantity (here, an average head histogram and an average body histogram) for the second person on the second plural frame images; calculate a relevance ratio between these average feature quantities; and determine whether the relevance ratio is beyond a certain threshold. When the relevance ratio is beyond the threshold, it is determined that the first person and the second person are identical, and data of the head is added assuming that a head is present at a position that is on the frame image where the head is missing, the position being consistent with the head positions on frame images before and after the frame images where the head is missing.

Furthermore, the fragment deleting section 45 deletes the head of a person appearing only on sequential frame images whose quantity is equal to or less than a predetermined number without appearing on frame images before and after the sequential frame images.

This can improve the accuracy of the person tracking. Subsequently, an example of the head detecting processing will be described. This head detecting processing is common to the above-described first and second embodiments.

Figure 27:
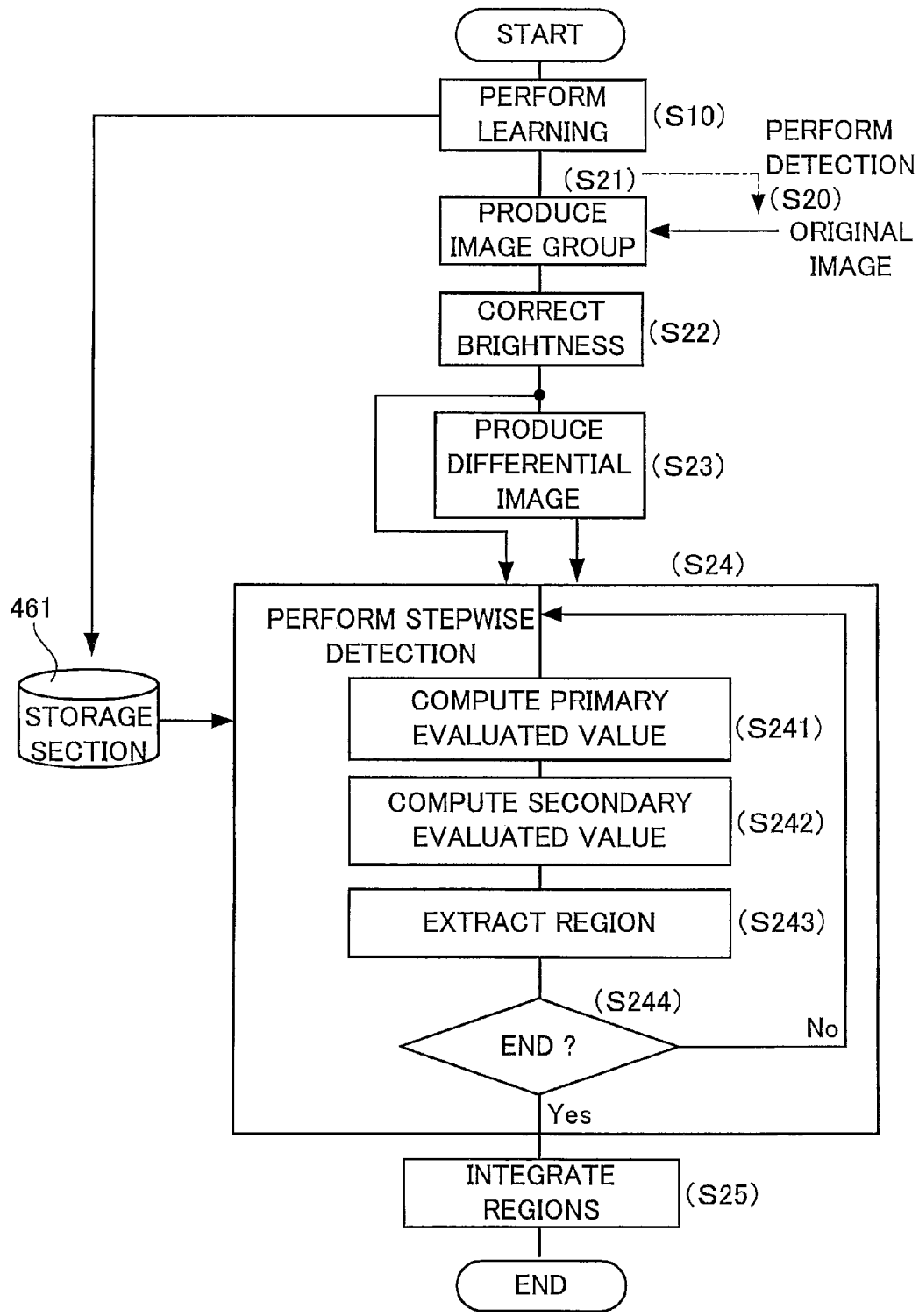
FIG. 27 is a flowchart of a head detecting method including details of a head detecting step.

FIG. 27 is a flowchart of a head detecting method including details of the head detecting step (S01, S41) that is shown by one block respectively in FIG. 22 and FIG. 12.

The head detecting method shown in FIG. 27 includes a learning step S10 and a detection step S20. The detection step S20 includes a set of steps S21 to S25. The learning step S10 is a step of preparing the detection step S20. The detection step S20 corresponds to the head detecting step S01 illustrated in FIG. 12. In the learning step S10, there is performed processing in which machine learning (for example, learning with an algorithm of Aba Boosting) is performed using a huge number of images, various filters acting on the original image of the head detecting target in the detection step S20 are extracted. The detailed description of the learning step S10 will be described later.

The detection step S20 is a step of automatically detecting the person's head from an original image targeted for detection by using various filters extracted in the learning step S10. The detection step S20 includes an image group producing step S21, a brightness correction step S22, a differential image producing step S23, a stepwise detection step S24, and a region integrating step S25. The stepwise detection step S24 includes a primary evaluated value computing step S241, a secondary evaluated value computing step S242, a region extracting step S243, and a determination step S244. Whether or not the repetition of the steps S241, S242, and S243 is ended is determined in the determination step S244. The steps of the detection step S20 will be described in detail later.

Figure 28:
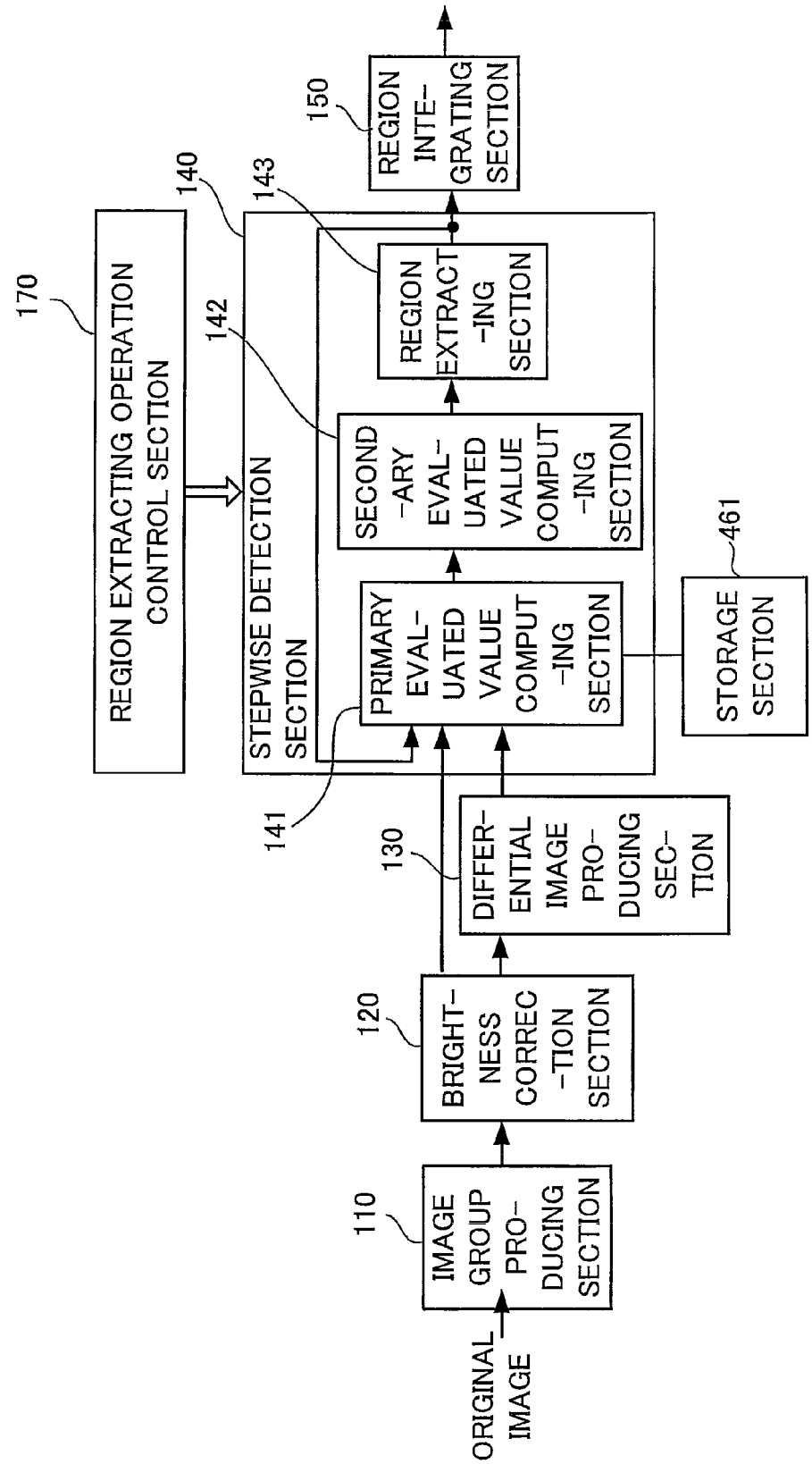
FIG. 28 is a detailed block diagram of a head detecting section.

FIG. 28 is a detailed block diagram of the head detecting section that is shown by one block in both FIG. 13 and FIG. 23.

A head detecting section 41 is an algorithm which is realized in the personal computer 30 by executing the head detecting program that is one of program parts of the person tracking program uploaded in the personal computer 30 shown in FIGS. 9 to 11. The head detecting section 41 includes an image group producing section 110, a brightness correction section 120, a differential image producing section 130, a stepwise detection section 140, a region integrating section 150, a filter storage section 160, and a region extracting operation control section 170. The stepwise detection section 140 includes a primary evaluated value computing section 141, a secondary evaluated value computing section 142, and a region extracting section 143.

In comparison with the head detecting method shown in FIG. 27, the entire head detecting section 41 in FIG. 28 corresponds to the detection step S20 of the head detecting method in FIG. 27, the image group producing section 110 corresponds to the image group producing step S21, the brightness correction section 120 corresponds to the brightness correction step S22, the differential image producing section 130 corresponds to the differential image producing step S23, a combination of the stepwise detection section 140 and the region extracting operation control section 170 corresponds to the stepwise detection step S24, and the region integrating section 150 corresponds to the region integrating step S25. The storage section 461 that is also shown in FIGS. 23 and 27 stores various types of filters (described later) extracted in the learning step S10. In the above-described first embodiment, the storage section 54 in FIG. 13 corresponds to the storage section 461.

The primary evaluated value computing section 141, secondary evaluated value computing section 142, and region extracting section 143 of the stepwise detection section 140 correspond to the primary evaluated value computing step S241, secondary evaluated value computing step S242, and region extracting step S243 of the stepwise detection step S24 in the head detecting method illustrated in FIG. 27, respectively. The region extracting operation control section 170 corresponds to the determination step S244 of the stepwise detection step S24.

Because the action of the head detecting program executed in the personal computer 30 is identical to that of the head detecting section shown in FIG. 28, the illustration and description of the head detecting program are not repeated here.

Hereafter, the action of each section of the head detecting section 41 shown in FIG. 28 will be briefly described. This description also serves as explanations of the head detecting program and each step included in the detection step S20 of the head detecting method shown in FIG. 27. Then, the learning step S10 of the head detecting method shown in FIG. 27 and the head detecting section 41 will be described in detail.

The head detecting section 41 shown in FIG. 28 detects the person's head from the image expressed by two-dimensionally arrayed pixels.

Many filters extracted in the learning step S10 of the head detecting method shown in FIG. 27 are stored in the storage section 461. The filters act on a region having a predetermined size two-dimensionally spread on the image, and the filters compute the person's head outline and one of person's head feature quantities different from one another. Each of the filters is stored in the filter storage section while correlated with a correspondence relationship between a feature quantity computed by each filter and a primary evaluated value indicating a probability of the person's head. Each of the filters includes plural filters in each of plural sizes acting on the regions having plural sizes (in this case, 32-by-32 pixel, 16-by-16 pixel, and 8-by-8 pixel). In the plural sizes, the number of pixels corresponding to the size of the region on the image is changed in a stepwise manner with a ratio of 1/2 in each of the vertical and horizontal directions.

In the image group producing section 110, the pixels constituting the fed original image are gradually thinned out vertically and horizontally with the ratio of 1/2 to produce an image group including the original image and several thinned-out images. In the image group producing section 110, in addition to the image group produced by thinning out the original image with the ratio of 1/2, an interpolated image constituting an image group including the original image is produced by performing interpolation operation to the original image. The number of pixels of the interpolated image is larger than that of the thinned-out image obtained by vertically and horizontally thinning out the original image with the ratio of 1/2 (the number of pixels becomes a quarter (the ratio of 1/2 in each of the vertical and horizontal directions)) of that of the original image, and the number of pixels of the interpolated image is smaller than that of the original image. The pixels constituting the produced interpolated image are gradually thinned out vertically and horizontally with the ratio of 1/2 to produce a new image group including the interpolated image and the thinned-out image obtained by thinning out the pixels of the interpolated image.

The brightness correction section 120 performs brightness correction processing. In the brightness correction processing, when attention focuses on one pixel on the image, a pixel value (brightness value) of the focused pixel is corrected using an average value and a variance of the pixel values (brightness values) of the plural pixels existing in a certain region including the focused pixel. The brightness correction processing is applied to the entire image while each pixel on the image is set as the focused pixel. The brightness correction processing is applied to each of images constituting the image group received from the image group producing section 110.

The brightness correction processing performed by the brightness correction section 120 effectively improves accuracy of the head detection when the image in which the brightness greatly varies depending on the pixel is set as the head detecting target. Although the head detecting section 41 of the embodiment includes the brightness correction section 120, it is not always necessary to perform the brightness correction processing in the invention.

The moving image is fed from the monitoring camera 20 of FIG. 1 into the differential image producing section 130. The differential image producing section 130 produces a differential image of adjacent frame, and the differential image producing section 130 transfers the differential image to the stepwise detection section 130.

The image in which the brightness is already corrected by the brightness correction section 120 is directly fed into the stepwise detection section 140. The image in which the brightness is already corrected by the brightness correction section 120 is also fed into the differential image producing section 130, and the differential image produced by the differential image producing section 130 is fed into the stepwise detection section 140. This is because the movement information on the person's head is used to detect the head with high accuracy by utilizing not only the one-by-one still image but also the differential image as the head detecting target image.

In the stepwise detection section 140, at first, the primary evaluated value computing section 141 applies plural filters to each region on the head detecting target image to compute plural feature quantities, and the primary evaluated value computing section 141 obtains a primary evaluated value corresponding to each feature quantity based on the correspondence relationship (between the feature quantity computed by the filter and the primary evaluated value indicating the probability of the person's head) correlated with each filter. Then the secondary evaluated value computing section 142 puts together the plural primary evaluated values corresponding to the plural filters obtained by the primary evaluated value computing section 141 using an operation such as addition and computation of the average value, thereby obtaining the secondary evaluated value indicating the probability of the existence of the person's head in the region. Then the region extracting section 143 compares the secondary evaluated value obtained by the secondary evaluated value computing section 142 and the threshold to extract the region where the probability of the existence of the person's head is higher than the threshold. In the head detecting section 41 of FIG. 28, the person's head is detected by extracting the region with the region extracting section 143.

In the stepwise detection section 140, under the sequence control of the region extracting operation control section 170, the primary evaluated value computing section 141, the secondary evaluated value computing section 142, and the region extracting section 143 are repeatedly operated, and the region where the person's head appears is eventually extracted with the extremely high probability. The region extracting operation control section 170 controls the operations of the primary evaluated value computing section 141, secondary evaluated value computing section 142, and region extracting section 143 of the stepwise detection section 140 as follows.

First, the region extracting operation control section 170 causes the operations of the primary evaluated value computing section 141, secondary evaluated value computing section 142, and region extracting section 143 to perform a first extraction process. That is, the region extracting operation control section 170 causes the primary evaluated value computing section 141 to apply plural first filters acting on a relatively narrow region in many filters stored in the storage section 461 to a relatively small first image in the image group produced by the image group producing section 110 to compute plural feature quantities, and the region extracting operation control section 170 causes the primary evaluated value computing section 141 to obtain the primary evaluated value corresponding to each feature quantity based on the correspondence relationship. The region extracting operation control section 170 causes the secondary evaluated value computing section 142 to put together the plural primary evaluated values corresponding to the plural first filters, obtained by the primary evaluated value computing section 141, thereby causing the secondary evaluated value computing section 142 to obtain the secondary evaluated value indicating the probability of the existence of the person's head in the region. The region extracting operation control section 170 causes the region extracting section 143 to compare the secondary evaluated value obtained by the secondary evaluated value computing section 142 and a first threshold to extract a primary candidate region where the probability of the existence of the person's head is higher than the first threshold.

Then the region extracting operation control section 170 causes the operations of the primary evaluated value computing section 141, secondary evaluated value computing section 142, and region extracting section 143 to perform a second extraction process. That is, the region extracting operation control section 170 causes the primary evaluated value computing section 141 to compute plural feature quantities by applying plural second filters acting on a region wider by one stage than that of the plural first filters in many filters stored in the storage section 461 to a region corresponding to a primary candidate region of the second image where the number of pixels is larger than by one stage than that of the first image in the image group produced by the image group producing section 110, and the region extracting operation control section 170 causes the primary evaluated value computing section 141 to obtain the primary evaluated value corresponding to each feature quantity based on the correspondence relationship. The region extracting operation control section 170 causes the secondary evaluated value computing section 142 to put together the plural primary evaluated values corresponding to the plural second filters, obtained by the primary evaluated value computing section 141, thereby causing the secondary evaluated value computing section 142 to obtain the secondary evaluated value indicating the probability of the existence of the person's head in the primary candidate region. The region extracting operation control section 170 causes the region extracting section 143 to compare the secondary evaluated value obtained by the secondary evaluated value computing section 142 and a second threshold to extract a secondary candidate region where the probability of the existence of the person's head is higher than the second threshold.

The region extracting operation control section 170 causes the primary evaluated value computing section 141, secondary evaluated value computing section 142, and region extracting section 143 to sequentially repeat the plural extraction processes including the first extraction process and the second extraction process from the extraction process of applying the filter acting on the relatively narrow region to the relatively small image toward the extraction process of applying the filter acting on the relatively wide region to the relatively large image.

In the head detecting section 41 of FIG. 28, the region extracting section 143 finally extracts the region by this repetition, thereby detecting the person's head with high accuracy.

As described above, in the image group producing section 110, the plural image groups are produced from one original image by the interpolation operation and the thinning-out operation. For each of the plural image groups (the image group of the differential images is produced by the differential image producing section 130, and the plural image groups include the image group of the differential images produced by the differential image producing section 130) produced by the image group producing section 110, the region extracting operation control section 170 causes the primary evaluated value computing section 141, secondary evaluated value computing section 142, and region extracting section 143 to sequentially repeat the plural extraction processes from the extraction process of applying the filter acting on the relatively narrow region to the relatively small image toward the extraction process of applying the filter acting on the relatively wide region to the relatively large image.

Therefore, the person's heads having various sizes can be detected.

Sometimes both a first region and a second region are extracted as the person's head region from the region extracting section 143. The first region includes the person's face in the substantial center of the image. The second region includes the head including the hair of the same person in the substantial center of the same image. The second region overlaps the first region. Therefore, to cope with such cases, the head detecting section 41 in FIG. 28 includes the region integrating section 150 to perform processing for integrating the plural regions into one region. Specifically, in a case where the plural regions are detected by the region extracting section 143, the plural regions are integrated into one region according to a degree of the overlap between the plural regions. The detailed description will be provided later.

An exemplary embodiment regarding the head detecting processing will be described more specifically.

Figure 29:
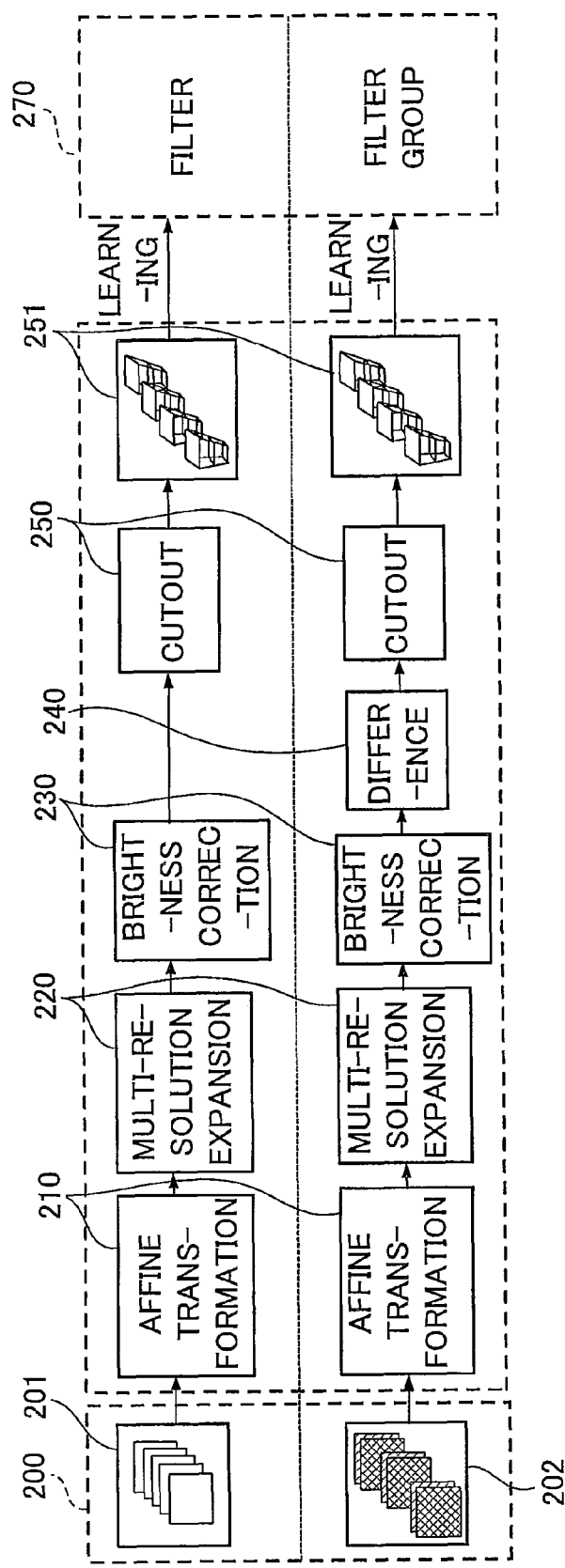
FIG. 29 is a detailed flowchart of a learning step in the head detecting method.

FIG. 29 is a detailed flowchart of the learning step S10 in the head detecting method of FIG. 27.

FIG. 29 shows two flowcharts: the flowchart in the upper stage shows processing for dealing with one-by-one still image before the difference is computed, and the flowchart in the lower stage shows processing for dealing with the differential image.

First, many images 200 are prepared to produce a teacher image. The many images 200 include many still images 201 and moving images 202 for producing the differential image. Each frame of the moving images 202 may be used as the still image 201. Preferably the images 200 are obtained by the monitoring camera 20 (see FIG. 1) which takes the original image for head detection, but the images 200 are not limited to the images obtained by the monitoring camera 20. For example, instead of the images taken by the monitoring camera 20, the image 200 may be collection of the images of various scenes in which persons exist and the images of various scenes in which persons do not exist.

Affine transform processing 210, multi-resolution expansion processing 220, and brightness correction processing 230 are sequentially applied to the images 200, and the differential image is produced from the moving image 202 through differential operation processing 240. Then a teacher image 251 is produced through cutout processing 250. The teacher image 251 is formed by a teacher image group for each scene. The teacher image group includes a 32-by-32-pixel teacher image, a 16-by-16-pixel teacher image, and an 8-by-8-pixel teacher image. The teacher image group is produced for each of many scenes.

Hereafter, each processing up to this stage will be described.

In the affine transform processing 210, many images are produced by changing one image little by little instead of the collection of extremely many images, thereby increasing the number of images which becomes the basis of the teacher image. At this point, the images are produced by inclining the one original image by $-12°$, $-6°$, $0°$, $+6°$, and $+12°$. Additionally, the images are produced by vertically scaling the original image by 1.2 times, 1.0 time, and 0.8 time, and the images are produced by horizontally scaling the original image by 1.2 times, 1.0 time, and 0.8 time. In the produced images, the image having the inclination of $0°$, the vertical scale factor of 1.0 time, and the horizontal scale factor of 1.0 time is the original image. The 45 ($=5\times3\times3$) images including the original image are produced from the one original image by a combination of the inclination and the scaling. Therefore, a great number of teacher images are produced, which enables the high-accuracy learning.

The multi-resolution expansion processing 220 will be described below.

Figure 30:
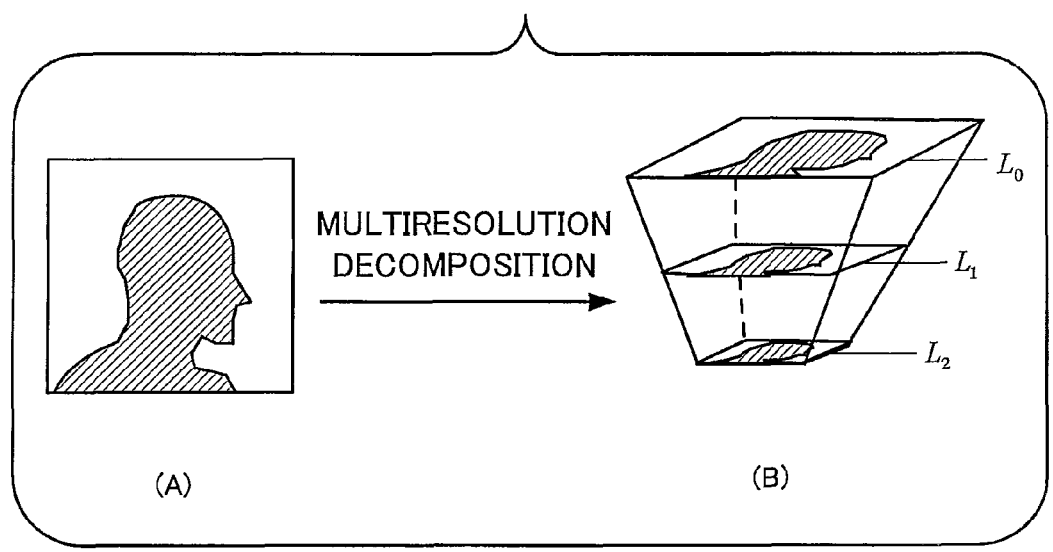
FIG. 30 is an explanatory diagram of multi-resolution expansion processing.

FIG. 30 is an explanatory diagram of the multi-resolution expansion processing.

The person's head appears in FIG. 30 and the teacher image is already obtained. However, in the multi-resolution expansion processing 220 of FIG. 29, the following processing is applied to the whole of the image before the image is cut out as the teacher image.

Assuming that Lo is the one original image shown in part (A) of FIG. 30, an image $L_1$ which is vertically and horizontally reduced into ½ (¼ in area) is produced by vertically and horizontally thinning out the original image Lo every other pixel. Similarly an image $L_2$ which is vertically and horizontally reduced into ½ (¼ in area) is produced by vertically and horizontally thinning out the image $L_1$ every other pixel. Part (B) of FIG. 30 shows an image group produced in the above-described manner in an inverted pyramid structure, the image group includes the three images Lo, $L_1$, and $L_2$.

Then the brightness correction processing 230 is performed.

In the brightness correction processing 230, the pixel value (brightness value) after the correction is obtained by the following equation (16). Where $X_{org}$ is a pixel value (brightness value) of a pixel X before the correction, $X_{cor}$ is brightness after the correction.

$$X_{cor} = \frac{X_{org} - E(X_{org})}{\sigma(X_{org})} \quad (16)$$

$E(X_{org})$ and $\sigma(X_{org})$ are an average value and a variance of the pixel value (brightness value) in the neighborhood (for example, 9-by-9 pixel) of the pixel X. The brightness is corrected by performing the brightness correction processing 230 to the whole of the image.

The brightness correction is applied to each of the images Lo, $L_1$, and $L_2$ of the three layers shown in part (B) of FIG. 30. That is, the brightness correction using the scene of the region which is wider than that of the original image is applied to the lower layer (toward the image $L_2$ side).

Then the differential processing 240 is applied to the moving image.

Figure 31:
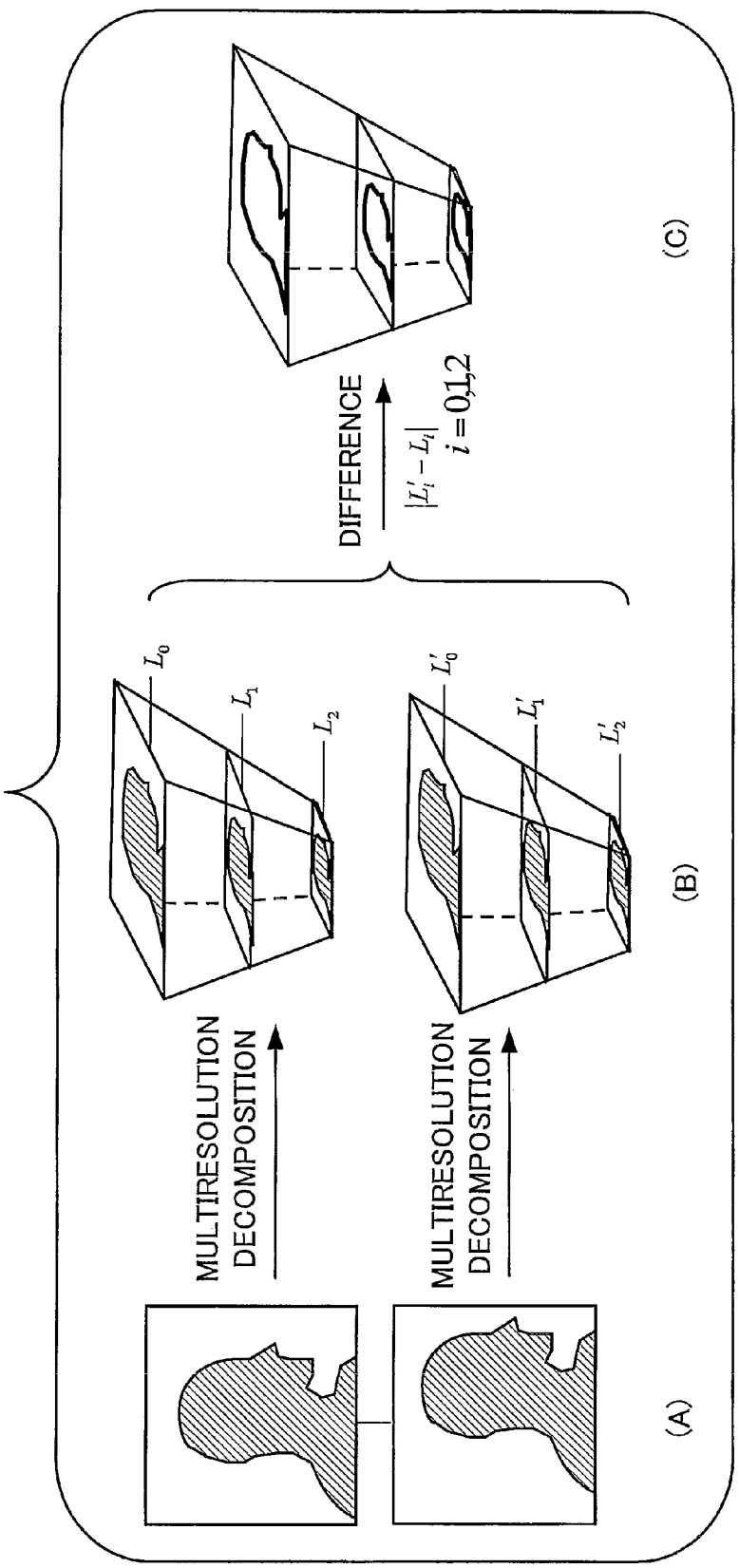
FIG. 31 is an explanatory diagram of moving image differential processing.

FIG. 31 is an explanatory diagram of the moving image differential processing.

Part (A) of FIG. 31 shows the images of two frames adjacent to each other in the moving image. Two image group which include images Lo, $L_1$, and $L_2$ and images Lo', $L_1$', and $L_2$' respectively are produced from the two images through the multi-resolution expansion processing 220 (part (B) of FIG. 31).

The brightness correction processing 230 is applied to the images Lo, $L_1$, and $L_2$ and images Lo', $L_1$', and $L_2$' constituting the two image groups, and the differential processing 240 is applied to the images Lo, $L_1$, and $L_2$ and images Lo', $L_1$', and $L_2$'.

In the differential processing 240, an absolute value ($|L_i'-L_i|$, i=0, 1, and 2) of the differential value in each corresponding pixel is obtained for the images having the same size, and the inverted-pyramid-shape image group including the three differential images shown in part (C) of FIG. 31 is produced.

Then the cutout processing 250 is performed.

In the cutout processing 250, the region where the person's head in various modes appears or the region where the subject except for the person's head appears is cut out from the image having the three-layer structure shown in part (B) of FIG. 30 and part (C) of FIG. 30, a teacher image that the person's head exists is produced from the region where the person's head appears, and a teacher image that the person's head does not exist is produced from the region where the subject except for the person's head appears.

In cutting out the teacher image, the 32-by-32-pixel region is cut out as the teacher image from the uppermost-layer image in the three-layer images shown in part (B) of FIG. 30 and part (C) of FIG. 30, the 16-by-16-pixel region of the same portion is cut out from the second-layer image, and the 8-by-8-pixel region of the same portion is cut out from the third-layer image. The cut-out three-layer teacher images differ from one another in resolution because of the different image sizes. However, the three-layer teacher images are cut out from the same portion on the image. Accordingly, the teacher images also become the inverted-pyramid-shape teacher image group having the three-layer structure shown in part (B) of FIG. 30 and part (C) of FIG. 30.

The many teacher image groups 251 having the three-layer structures are produced and used for the learning.

The filter on the side in which the learning is performed by the teacher images will be described.

Figure 32:
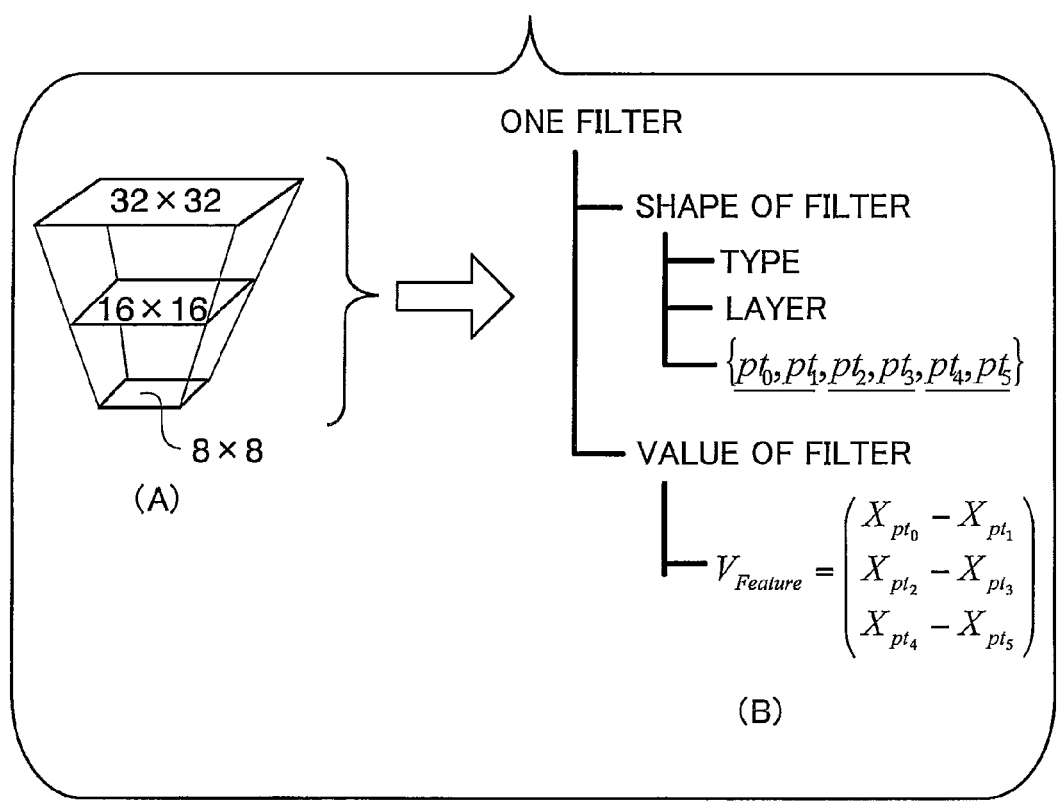
FIG. 32 is an explanatory diagram of a filter structure.
Figure 33:
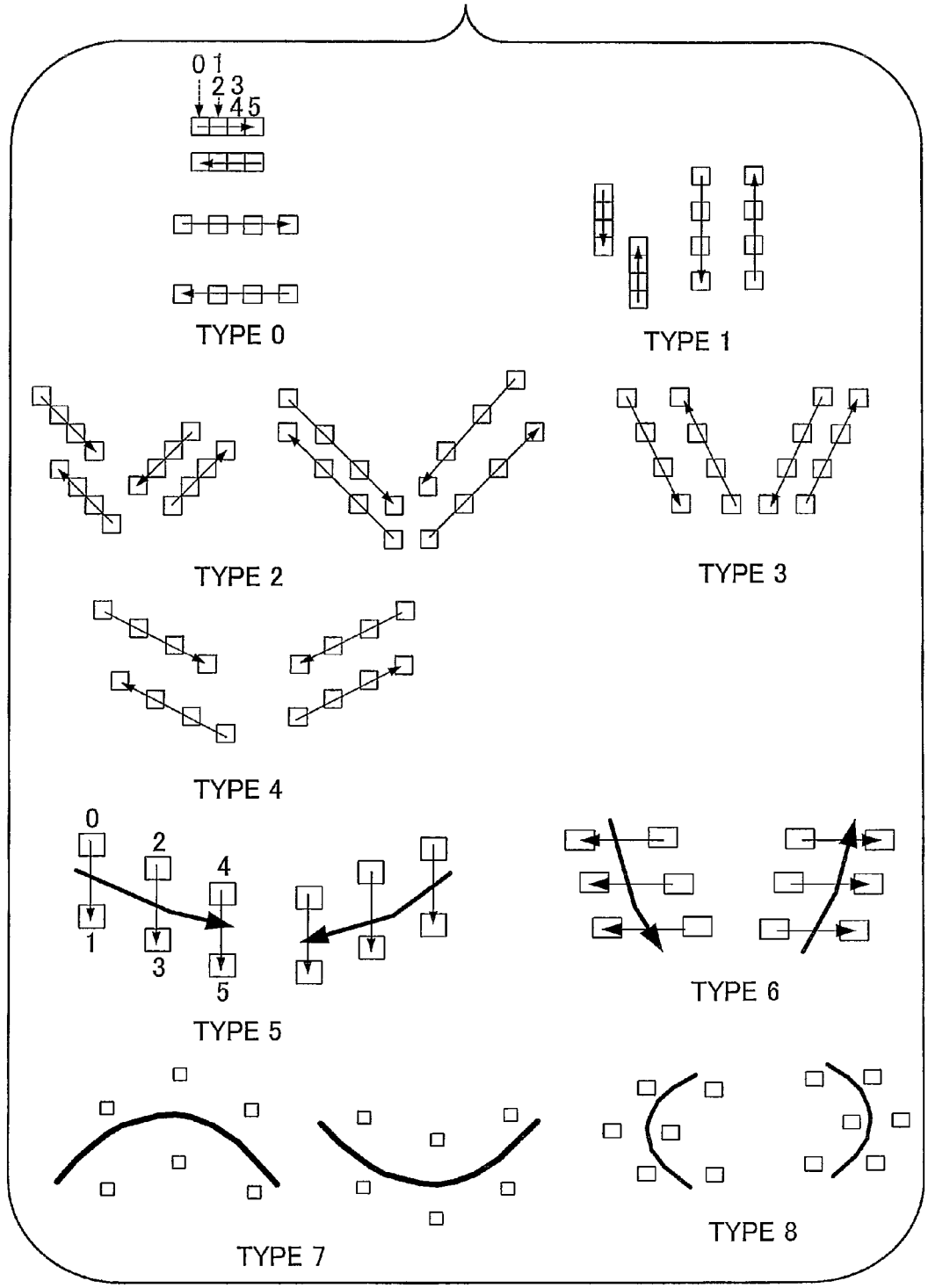
FIG. 33 illustrates examples of various types of filters.

FIG. 32 is an explanatory diagram of a filter structure, and FIG. 33 illustrates examples of various types of filters.

At this point, various kinds of filters are prepared. The filters are divided into the filter acting on the 32-by-32-pixel region on the image, the filter acting on the 16-by-16-pixel region on the image, and the filter acting on the 8-by-8-pixel region on the image. The filters are filter candidates used to detect the head until the filter is extracted by the learning. Among the filter candidates, the filter candidate acting on the 32-by-32-pixel region is selected by the learning performed using the 32-by-32-pixel teacher image in the teacher image group having the three-layer structure shown in part (A) of FIG. 32, and the filter which should be used to detect the head is extracted. Similarly, the filter candidate acting on the 16-by-16-pixel region among the many filter candidates is selected by the learning performed using the 16-by-16-pixel teacher image in the teacher image group having the three-layer structure, and the filter which should be used to detect the head is extracted. Similarly, the filter candidate acting on the 8-by-8-pixel region among the many filter candidates is selected by the learning performed using the 8-by-8-pixel teacher image in the teacher image group having the three-layer structure, and the filter which should be used to detect the head is extracted.

As shown in part (B) of FIG. 32, one filter has attributes of a type, a layer, and six pixel coordinates {$pt_0$, $pt_1$, $pt_2$, $pt_3$, $pt_4$, and $pt_5$}.

Assuming that $X_{pt0}$, $X_{pt1}$, $X_{pt2}$, $X_{pt3}$, $X_{pt4}$, and $X_{pt5}$ are pixel values (brightness values) of the pixels located at the six pixel coordinates, vectors of three differential values are computed by the following operation.

$$V_{Feature} = \begin{pmatrix} X_{pt_0} - X_{pt_1} \\ X_{pt_2} - X_{pt_3} \\ X_{pt_4} - X_{pt_5} \end{pmatrix} \quad (17)$$

The "type" indicates a large classification such as type 0 to type 8 shown in FIG. 33. For example, type 0 on the upper left of FIG. 33 indicates a filter which computes the difference in the horizontal direction ($\theta=0°$), type 1 indicates a filter which computes the difference in the vertical direction ($\theta=\pm90°$, and types 2 to 4 indicate filters which compute the difference in the direction of each type. Types 5 to 8 indicate filters which detect an edge of each curved line by the differential operation shown in FIG. 33. The "layer" is an identification marker indicating the filter acting on the 32-by-32-pixel region, the filter acting on the 16-by-16-pixel region, or the filter acting on the 8-by-8-pixel region.

The six pixel coordinates {$pt_0$, $pt_1$, $pt_2$, $pt_3$, $pt_4$, and $pt_5$} designate coordinates of the six pixels in the 64 (=8×8) pixels in cases where the filter acts on the 8-by-8-pixel region. The same holds true for the filter acting on the 16-by-16-pixel region and the pixel acting on the 32-by-32-pixel region.

The operation performed using the equation (17) is applied to the six pixels designated by the six pixel coordinates {$pt_0$, $pt_1$, $pt_2$, $pt_3$, $pt_4$, and $pt_5$}. For example, in the case of the top filter in the type 0 on the upper left of FIG. 33, assuming that Xo is a brightness value of the pixel to which the numerical value of 0 is appended, $X_1$ is a brightness value of the pixel to which the numerical value of 1 is appended, $X_2$ ($=X_1$) is a brightness value of the pixel (at this point, the pixel to which the numerical value of 2 is appended is identical to the pixel to which the numerical value of 1 is appended) to which the numerical value of 2 is appended, $X_3$ is a brightness value of the pixel to which the numerical value of 3 is appended, $X_4$ ($=X_3$) is a brightness value of the pixel (at this point, the pixel to which the numerical value of 4 is appended is identical to the pixel to which the numerical value of 1 is appended) to which the numerical value of 4 is appended, and $X_5$ is a brightness value of the pixel to which the numerical value of 5 is appended, the following equation (18) is obtained.

$$V_{Feature} = \begin{pmatrix} X_0 - X_1 \\ X_2 - X_3 \\ X_4 - X_5 \end{pmatrix} \quad (18)$$

The numerical values of 0 to 5 are appended to the filters on the left side of the type 5, and the operation same as that of the equation (18) is performed.

These are examples and the various types of filters in FIG. 33 perform the operation similar to these examples.

As shown in FIG. 29, when the teacher image group 251 is produced, a filter 270 used to detect the head is extracted from many filter candidates by the machine learning.

The machine learning will be described below.

Figure 34:
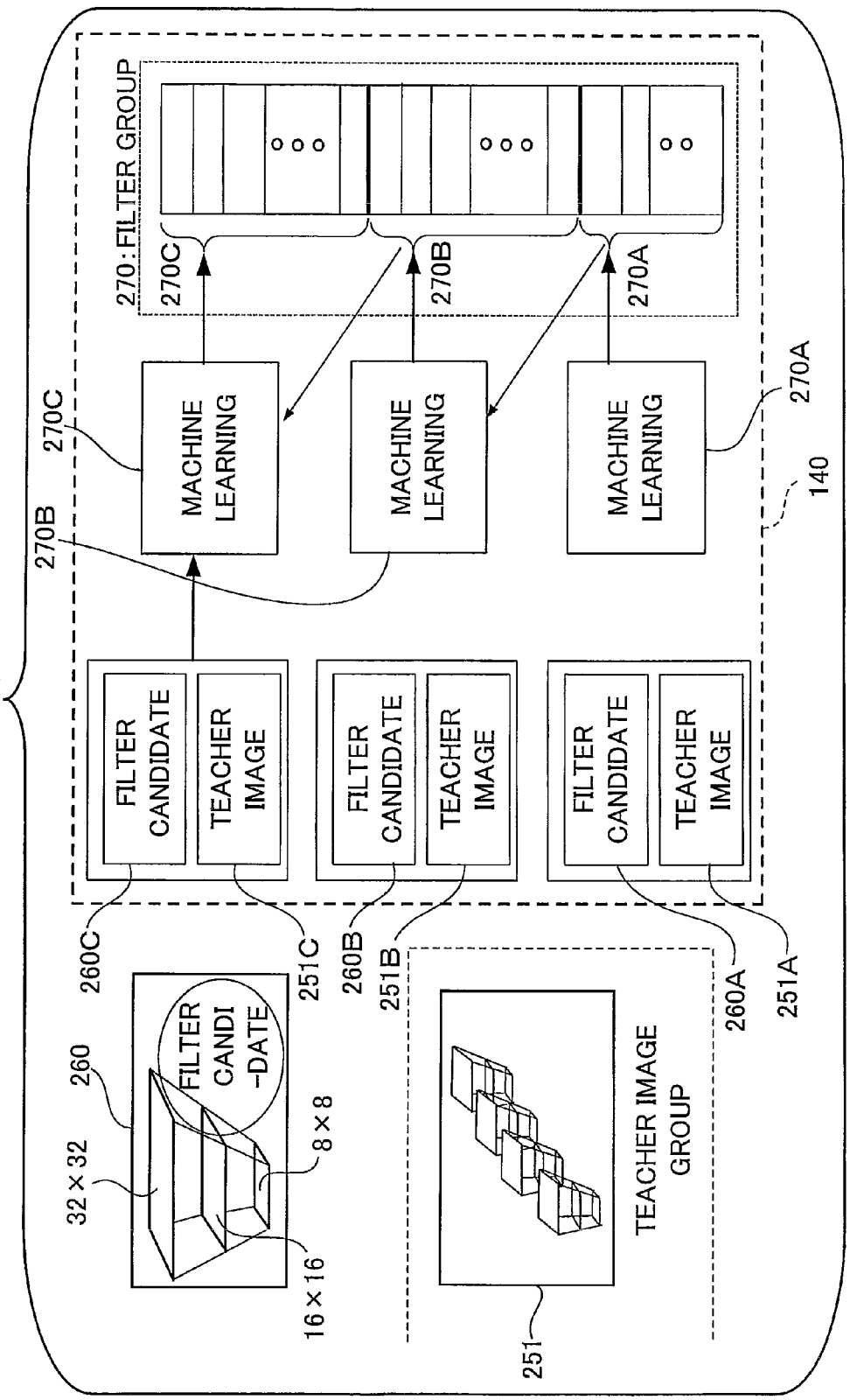
FIG. 34 is a conceptual diagram of machine learning.

FIG. 34 is a conceptual diagram of the machine learning.

As described above, many filter candidates 260 are prepared while the many teacher image groups 251 are prepared, a filter 270A used to detect the head is extracted from filter candidates 260A acting on the 8-by-8-pixel region using many 8-by-8-pixel teacher images 251A in the teacher image groups 251. Then, while the extraction result is reflected, a filter 270B used to detect the head is extracted from filter candidates 260B acting on the 16-by-16-pixel region using many 16-by-16-pixel teacher images 251B. Then, while the extraction result is reflected, a filter 270C used to detect the head is extracted from filter candidates 260B acting on the 32-by-32-pixel region using many 32-by-32-pixel teacher images 251C.

At this point, the Aba Boost algorithm is adopted as an example of the machine learning. Because the Aba Boost algorithm is already adopted in the wide fields, the Aba Boost algorithm will briefly be described below.

Figure 35:
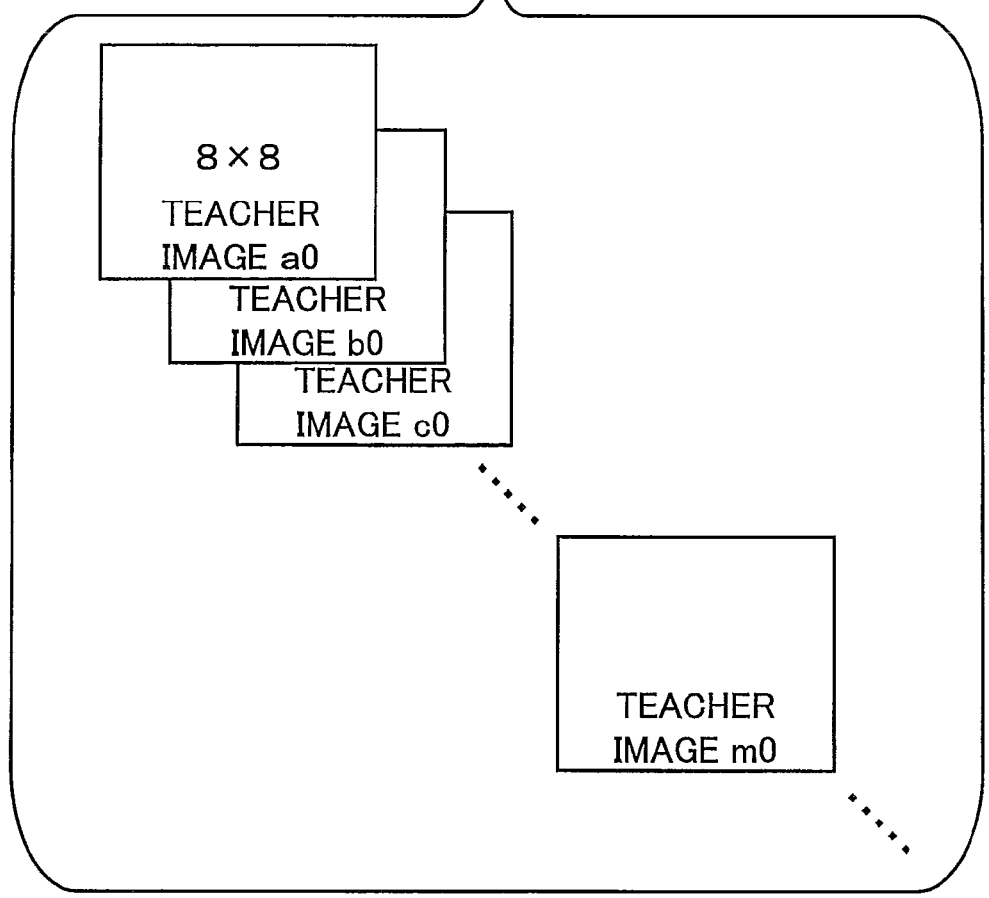
FIG. 35 is a conceptual diagram of teacher images.

FIG. 35 is a conceptual diagram of the teacher images.

At this point, it is assumed that 8-by-8-pixel many teacher images a0, b0, c0, and m0 are prepared. The teacher images include the teacher image which is of the head and the teacher image which is not of the head.

Figure 36:
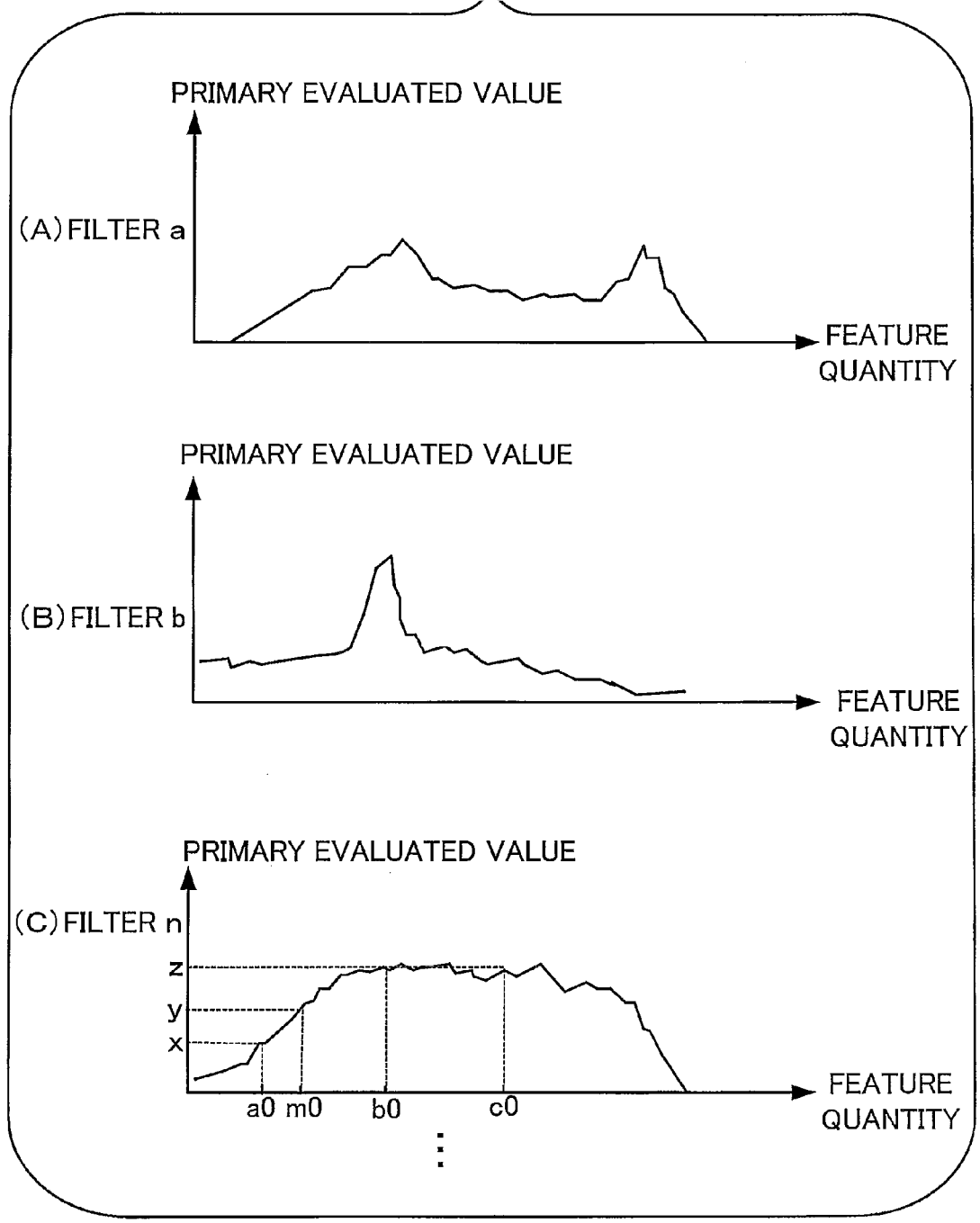
FIG. 36 are conceptual diagrams showing various types of filters and learning results of the filters.

FIG. 36 is a conceptual diagram showing various types of filters and learning results of the filters.

Here, various filters (in this stage, filter candidate) a, b, . . . , and n acting on the 8-by-8-pixel region are prepared, and the learning is applied to each of the filters a, b, . . . , and n using the many teacher images of FIG. 35.

Each graph of FIG. 36 shows the learning result for each filter.

A feature quantity including a three-dimensional vector expressed by the equation (17) is computed in each filter. For the sake of simplicity, the feature quantity is shown as a one-dimensional feature quantity.

In the graphs of FIG. 36, a horizontal axis indicates the value of the feature quantity obtained for each of the many teacher images using the filter, and a vertical axis indicates percentage of correct answer on the head using the filter. The probability is used as the primary evaluated value.

It is assumed that, as a result of performing the first learning for each of the filters a, b, . . . , and n, the learning result is obtained as shown in FIG. 36 and the percentage of correct answer becomes the maximum when the filter n is used. In this case, the filter n is used as the head detecting filter, and the second learning is applied to the filters a, b, . . . except for the filter n.

As shown in part (C) of FIG. 36, it is assumed that the primary evaluated values of x, y, z, and z are obtained for the teacher images a0, b0, c0, and m0.

FIG. 37 is an explanatory diagram of weighting the teacher image.

The first learning is applied to all the teacher images a0, b0, c0, and m0 with the same weight of 1.0. On the other hand, in the second learning, the probabilities of x, y, z, and z of the teacher images are added to the teacher images a0, b0, c0, . . . , and m0 by the filter n in which the maximum percentage of correct answer is obtained in the first learning, the weight is lowered for the teacher image having the high possibility of correct answer, and the weight is increased for the teacher image having the lower possibility of correct answer. The weight is reflected on the percentage of correct answer of each teacher image in the second learning. That is, in the second learning, the weight is equal to repeated use of each teacher image for the learning by the number of times of the weight. In the second learning, the filter candidate in which the maximum percentage of correct answer is obtained is extracted as the head detecting filter. The weights for the teacher images a0, b0, c0, . . . , and m0 are corrected again using the graph of the percentage of correct answer on the feature quantity of the extracted filter, and the learning is applied to the remaining filters except for the currently extracted filter. The many head detecting filters 270A (see FIG. 11) acting on the 8-by-8-pixel region are extracted by repeating the learning.

FIG. 38 is an explanatory diagram of a weighting method in making a transition to the learning of the 16-by-16-pixel filter after the 8-by-8-pixel filter is extracted.

After the 8-byb-8-pixel filter is extracted, the correspondence relationship (for example, the graphs shown in FIG. 36) between the feature quantity and the primary evaluated value is obtained for the filters when each of the filters is independently used, and the secondary evaluated value is obtained for each teacher image (for example, the teacher image a0) by adding the primary evaluated value of each of the filters which are obtained from the feature quantities obtained by the many 8-by-8-pixel filters. As shown in FIG. 38, it is assumed that secondary evaluated values A, B, C, . . . , and M are obtained for the teacher images a0, b0, c0, . . . , and m0. At this point, the weights of the 16-by-16-pixel teacher images a1, b1, c1, . . . , and m1 corresponding to the 8-by-8-pixel teacher images a0, b0, c0, . . . , and m0 are changed from the weight of 1.0 which is equal to all the images using the secondary evaluated values A, B, C, . . . , and M, and the changed weights are used for learning to extract the filter acting on the 16-by-16-pixel region.

Hereinafter, the extraction algorithm for the filter of the 16-by-16-pixel region, the weighting changing algorithm, and the algorithm for making the transition to the extraction of the filter of the 32-by-32-pixel region are similar to those described above, so that the description is not repeated here.

Thus, the filter group 270 including the many filters 270A acting on the 8-by-8-pixel region, the many filters 270B acting on the 16-by-16-pixel region, and the many filters 270C acting on the 32-by-32-pixel region is extracted, the correspondence relationship (any one of a graph, a table, and a function formula) between the feature quantity (vector of the equation (17)) and the primary evaluated value is obtained for each filter, and the filter group 270 and the correspondence relationship are stored in the storage section 461 shown in FIGS. 27 and 28 (the storage section 54 in FIG. 13).

Next, the head detecting processing that uses the filter thus stored in the storage sections 54 and 461 will be described.

In the image group producing section 110, brightness correction section 120, and differential image producing section 130 of FIG. 28, the same pieces of processing as those of the multi-resolution expansion processing 220, brightness correction processing 230, and differential operation processing 240 of FIG. 29 in the learning are performed. However, because the processing performed by the image group producing section 110 is slightly different from the multi-resolution expansion processing 220, the processing performed by the image group producing section 110 will be described below.

Figure 39:
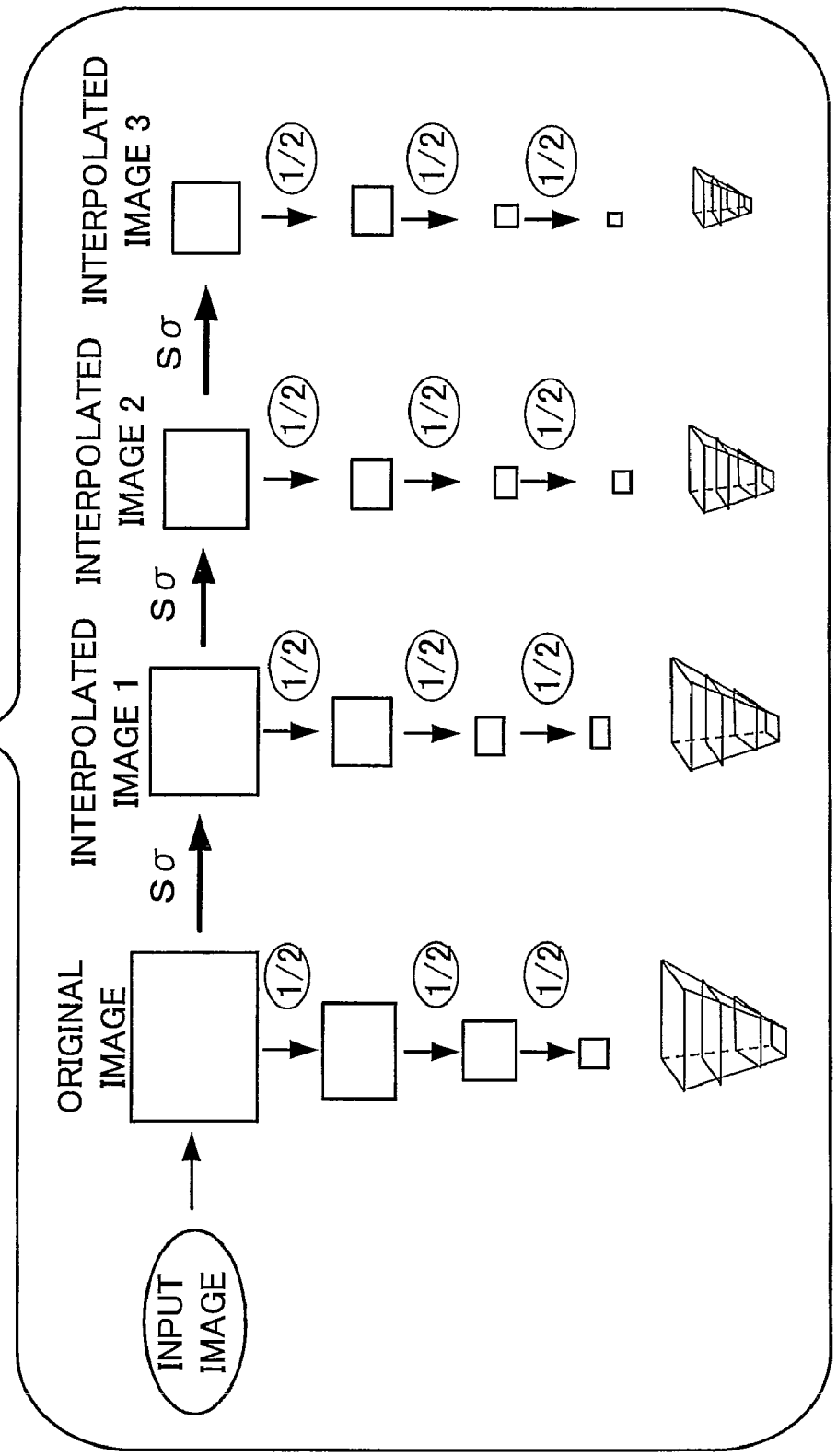
FIG. 39 is a schematic diagram showing processing performed by an image group producing section.

FIG. 39 is a schematic diagram showing the processing performed by the image group producing section 110 in FIG. 28.

The moving image taken by the monitoring camera 20 of FIG. 1 is fed into the image group producing section 110, and the processing of FIG. 39 is applied to each of the images constituting the moving image.

Interpolation operation processing is applied to the original image which is of the input image, an interpolated image 1 which is slightly smaller than the original image is obtained, and an interpolated image 2 which is slightly smaller than the interpolated image 1 is obtained. Similarly an interpolated image 3 is obtained.

A ratio Sσ of the image size between the original image and the interpolated image 1 is expressed for each of the vertical and horizontal directions by the following equation (19).

$$S\sigma = 2^{-\frac{1}{N}} \quad (19)$$

Where N is the number of interpolated images including the original image (N=4 in the example of FIG. 39).

After the interpolated images (interpolated images 1, 2, and 3 in the example of FIG. 39) are produced, the images having the sizes of ½ in the vertical and horizontal directions are produced by thinning out the original image every other pixel and interpolated images in the vertical and horizontal directions, the images having the sizes of ¼ in the vertical and horizontal directions are produced by thinning out every other pixel from the original image and interpolated images having the sizes of ½ in the vertical and horizontal directions, and the images having the sizes of ⅛ in the vertical and horizontal directions are produced by thinning out every other pixel from the original image and interpolated images having the sizes of ¼ in the vertical and horizontal directions. Therefore, in the example of FIG. 39, four inverted-pyramid-shape image groups each having four layers are produced from the one original image.

In this way, the heads having various sizes can be extracted by producing the images having many sizes.

Because the pieces of processing performed by the brightness correction section 120 and differential image producing section 130 of FIG. 28 are similar to the brightness correction processing 230 and differential operation processing 240 of FIG. 29, the overlapping description is not repeated here.

After the brightness correction section 120 applies the brightness correction processing to the inverted-pyramid-shape image group in FIG. 39, the differential image producing section 130 converts the inverted-pyramid-shape image group of FIG. 39 into the inverted-pyramid-shape image group of the differential image, and the inverted-pyramid-shape image group of the differential image is fed into the stepwise detection section 140. The stepwise detection section 140 performs the following operation processing under the sequence control of the region extracting operation control section 170.

In the primary evaluated value computing section 141, the many filters acting on the 8-by-8-pixel region are read from the storage section 461, and the image having the smallest size and the image having the second smallest size among respective four images constituting the inverted-pyramid-shape image group having the four layers shown in FIG. 39 are raster-scanned by the 8-by-8-pixel filters. Then a vector (see the equation (17)) indicating the feature quantity is obtained in each of the sequentially moved regions, the correspondence relationship (see FIG. 36) between the feature quantity and the primary evaluated value is referred to for each filter, and the feature quantity is converted into the primary evaluated value.

In the secondary evaluated value computing section 142, the many primary evaluated values obtained by the many filters acting on the 8-by-8-pixel region are added to one another to obtain the secondary evaluated value. The region extracting section 143 extracts the primary extraction region in which the secondary evaluated value is equal to or larger than a predetermined first threshold (high probability of the appearance of the head).

Then the positional information on the primary extraction region is transmitted to the primary evaluated value computing section 141. In the primary evaluated value computing section 141, the many filters acting on the 16-by-16-pixel region are read from the storage section 461, each filter acting on the 16-by-16-pixel region is applied to the region corresponding to the primary extraction region extracted by the region extracting section 143, the feature quantity is computed on the second smallest image and the third smallest image (second largest image) for each of the four inverted-pyramid-shape image groups in FIG. 39, and the feature quantity is converted into the primary evaluated value. In the secondary evaluated value computing section 142, the many primary evaluated values obtained by the many filters acting on the 16-by-16-pixel region are added to one another to obtain the secondary evaluated value. The region extracting section 143 compares the obtained secondary evaluated value and the second threshold to extract the secondary extraction region where the probability of the appearance of the head is further enhanced from the region corresponding to the primary extraction region. The positional information on the secondary extraction region is transmitted to the primary evaluated value computing section 141. In the primary evaluated value computing section 141, the many filters acting on the 32-by-32-pixel region are read from the storage section 461, each filter acting on the 36-by-36-pixel region is applied to the region corresponding to the secondary extraction region extracted by the region extracting section 143, the secondary extraction region is on the second largest image and the largest image of each of the four inverted-pyramid-shape image groups in FIG. 39, and the feature quantity is converted into the primary evaluated value. In the secondary evaluated value computing section 142, the many primary evaluated values obtained by the many filters acting on the 32-by-32-pixel region are added to one another to obtain the secondary evaluated value. The region extracting section 143 compares the obtained secondary evaluated value and the third threshold to extract the tertiary extraction region having certainty that the head appears from the region corresponding to the secondary extraction region. The information on the tertiary extraction region, that is, a position pos of the region on the image (coordinate (1, t) at the corner on the upper left of the region and a coordinate (r,b) at the corner on the lower right), and final secondary evaluated value likeness are fed into the region integrating section 150 in FIG. 28.

Figure 40:
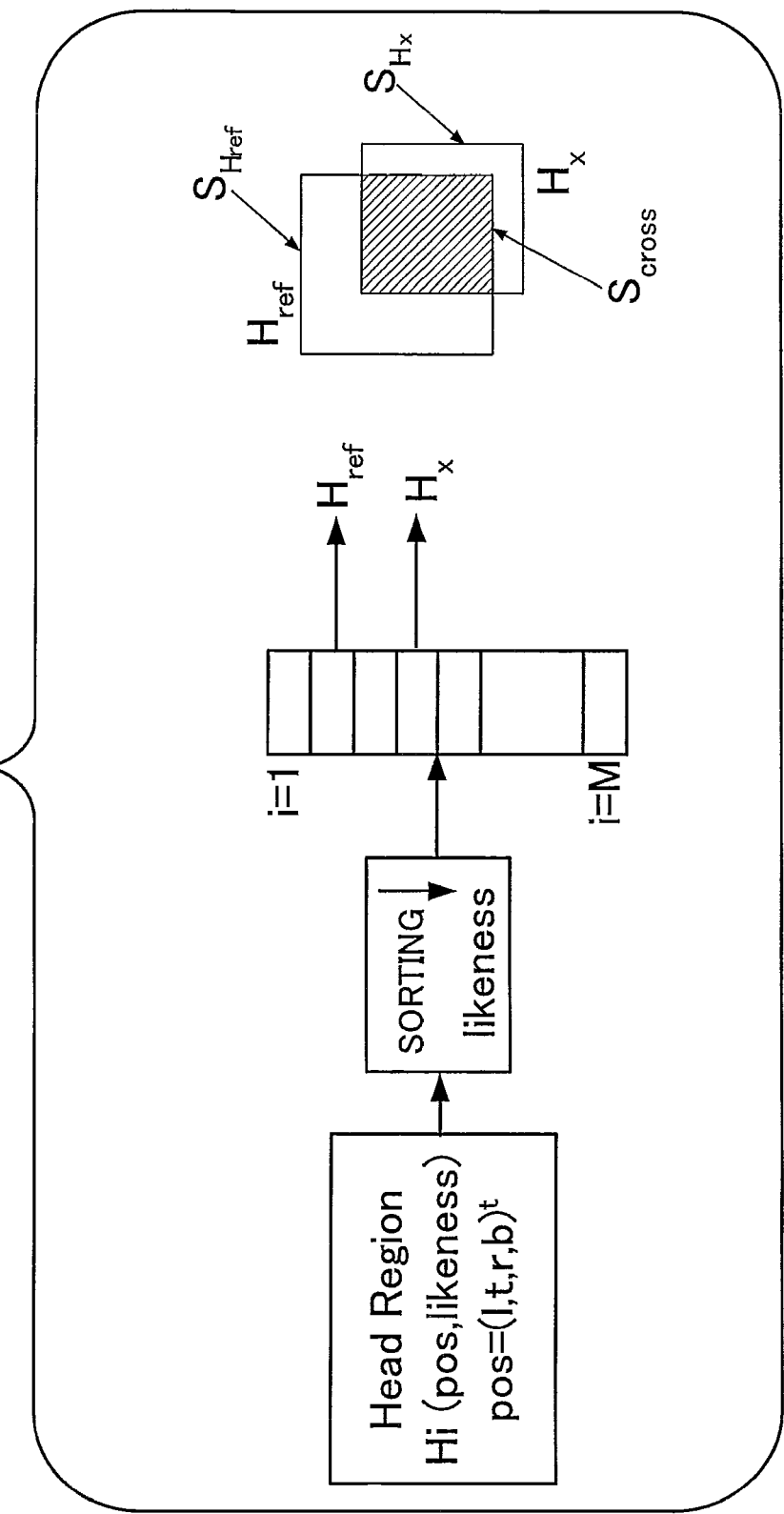
FIG. 40 is an explanatory diagram showing region integrating processing performed by a region integrating section.

FIG. 40 is an explanatory diagram showing the region integrating processing performed by the region integrating section 150.

When pieces of information Hi (pos, likeness) on the plural head regions (tertiary extraction region) Hi (i=1, . . . , and M) are fed into the region integrating section 150, the region integrating section 150 sorts the pieces of head region information Hi in the order of the secondary evaluated value likeness. At this point, it is assumed that two regions Href and Hx overlap each other, and it is assumed that the region Href is higher than the region Hx in the secondary evaluated value likeness.

Assuming that $S_{Href}$ is an area of the region Href, S is an area of the region Hx, and $S_{cross}$ is an area of the overlapping portion of the regions Href and Hx, an overlapping ratio is computed by the following equation.

$$\rho = \frac{S_{cross}}{S_{Href} + S_{Hx} - S_{cross}} \quad (20)$$

A region integrating operation is performed when the overlapping ratio p is equal to or larger than a threshold plow. That is, the weight according to likeness in the region is assigned to the corresponding coordinate among the coordinates at the four corners of the region Href and the coordinates at the four corners of the region Hx, and the regions Href and Hx are integrated into one region.

For example, coordinates lref and lx in the horizontal direction at the upper left corners of the regions Href and Hx are converted into the integrated coordinate expressed by the following equation (21) using likeness(ref) and likeness(x) which are of the likeness of each of the regions Href and Hx.

$$l = \frac{l_{ref} \times \text{likeness}(ref) + l_x \times \text{likeness}(x)}{\text{likeness}(ref) + \text{likeness}(x)} \quad (21)$$

Using the equation (21), the operation is performed for the four coordinates pos=$(1,t,r,b)^t$ which indicate the position, and the two regions Href and Hx is integrated into the one region.

The same holds true for the case in which at least three regions overlap one another.

In the present embodiment, the region where the person's head appears is accurately extracted at high speed through the above-described pieces of processing.

Incidentally, the head detecting processing described here is not limited to detection of heads, and can be commonly used in, for example, detection of faces, or detection of objects in various shapes appearing on images.

Now, various aspects of this head detecting processing will be described as object detecting processing in general expressions.

(1) An object detecting method for detecting a specific kind of object from an image expressed by two-dimensionally arrayed pixels, the object detecting method comprising: a primary evaluated value computing step of applying a plurality of filters to a region having a predetermined size on an image of an object detecting target to compute a plurality of feature quantities and of obtaining a primary evaluated value corresponding to each of the feature quantities based on a corresponding relationship, the plurality of filters acting on the region having the predetermined size to compute an outline of the specific kind of object and one of the feature quantities different from each other in the specific kind of object, the region having the predetermined size being two-dimensionally spread on the image, the plurality of filters being correlated with the corresponding relationship between the feature quantity computed by each of the plurality of filters and the primary evaluated value indicating a probability of the specific kind of object;

a secondary evaluated value computing step of obtaining a secondary evaluated value by integrating the plurality of primary evaluated values, the secondary evaluated value indicating the probability of the specific kind of object existing in the region, the plurality of primary evaluated values corresponding to the plurality of filters being obtained in the primary evaluated value computing step; and a region extracting step of comparing the secondary evaluated value obtained in the secondary evaluated value computing step and a threshold to extract a region where the probability of the existence of the specific kind of object is higher than the threshold, wherein the specific kind of object is detected by extracting the region in the region extracting step.

(2) The object detecting method according to (1), wherein the plurality of filters include a plurality of filters in each of a plurality of sizes, each of the plurality of filters acting on regions having the plurality of sizes respectively, the number of pixels being changed at a predetermined rate or changed at a predetermined rate in a stepwise manner in the plurality of sizes, each filter being correlated with the correspondence relationship, the object detecting method further includes an image group producing step of producing an image group including an original image of the object detecting target and at least one thinned-out image by thinning out pixels constituting the original image at the predetermined rate or by thinning out the pixels at the predetermined rate in the stepwise manner; and a plurality of extraction processes including a first extraction process and a second extraction process, wherein the plurality of extraction processes are sequentially repeated from an extraction process of applying a filter acting on a relatively narrow region to a relatively small image toward an extraction process of applying a filter acting on a relatively wide region to a relatively large image, and the specific kind of object is detected by finally extracting the region in the region extracting step;

in the first extraction process, the first evaluated value computing step computing the plurality of feature quantities by applying a plurality of first filters acting on a relatively narrow region to a relatively small first image in the image group produced in the image group producing step, and obtaining each primary evaluated value corresponding to each feature quantity based on the correspondence relationship corresponding to each of the plurality of first filters, the secondary evaluated value computing step obtaining the secondary evaluated value indicating the probability of specific kind of object existing in the region by integrating the plurality of primary evaluated values corresponding to the plurality of first filters, the plurality of primary evaluated values being obtained in the primary evaluated value computing step, the region extracting step comparing the secondary evaluated value obtained in the secondary evaluated value computing step and a first threshold to extract a primary candidate region where the probability of the existence of the specific kind of object exceeding the first threshold is high; and in the second extraction process, the primary evaluated value computing step computing the plurality of feature quantities by applying a plurality of second filters acting on a region which is wider by one stage than that of the plurality of first filters to a region corresponding to the primary candidate region in a second image in the image group produced in the image group producing step, the number of pixels of the second image being larger than by one stage than that of the first image, and obtaining each primary evaluated value corresponding to each feature quantity based on the correspondence relationship corresponding to each of the plurality of second filters, the secondary evaluated value computing step obtaining the secondary evaluated value indicating the probability of specific kind of object existing in the region corresponding to the primary candidate region by integrating the plurality of primary evaluated values corresponding to the plurality of second filters, the plurality of primary evaluated values being obtained in the primary evaluated value computing step, the region extracting step comparing the secondary evaluated value obtained in the secondary evaluated value computing step and a second threshold to extract a secondary candidate region where the probability of the existence of the specific kind of object exceeding the second threshold is high.

(3) The object detecting method according to (2), wherein the image group producing step is a step of performing an interpolation operation to the original image to produce one interpolated image or a plurality of interpolated images in addition to the image group, the one interpolated image or the plurality of interpolated images constituting the image group, the number of pixels of the one interpolated image being in a range where the number of pixels is larger than that of the thinned-out image obtained by thinning out the original image at the predetermined rate and smaller than that of the original image, the plurality of interpolated images having the numbers of pixels which are different from one another within the range, and of producing a new image group by thinning out pixels constituting the interpolated image at the predetermined rate for each of the produced at least one interpolated image or by thinning out pixels at the predetermined rate in the stepwise manner, the new image group including the interpolated image and at least one thinned-out image obtained by thinning out the pixels of the interpolated image, and the primary evaluated value computing step, the secondary evaluated value computing step, and region extracting step sequentially repeat the plurality of extraction processes to each of the plurality of image groups produced in the image group producing step from the extraction process of applying the filter acting on the relatively narrow region to the relatively small image toward the extraction process of applying the filter acting on the relatively wide region to the relatively large image.

(4) The object detecting method according to (1), further comprising a learning step of preparing a plurality of teacher images having predetermined sizes and a plurality of filter candidates, the plurality of teacher images including a plurality of images having the predetermined sizes in which the specific kind of object appears and a plurality of images having the predetermined sizes in which a subject except for the specific kind of object appears, the plurality of filter candidates acting on the region having the predetermined size on the image to extract the outline of the specific kind of object existing in the region and one of the feature quantities different from each other in the specific kind of object, and of extracting a plurality of filters from the plurality of filter candidates by machine learning to obtain the correspondence relationship corresponding to each filter.

(5) The object detecting method according to (2), further comprising a learning step of producing a plurality of teacher image groups by thinning out a plurality of teacher images having predetermined sizes at the predetermined rate or by thinning out the plurality of teacher images at the predetermined rate in the stepwise manner, the plurality of teacher images having an identical scene while having different sizes, the plurality of teacher images including a plurality of images having the predetermined sizes in which the specific kind of object appears and a plurality of images having the predetermined sizes in which a subject except for the specific kind of object appears, of preparing a plurality of filter candidates corresponding to a plurality of steps of sizes, the plurality of filter candidates acting on the regions on the image and having sizes according to the sizes of the teacher images of the plurality of steps, the teacher images constituting a teacher image group, the plurality of filter candidates extracting the outline of the specific kind of object existing in the region and one of the feature quantities different from each other in the specific kind of object, and of extracting a plurality of filters from the plurality of filter candidates for each size by machine learning to obtain the correspondence relationship corresponding to each extracted filter.

(6) The object detecting method according to (1), further comprising a region integrating step of integrating the plurality of regions into one region according to a degree of overlap between the plurality of regions when the plurality of regions are detected in the region extracting step.

(7) The object detecting method according to (1), further comprising a differential image producing step of obtaining continuous images to produce a differential image between different frames, the continuous images including a plurality of frames, the differential image being used as an image of the object detecting target.

(8) The object detecting method according to (1), wherein the plurality of filters are filters which produce an evaluated value indicating a probability of the existence of a human head, and the object detecting method is intended to detect the human head appearing in the image.

(9) An object detecting apparatus which detects a specific kind of object from an image expressed by two-dimensionally arrayed pixels, the object detecting apparatus comprising:

a filter storage section in which a plurality of filters are stored while correlated with a correspondence relationship between a feature quantity computed by each of the plurality of filters and a primary evaluated value indicating a probability of the specific kind of object, the plurality of filters acting on a region having a predetermined size to compute an outline of the specific kind of object and one of the feature quantities different from each other in the specific kind of object, the region having the predetermined size being two-dimensionally spread on the image;

a primary evaluated value computing section which applies the plurality of filters to the region having the predetermined size on an image of an object detecting target to compute a plurality of feature quantities and obtains a primary evaluated value corresponding to each of the feature quantities based on the corresponding relationship;

a secondary evaluated value computing section which obtains a secondary evaluated value by integrating the plurality of primary evaluated values, the secondary evaluated value indicating the probability of the specific kind of object existing in the region, the plurality of primary evaluated values corresponding to the plurality of filters being obtained by the primary evaluated value computing section; and a region extracting section which compares the secondary evaluated value obtained by the secondary evaluated value computing section and a threshold to extract a region where the probability of the existence of the specific kind of object is higher than the threshold, wherein the specific kind of object is detected by extracting the region with the region extracting section.

(10) The object detecting apparatus according to (9), wherein a filter group is stored in the filter storage section while correlated with the correspondence relationship, the filter group including a plurality of filters in each of a plurality of sizes, each of the plurality of filters acting on regions having the plurality of sizes respectively, the number of pixels being changed at a predetermined rate or changed at a predetermined rate in a stepwise manner in the plurality of sizes, each filter being correlated with the correspondence relationship, the object detecting apparatus includes:

an image group producing section which produces an image group including an original image of the object detecting target and at least one thinned-out image by thinning out pixels constituting the original image at the predetermined rate or by thinning out the pixels at the predetermined rate in the stepwise manner; and a region extracting operation control section which causes the primary evaluated value computing section, the secondary evaluated value computing section, and the region extracting section to sequentially repeat a plurality of extraction processes from an extraction process of applying a filter acting on a relatively narrow region to a relatively small image toward an extraction process of applying a filter acting on a relatively wide region to a relatively large image, and the specific kind of object is detected by finally extracting the region with the region extracting section, the plurality of extraction processes including a first extraction process and a second extraction process, in the first extraction process, the first evaluated value computing section computing the plurality of feature quantities by applying a plurality of first filters of the filter group stored in the filter storage section acting on a relatively narrow region to a relatively small first image in the image group produced by the image group producing section, and obtaining each primary evaluated value corresponding to each feature quantity based on the correspondence relationship corresponding to each of the plurality of first filters, the secondary evaluated value computing section obtaining the secondary evaluated value indicating the probability of specific kind of object existing in the region by integrating the plurality of primary evaluated values corresponding to the plurality of first filters, the plurality of primary evaluated values being obtained in the primary evaluated value computing section, the region extracting section comparing the secondary evaluated value obtained in the secondary evaluated value computing section and a first threshold to extract a primary candidate region where the probability of the existence of the specific kind of object exceeding the first threshold is high, and in the second extraction process, the primary evaluated value computing section computing the plurality of feature quantities by applying a plurality of second filters of the filter group stored in the filter storage section acting on a region which is wider by one stage than that of the plurality of first filters to a region corresponding to the primary candidate region in a second image in the image group produced by the image group producing section, the number of pixels of the second image being larger than by one stage than that of the first image, and obtaining each primary evaluated value corresponding to each feature quantity based on the correspondence relationship corresponding to each of the plurality of second filters, the secondary evaluated value computing section obtaining the secondary evaluated value indicating the probability of specific kind of object existing in the primary candidate region by integrating the plurality of primary evaluated values corresponding to the plurality of second filters, the plurality of primary evaluated values being obtained in the primary evaluated value computing section, the region extracting section comparing the secondary evaluated value obtained in the secondary evaluated value computing section and a second threshold to extract a secondary candidate region where the probability of the existence of the specific kind of object exceeding the second threshold is high.

(11) The object detecting apparatus according to (10), wherein the image group producing section performs an interpolation operation to the original image to produce one interpolated image or a plurality of interpolated images in addition to the image group, the one interpolated image or the plurality of interpolated images constituting the image group, the number of pixels of the one interpolated image being in a range where the number of pixels is larger than that of the thinned-out image obtained by thinning out the original image at the predetermined rate and smaller than that of the original image, the plurality of interpolated images having the numbers of pixels which are different from one another within the range, and the image group producing section produces a new image group by thinning out pixels constituting the interpolated image at the predetermined rate for each of the produced at least one interpolated image or by thinning out pixels at the predetermined rate in the stepwise manner, the new image group including the interpolated image and at least one thinned-out image obtained by thinning out the pixels of the interpolated image, and the region extracting operation control section causes the primary evaluated value computing section, the secondary evaluated value computing section, and region extracting section to sequentially repeat the plurality of extraction processes to each of the plurality of image groups produced by the image group producing section from the extraction process of applying the filter acting on the relatively narrow region to the relatively small image toward the extraction process of applying the filter acting on the relatively wide region to the relatively large image.

(12) The object detecting apparatus according to (9), further comprising a region integrating section which integrates the plurality of regions into one region according to a degree of overlap between the plurality of regions when the region extracting section detects the plurality of regions.

(13) The object detecting apparatus according to (9), further comprising a differential image producing section which obtains continuous images to produce a differential image between different frames, the continuous images including a plurality of frames, the differential image being used as an image of the object detecting target.

(14) The object detecting apparatus according to (9), wherein the filter storage section stores a filter group including a plurality of filters, the plurality of filters producing an evaluated value indicating a probability of the existence of a human head, and the object detecting apparatus is intended to detect the human head appearing in the image.

(15) A storage medium storing an object detecting program, the object detecting program that is executed in an operation apparatus to execute a program, and that causes the operation apparatus to serve as an object detecting apparatus, the object detecting apparatus detecting a specific kind of object from an image expressed by two-dimensionally arrayed pixels, wherein the object detecting apparatus includes:

a filter storage section in which a plurality of filters are stored while correlated with a correspondence relationship between a feature quantity computed by each of the plurality of filters and a primary evaluated value indicating a probability of the specific kind of object, the plurality of filters acting on a region having a predetermined size to compute an outline of the specific kind of object and one of the feature quantities different from each other in the specific kind of object, the region having the predetermined size being two-dimensionally spread on the image;

a primary evaluated value computing section which applies the plurality of filters to the region having the predetermined size on an image of an object detecting target to compute a plurality of feature quantities and obtains a primary evaluated value corresponding to each of the feature quantities based on the corresponding relationship;

a secondary evaluated value computing section which obtains a secondary evaluated value by integrating the plurality of primary evaluated values, the secondary evaluated value indicating the probability of the specific kind of object existing in the region, the plurality of primary evaluated values corresponding to the plurality of filters being obtained by the primary evaluated value computing section; and a region extracting section which compares the secondary evaluated value obtained by the secondary evaluated value computing section and a threshold to extract a region where the probability of the existence of the specific kind of object is higher than the threshold, and the specific kind of object is detected by extracting the region with the region extracting section.

(16) The storage medium storing the object detecting program according to (15), wherein a filter group is stored in the filter storage section while correlated with the correspondence relationship, the filter group including a plurality of filters in each of a plurality of sizes, each of the plurality of filters acting on regions having the plurality of sizes respectively, the number of pixels being changed at a predetermined rate or changed at a predetermined rate in a stepwise manner in the plurality of sizes, each filter being correlated with the correspondence relationship, the object detecting program causes the operation apparatus to serve as the object detecting apparatus, including:

an image group producing section which produces an image group including an original image of the object detecting target and at least one thinned-out image by thinning out pixels constituting the original image at the predetermined rate or by thinning out the pixels at the predetermined rate in the stepwise manner; and a region extracting operation control section which causes the primary evaluated value computing section, the secondary evaluated value computing section, and the region extracting section to sequentially repeat a plurality of extraction processes from an extraction process of applying a filter acting on a relatively narrow region to a relatively small image toward an extraction process of applying a filter acting on a relatively wide region to a relatively large image, and the specific kind of object is detected by finally extracting the region with the region extracting section, the plurality of extraction processes including a first extraction process and a second extraction process, in the first extraction process, the first evaluated value computing section computing the plurality of feature quantities by applying a plurality of first filters of the filter group stored in the filter storage section acting on a relatively narrow region to a relatively small first image in the image group produced by the image group producing section, and obtaining each primary evaluated value corresponding to each feature quantity based on the correspondence relationship corresponding to each of the plurality of first filters, the secondary evaluated value computing section obtaining the secondary evaluated value indicating the probability of specific kind of object existing in the region by integrating the plurality of primary evaluated values corresponding to the plurality of first filters, the plurality of primary evaluated values being obtained in the primary evaluated value computing section, the region extracting section comparing the secondary evaluated value obtained in the secondary evaluated value computing section and a first threshold to extract a primary candidate region where the probability of the existence of the specific kind of object exceeding the first threshold is high, and in the second extraction process, the primary evaluated value computing section computing the plurality of feature quantities by applying a plurality of second filters of the filter group stored in the filter storage section acting on a region which is wider by one stage than that of the plurality of first filters to a region corresponding to the primary candidate region in a second image in the image group produced by the image group producing section, the number of pixels of the second image being larger than by one stage than that of the first image, and obtaining each primary evaluated value corresponding to each feature quantity based on the correspondence relationship corresponding to each of the plurality of second filters, the secondary evaluated value computing section obtaining the secondary evaluated value indicating the probability of specific kind of object existing in the primary candidate region by integrating the plurality of primary evaluated values corresponding to the plurality of second filters, the plurality of primary evaluated values being obtained in the primary evaluated value computing section, the region extracting section comparing the secondary evaluated value obtained in the secondary evaluated value computing section and a second threshold to extract a secondary candidate region where the probability of the existence of the specific kind of object exceeding the second threshold is high.

(17) The storage medium storing the object detecting program according to (16), wherein the image group producing section performs an interpolation operation to the original image to produce one interpolated image or a plurality of interpolated images in addition to the image group, the one interpolated image or the plurality of interpolated images constituting the image group, the number of pixels of the one interpolated image being in a range where the number of pixels is larger than that of the thinned-out image obtained by thinning out the original image at the predetermined rate and smaller than that of the original image, the plurality of interpolated images having the numbers of pixels which are different from one another within the range, and the image group producing section produces a new image group by thinning out pixels constituting the interpolated image at the predetermined rate for each of the produced at least one interpolated image or by thinning out pixels at the predetermined rate in the stepwise manner, the new image group including the interpolated image and at least one thinned-out image obtained by thinning out the pixels of the interpolated image, and the region extracting operation control section causes the primary evaluated value computing section, the secondary evaluated value computing section, and region extracting section to sequentially repeat the plurality of extraction processes to each of the plurality of image groups produced by the image group producing section from the extraction process of applying the filter acting on the relatively narrow region to the relatively small image toward the extraction process of applying the filter acting on the relatively wide region to the relatively large image.

(18) The storage medium storing the object detecting program according to (15), wherein the object detecting program causes the operation apparatus to serve as the object detecting apparatus, the object detecting apparatus further including a region integrating section which integrates the plurality of regions into one region according to a degree of overlap between the plurality of regions when the region extracting section detects the plurality of regions.

(19) The storage medium storing the object detecting program according to (15), wherein the object detecting program causes the operation apparatus to serve as the object detecting apparatus, the object detecting apparatus further including a differential image producing section which obtains continuous images to produce a differential image between different frames, the continuous images including a plurality of frames, the differential image being used as an image of the object detecting target.

(20) The storage medium storing the object detecting program according to (15), wherein the filter storage section stores the filter group including the plurality of filters for producing the evaluated value indicating a probability of the existence of a human head, and the object detecting program causes the operation apparatus to serve as the object detecting apparatus which is intended to detect the human head appearing in the image.

(21) An object detecting method which detects a specific kind of object from an image expressed by two-dimensionally arrayed pixels, the object detecting method comprising:

an image group producing step of producing an image group including an original image of an object detecting target and at least one thinned-out image by thinning out pixels constituting the original image at a predetermined rate or by thinning out the pixels at the predetermined rate in a stepwise manner; and a stepwise detection step of detecting the specific kind of object from the original image by sequentially repeating a plurality of extraction processes from an extraction process of applying a filter acting on a relatively narrow region to a relatively small image toward an extraction process of applying a filter acting on a relatively wide region to a relatively large image, the plurality of extraction processes including:

a first extraction process of extracting a primary candidate region where an evaluated value exceeding a predetermined first threshold is obtained by applying a first filter in a filter group including a plurality of filters to a relatively small first image in the image group produced in the image group producing step, the first filter acting on a relatively narrow region, each of the plurality of filters acting on a region two-dimensionally spread on the image to produce an evaluated value, the evaluated value indicating a probability of the existence of the specific kind of object in the region, the plurality of filters acting on regions having a plurality of sizes respectively, the number of pixels corresponding to the size of the region on the image being changed at the predetermined rate or changed at the predetermined rate in the stepwise manner in the plurality of sizes; and a second extraction process of extracting a secondary candidate region where an evaluated value exceeding a predetermined second threshold is obtained by applying a second filter in the filter group to a region corresponding to the primary candidate region in a second image in which the number of pixels is larger than that of the first image in the image group produced in the image group producing step, the second filter acting on a region wider than that of the first filter.

(22) The object detecting method according to (21), wherein the image group producing step is a step of performing an interpolation operation to the original image to produce one interpolated image or a plurality of interpolated images, in addition to the image group, the one interpolated image or the plurality of interpolated images constituting the image group, the number of pixels of the one interpolated image being in a range where the number of pixels is larger than that of the thinned-out image obtained by thinning out the original image at the predetermined rate and smaller than that of the original image, the plurality of interpolated images having the numbers of pixels which are different from one another within the range, and of producing a new image group by thinning out pixels constituting the interpolated image at the predetermined rate for each of the produced at least one interpolated image or by thinning out pixels at the predetermined rate in the stepwise manner, the new image group including the interpolated image and at least one thinned-out image obtained by thinning out the pixels of the interpolated image, and the stepwise detection step is a step of detecting the specific kind of object from each of the original image and the at least one interpolated image by sequentially repeating the extraction processes to each of the plurality of image groups produced in the image group producing step from the extraction process of applying the filter acting on the relatively narrow region to the relatively small image toward the extraction process of applying the filter acting on a relatively wide region to the relatively large image.

(23) The object detecting method according to (21), wherein a plurality of kinds of filters are prepared for each region having one size, each of the plurality of kinds of filters computing an outline of the specific kind of object and one of feature quantities in the specific kind of object, a correlation between the feature quantity and a primary evaluated value is prepared, the feature quantity being computed by each filter, the primary evaluated value indicating a probability of the specific kind of object, and the stepwise detection step is a step of computing the plurality of feature quantities by applying the plurality of kinds of filters to one region according to the size of the region, of obtaining the primary evaluated value corresponding to each feature quantity, and of determining whether or not the region is a candidate region where the specific kind of object exists by comparing a secondary evaluated value and a threshold, the secondary evaluated value being obtained by integrating the plurality of primary evaluated values.

(24) The object detecting method according to (21), further comprising a region integrating step of integrating, when a plurality of regions are detected in the stepwise detection step, the plurality of regions into one region according to a degree of overlap between the plurality of regions.

(25) The object detecting method according to (21), further comprising a differential image producing step of obtaining continuous images to produce a differential image between different frames, the continuous images including a plurality of frames, the differential image being used as an image of the object detecting target.

(26) The object detecting method according to (21), wherein the filter group includes the plurality of filters producing the evaluated values, the evaluated value indicating a probability of the existence of a human head, and a detecting target of the object detecting method is the human head appearing in the image.

(27) An object detecting apparatus which detects a specific kind of object from an image expressed by two-dimensionally arrayed pixels, the object detecting apparatus comprising:

a filter storage section in which a filter group including a plurality of filters is stored, each of the plurality of filters acting on a region two-dimensionally spread on the image to produce an evaluated value, the evaluated value indicating a probability of the existence of the specific kind of object in the region, the plurality of filters acting on regions having a plurality of sizes respectively, the number of pixels corresponding to the size of the region on the image being changed at a predetermined rate or changed at the predetermined rate in a stepwise manner in the plurality of sizes;

an image group producing section which produces an image group including an original image of an object detecting target and at least one thinned-out image by thinning out pixels constituting the original image at the predetermined rate or by thinning out the pixels at the predetermined rate in the stepwise manner; and a stepwise detection section which detects the specific kind of object from the original image by sequentially repeating a plurality of extraction processes from an extraction process of applying a filter acting on a relatively narrow region to a relatively small image toward an extraction process of applying a filter acting on a relatively wide region to a relatively large image, the plurality of extraction processes including:

a first extraction process of extracting a primary candidate region where an evaluated value exceeding a predetermined first threshold is obtained by applying a first filter in the filter group stored in the filter storage section to a relatively small first image in the image group produced by the image group producing section, the first filter acting on a relatively narrow region; and a second extraction process of extracting a secondary candidate region where an evaluated value exceeding a predetermined second threshold is obtained by applying a second filter in the filter group stored in the filter storage section to a region corresponding to the primary candidate region in a second image in which the number of pixels is larger than that of the first image in the image group produced by the image group producing section, the second filter acting on a region wider than that of the first filter.

(28) The object detecting apparatus according to (27), wherein the image group producing section performs an interpolation operation to the original image to produce one interpolated image or a plurality of interpolated images in addition to the image groups, the one interpolated image or the plurality of interpolated images constituting the image group, the number of pixels of the one interpolated image being in a range where the number of pixels is larger than that of the thinned-out image obtained by thinning out the original image at the predetermined rate and smaller than that of the original image, the plurality of interpolated images having the numbers of pixels which are different from one another within the range, and the image group producing section produces a new image group by thinning out pixels constituting the interpolated image at the predetermined rate for each of the produced at least one interpolated image or by thinning out pixels at the predetermined rate in the stepwise manner, the new image group including the interpolated image and at least one thinned-out image obtained by thinning out the pixels of the interpolated image, and the stepwise detection section detects the specific kind of object from each of the original image and the at least one interpolated image by sequentially repeating the extraction processes to each of the plurality of image groups produced by the image group producing section from the extraction process of applying the filter acting on the relatively narrow region to the relatively small image toward the extraction process of applying the filter acting on the relatively wide region to the relatively large image.

(29) The object detecting apparatus according to (27), wherein a plurality of kinds of filters are stored in the filter storage section, the plurality of kinds of filters being prepared for each region having one size, each of the plurality of kinds of filters computing an outline of the specific kind of object and one of feature quantities in the specific kind of object, a correlation between the feature quantity and a primary evaluated value is also stored in the filter storage section, the feature quantity being computed by each filter, the primary evaluated value indicating a probability of the specific kind of object, and the stepwise detection section computes the plurality of feature quantities by applying the plurality of kinds of filters to one region according to the size of the region, obtains the primary evaluated value corresponding to each feature quantity, and determines whether or not the region is a candidate region where the specific kind of object exists by comparing a secondary evaluated value and a threshold, the secondary evaluated value being obtained by integrating the plurality of primary evaluated values.

(30) The object detecting apparatus according to (27), further comprising a region integrating section which integrates, when a plurality of regions are detected by the stepwise detection section, the plurality of regions into one region according to a degree of overlap between the plurality of regions.

(31) The object detecting apparatus according to (27), further comprising a differential image producing section which obtains continuous images to produce a differential image between different frames, the continuous images including a plurality of frames, the differential image being used as an image of the object detecting target.

(32) The object detecting apparatus according to (27), wherein the filter group including the plurality of filters producing the evaluated values is stored in the filter storage section, the evaluated value indicating a probability of the existence of a human head, and a detecting target of the object detecting apparatus is the human head appearing in the image.

(33) A storage medium storing an object detecting program that is executed in an operation apparatus to execute a program, and that causes the operation apparatus to serve as an object detecting apparatus, the object detecting apparatus detecting a specific kind of object from an image expressed by two-dimensionally arrayed pixels, the object detecting apparatus comprising:

a filter storage section in which a filter group including a plurality of filters is stored, each of the plurality of filters acting on a region two-dimensionally spread on the image to produce an evaluated value, the evaluated value indicating a probability of the existence of the specific kind of object in the region, the plurality of filters acting on regions having a plurality of sizes respectively, the number of pixels corresponding to the size of the region on the image being changed at a predetermined rate or changed at the predetermined rate in a stepwise manner in the plurality of sizes;

an image group producing section which produces an image group including an original image of an object detecting target and at least one thinned-out image by thinning out pixels constituting the original image at the predetermined rate or by thinning out the pixels at the predetermined rate in the stepwise manner; and a stepwise detection section which detects the specific kind of object from the original image by sequentially repeating a plurality of extraction processes from an extraction process of applying a filter acting on a relatively narrow region to a relatively small image toward an extraction process of applying a filter acting on a relatively wide region to a relatively large image, the plurality of extraction processes including:

a first extraction process of extracting a primary candidate region where an evaluated value exceeding a predetermined first threshold is obtained by applying a first filter in the filter group stored in the filter storage section to a relatively small first image in the image group produced by the image group producing section, the first filter acting on a relatively narrow region; and a second extraction process of extracting a secondary candidate region where an evaluated value exceeding a predetermined second threshold is obtained by applying a second filter in the filter group stored in the filter storage section to a region corresponding to the primary candidate region in a second image in which the number of pixels is larger than that of the first image in the image group produced by the image group producing section, the second filter acting on a region wider than that of the first filter.

(34) The storage medium storing the object detecting program according to (33), wherein the image group producing section performs an interpolation operation to the original image to produce one interpolated image or a plurality of interpolated images in addition to the image groups, the one interpolated image or the plurality of interpolated images constituting the image group, the number of pixels of the one interpolated image being in a range where the number of pixels is larger than that of the thinned-out image obtained by thinning out the original image at the predetermined rate and smaller than that of the original image, the plurality of interpolated images having the numbers of pixels which are different from one another within the range, and the image group producing section produces a new image group by thinning out pixels constituting the interpolated image at the predetermined rate for each of the produced at least one interpolated image or by thinning out pixels at the predetermined rate in the stepwise manner, the new image group including the interpolated image and at least one thinned-out image obtained by thinning out the pixels of the interpolated image, and the stepwise detection section detects the specific kind of object from each of the original image and the at least one interpolated image by sequentially repeating the extraction processes to each of the plurality of image groups produced by the image group producing section from the extraction process of applying the filter acting on the relatively narrow region to the relatively small image toward the extraction process of applying the filter acting on the relatively wide region to the relatively large image.

(35) The storage medium storing the object detecting program according to (33), wherein a plurality of kinds of filters are stored in the filter storage section, the plurality of kinds of filters being prepared for each region having one size, each of the plurality of kinds of filters computing an outline of the specific kind of object and one of feature quantities in the specific kind of object, a correlation between the feature quantity and a primary evaluated value is also stored in the filter storage section, the feature quantity being computed by each filter, the primary evaluated value indicating a probability of the specific kind of object, and the stepwise detection section computes the plurality of feature quantities by applying the plurality of kinds of filters to one region according to the size of the region, obtains the primary evaluated value corresponding to each feature quantity, and determines whether or not the region is a candidate region where the specific kind of object exists by comparing a secondary evaluated value and a threshold, the secondary evaluated value being obtained by integrating the plurality of primary evaluated values.

(36) The storage medium storing the object detecting program according to (33), wherein the object detecting program causes the operation apparatus to serve as the object detecting apparatus, the object detecting apparatus further comprising a region integrating section which integrates, when a plurality of regions are detected by the stepwise detection section, the plurality of regions into one region according to a degree of overlap between the plurality of regions.

(37) The storage medium storing the object detecting program according to (33), wherein the object detecting program causes the operation apparatus to serve as the object detecting apparatus, the object detecting apparatus further comprising a differential image producing section which obtains continuous images to produce a differential image between different frames, the continuous images including a plurality of frames, the differential image being used as an image of the object detecting target.

(38) The storage medium storing the object detecting program according to (33), wherein the filter group including the plurality of filters producing the evaluated values is stored in the filter storage section, the evaluated value indicating a probability of the existence of a human head, and the object program causes the operation apparatus to serve as the object detecting apparatus whose detecting target is the human head appearing in the image.

What is claimed is:

1. A person tracking method comprising:

a correspondence calculation step of calculating a statistically average correspondence between a size of a head of a person appearing on an image taken by a camera and a position representing a height of the head on the taken image, the camera being disposed at a position looking down a measured space and generates image data representing a moving image of a predetermined frame rate by taking the moving image of the measured space;

a head detecting step of detecting, based on each piece of image data representing each of a plurality of measured frame images among a plurality of frame images obtained through image-taking by the camera, a position and a size of a head on each of the measured frame images;

a movement-feature-quantity calculation step of calculating, based on positions and sizes of heads on a plurality of past measured frame images detected in the head detecting step and the correspondence calculated in the correspondence calculation step, a movement feature quantity that represents a possibility that a head on a current measured frame image detected in the head detecting step is a head that belongs to the same person as a person having the heads on the past measured frame images; and a same-person determination step of determining, by using the movement feature quantity calculated in the movement-feature-quantity calculation step, whether the head on the current measured frame image is the head that belongs to the same person as the person having the heads on the past measured frame images.

2. The person tracking method according to claim 1, wherein the movement-feature-quantity calculation step is a step of calculating the movement feature quantity based on a ratio between a uniform movement distance and a between-head distance, the uniform movement distance being a distance between an intersection point and a first head position, the intersection point being formed by a border line and a straight line, when the border line of a movement range of the head that belongs to the same person as the person of the heads on the past measured frame images is set on the current measured frame image based on the positions and sizes of the heads on the plurality of past measured frame images detected in the head detecting step as well as based on the correspondence calculated in the correspondence calculation step, the straight line passing through the first head position that is a position of a head on an immediately preceding past measured frame image and a second head position that is the position of the head on the current measured frame image, and the between-head distance being a distance between the first head position and the second head position.

3. A person tracking apparatus comprising:

a storage section that stores a statistically average correspondence between a size of a head of a person appearing on an image taken by a camera and a position representing a height of the head on the taken image, the camera being disposed at a position looking down a measured space and generates image data representing a moving image of a predetermined frame rate by taking the moving image of the measured space;

a head detecting section that detects, based on each piece of image data representing each of a plurality of measured frame images among a plurality of frame images obtained through image-taking by the camera, a position and a size of a head on each of the measured frame images;

a movement-feature-quantity calculation section that calculates, based on positions and sizes of heads on a plurality of past measured frame images detected by the head detecting section and the correspondence stored in the storage section, a movement feature quantity that represents a possibility that a head on a current measured frame image detected by the head detecting section is a head that belongs to the same person as a person having the heads on the past measured frame images; and a same-person determination section that determines, by using the movement feature quantity calculated by the movement feature-quantity calculation section, whether the head on the current measured frame image is the head that belongs to the same person as the person having the heads on the past measured frame images.

4. The person tracking apparatus according to claim 3, wherein the movement-feature-quantity calculation section calculates the movement feature quantity based on a ratio between a uniform movement distance and a between-head distance, the uniform movement distance being a distance between an intersection point and a first head position, the intersection point being formed by a border line and a straight line, when the border line of a movement range of the head that belongs to the same person as the person of the heads on the past measured frame images is set on the current measured frame image based on the positions and sizes of the heads on the plurality of past measured frame images detected in the head detecting section as well as based on the correspondence calculated in the correspondence calculation section, the straight line passing through the first head position that is a position of a head on an immediately preceding past measured frame image and a second head position that is the position of the head on the current measured frame image, and the between-head distance being a distance between the first head position and the second head position.

5. A non-transitory computer-readable storage medium storing a program that is executed in an operational apparatus and causes the operational apparatus to perform a person tracking method comprising:

storing a statistically average correspondence between a size of a head of a person appearing on an image taken by a camera and a position representing a height of the head on the taken image, the camera being disposed at a position looking down a measured space and generates image data representing a moving image of a predetermined frame rate by taking the moving image of the measured space;

detecting, based on each piece of image data representing each of a plurality of measured frame images among a plurality of frame images obtained through image-taking by the camera, a position and a size of a head on each of the measured frame images;

a calculating, based on positions and sizes of detected heads on a plurality of past measured frame images and the correspondence stored in the step of storing, a movement feature quantity that represents a possibility that a detected head on a current measured frame image is a head that belongs to the same person as a person having the heads on the past measured frame images; and a determining, by using the calculated movement feature quantity whether the head on the current measured frame image is the head that belongs to the same person as the person having the heads on the past measured frame images.

6. The person tracking program storage medium according to claim 5 wherein the step of calculating movement-feature-quantity calculates the movement feature quantity based on a ratio between a uniform movement distance and a between-head distance, the uniform movement distance being a distance between an intersection point and a first head position, the intersection point being formed by a border line and a straight line, when the border line of a movement range of the head that belongs to the same person as the person of the heads on the past measured frame images is set on the current measured frame image based on the positions and sizes of the detected heads on the plurality of past measured frame images as well as based on the calculating correspondence, the straight line passing through the first head position that is a position of a head on an immediately preceding past measured frame image and a second head position that is the position of the head on the current measured frame image, and the between-head distance being a distance between the first head position and the second head position.

* * * * *